US011924751B2

(12) United States Patent
Kim et al.

(10) Patent No.: US 11,924,751 B2
(45) Date of Patent: *Mar. 5, 2024

(54) METHOD AND APPARATUS FOR PERFORMING COMMUNICATION TO USE NETWORK SLICE IN WIRELESS COMMUNICATION SYSTEM

(71) Applicant: SAMSUNG ELECTRONICS CO., LTD., Suwon-si (KR)

(72) Inventors: Dongyeon Kim, Suwon-si (KR); Hoyeon Lee, Suwon-si (KR); Sangsoo Jeong, Suwon-si (KR); Jungshin Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/938,615

(22) Filed: Oct. 6, 2022

(65) Prior Publication Data

US 2023/0044211 A1 Feb. 9, 2023

Related U.S. Application Data

(63) Continuation of application No. 17/453,641, filed on Nov. 4, 2021, now Pat. No. 11,470,546.

(30) Foreign Application Priority Data

Nov. 6, 2020 (KR) .................. 10-2020-0148152
Nov. 17, 2020 (KR) .................. 10-2020-0154130

(51) Int. Cl.
*H04W 48/18* (2009.01)
*H04W 8/18* (2009.01)
(Continued)

(52) U.S. Cl.
CPC .......... *H04W 48/18* (2013.01); *H04W 8/183* (2013.01); *H04W 76/10* (2018.02); *H04W 76/30* (2018.02)

(58) Field of Classification Search
CPC ..... H04W 48/18; H04W 76/30; H04W 76/10; H04W 8/183
See application file for complete search history.

(56) References Cited

U.S. PATENT DOCUMENTS 11,470,546 B2 * 10/2022 Kim ................. H04W 76/30
2019/0116526 A1 * 4/2019 Tiwari ................ H04W 48/18
(Continued)

FOREIGN PATENT DOCUMENTS

EP  3697022 A1  8/2020
KR  20200018956 A  2/2020
(Continued)

OTHER PUBLICATIONS

International Search Report and Written Opinion of the International Searching Authority in connection with International Application No. PCT/KR2021/015881 dated Feb. 8, 2022, 8 pages.
(Continued)

Primary Examiner — Kashif Siddiqui

(57) ABSTRACT

The disclosure relates to a communication technique of converging a 5th generation (5G) communication system for supporting higher data rates after a 4th generation (4G) system with Internet of things (IoT), and a system therefor. The disclosure provides a method performed by a first network entity managing a packet data network (PDN) session in a wireless communication system supporting interworking between a first and second networks. The method comprises receiving subscription update information of a user equipment (UE) for which a PDN connection associated with a network slice is established in the second network, the network slice being subscribed in the first
(Continued)

network, determining whether to release the PDN connection if the subscription update information includes information notifying that network slice related information of the UE is changed, and performing a release of the PDN connection associated with the network slice if the release of the PDN connection is determined.

7 Claims, 32 Drawing Sheets

(51) Int. Cl.
  *H04W 76/10* (2018.01)
  *H04W 76/30* (2018.01)

(56) References Cited

U.S. PATENT DOCUMENTS

| | | | |
|---|---|---|---|
| 2019/0124561 A1* | 4/2019 | Faccin | H04W 84/00 |
| 2020/0053617 A1 | 2/2020 | Park et al. | |
| 2020/0163008 A1* | 5/2020 | Hedman | H04W 36/125 |
| 2020/0178321 A1 | 6/2020 | Liu et al. | |
| 2020/0245127 A1* | 7/2020 | Zong | H04W 8/02 |
| 2020/0260340 A1* | 8/2020 | Jing | H04W 36/0022 |
| 2020/0322857 A1 | 10/2020 | Park et al. | |

FOREIGN PATENT DOCUMENTS

| | | |
|---|---|---|
| WO | 2019073977 A1 | 4/2019 |
| WO | 2019076439 A1 | 4/2019 |
| WO | 2019194954 A1 | 10/2019 |

OTHER PUBLICATIONS

3GPP TS 23.502 V16.6.0 (Sep. 2020) Technical Specification; 3rd Generation Partnership Project; Technical Specification Group Services and System Aspects; Procedures for the 5G System (5GS); Stage 2 (Release 16); 597 pages.

Korea Intellectual Property Office, "CSP Search Report at KIPO" dated Feb. 15, 2022, in connection with Korean Patent Application No. 10-2020-0154130 (corresponding to U.S. Appl. No. 17/453,641), 2 pages.

3GPP TS 23.501 V17.1.1 (Jun. 2021) Technical Specification, 3rd Generation Partnership Project, Technical Specification Group Services and System Aspects, System architecture for the 5G System (5GS), Stage 2 (Release 17) Jun. 2021, 526 pages.

3GPP TS 23.203 V17.1.0 (Jun. 2021) Technical Specification, 3rd Generation Partnership Project, Technical Specification Group Services and System Aspects, Policy and charging control architecture (Release 17) Jun. 2021, 288 pages.

3GPP TS 23.401 V17.1.0 (Jun. 2021) Technical Specification, 3rd Generation Partnership Project; Technical Specification Group Services and System Aspects, General Packet Radio Service (GPRS) enhancements for Evolved Universal Terrestrial Radio Access Network (E-UTRAN) access (Release 17), Jun. 2021, 446 pages.

3GPP TS 23.502 V17.1.0 (Jun. 2021) Technical Specification, 3rd Generation Partnership Project, Technical Specification Group Services and System Aspects, Procedures for the 5G System (5GS), Stage 2 (Release 17), Jun. 2021, 692 pages.

Japan Patent Office, "Decision to Grant" dated Jun. 5, 2023, in connection with Japan Patent Application No. 2022-578736, 7 pages.

European Patent Office, "Supplementary European Search Report" dated Jul. 27, 2023, in connection with European Patent Application No. 21889579.5, 14 pages.

Ericsson, "Request an S-NSSAI that have failed the NSSAA or has been revoked", 3GPP TSG-CT WG1 Meeting #127-e, C1-207415, Electronic meeting, Nov. 2020, 74 pages.

Oppo et al., "Correct pending NSSAI handling", 3GPP TSG-CT WG1 Meeting #126-e, C1-206464, Electronic meeting, Oct. 2020, 35 pages.

Samsung, "Correction to subscription data updates for EPS/5GS interworking", 3GPP TSG-SA WG2 Meeting #146E, Elbonia, Jun. 2021, S2-2106191, 5 pages.

3GPP TS 23.501 V16.6.0 (Sep. 2020); Technical Specification; 3rd Generation Partnership Project; Technical Specification Group Services and System Aspects; System architecture for the 5G System (5GS); Stage 2 (Release 16); 447 pages.

* cited by examiner

METHOD AND APPARATUS FOR PERFORMING COMMUNICATION TO USE NETWORK SLICE IN WIRELESS COMMUNICATION SYSTEM

CROSS-REFERENCE TO RELATED APPLICATIONS

This application is a continuation of application Ser. No. 17/453,641, now U.S. Pat. No. 11,470,546 issued Oct. 11, 2022, which is based on and claims priority under 35 U.S.C. § 119 to Korean Patent Application No. 10-2020-0148152, filed Nov. 6, 2020, and Korean Patent Application No. 10-2020-0154130, filed Nov. 17, 2020, in the Korean Intellectual Property Office, the disclosures of which are incorporated by reference herein in their entirety.

BACKGROUND

1. Field

The disclosure relates to a communication apparatus and method for providing network slicing in a wireless communication system.

2. Description of Related Art

To meet demands for wireless data traffic, which have been increasing since the commercialization of a 4th generation (4G) communication system, efforts are being made to develop an advanced 5th generation (5G) communication system or a pre-5G communication system. For this reason, the 5G communication system or the pre-5G communication system is called a beyond 4G network communication system or a post long term evolution (LTE) system. A 5G communication system specified by the 3rd generation partnership project (3GPP) is called a new radio (NR) system.

To achieve high data rates, implementation of the 5G communication system in a millimeter wave (mmWave) band (such as 60 GHz) is under consideration. For the 5G communication system, techniques such as beamforming, massive multiple input multiple output (MIMO), full dimension-MIMO (FD-MIMO), array antenna, analog beamforming, and large-scale antenna have been discussed to mitigate the pathloss of waves and increase the propagation distance of the waves in the mmWave band. These techniques are applied to the NR system.

For system network improvement, techniques such as an evolved small cell, an advanced small cell, a cloud radio access network (cloud RAN), an ultra-dense network, device-to-device (D2D) communication, a wireless backhaul, a moving network, cooperative communication, coordinated multi-point (CoMP), and reception interference cancellation are being developed in the 5G communication system.

Besides, advanced coding modulation (ACM) schemes including hybrid FSK and QAM modulation (FQAM) and sliding window superposition coding (SWSC), and advanced access schemes including filter bank multi carrier (FBMC), non-orthogonal multiple access (NOMA), and sparse code multiple access (SCMA) are being developed for the 5G system.

The Internet has been evolving from a human-centered connection network in which humans create and consume information to an Internet of things (IoT) in which information is exchanged and processed between distributed components such as objects. Internet of everything (IoE) is also emerging, in which the IoT is combined with a big data processing technology based on connection to a cloud server. As technology elements such as sensing, wired and wireless communication, network infrastructure, service interfacing, and security are required for IoT implementation, techniques such as a sensor network, machine-to-machine (M2M), and machine type communication (MTC) are being studied to interconnect things. In the IoT environment, intelligent Internet technology (IT) services that create new values in human life by collecting and analyzing data generated from connected things may be provided. The IoT may find its applications through fusion and convergence between the existing information technology (IT) and various industries in the fields of smart home, smart building, smart city, smart car or connected car, smart grid, health care, smart home appliance, advanced medical service, and so on.

In this context, various attempts are being made to apply the 5G communication system to the IoT. For example, 5G communication such as a sensor network, M2M, and MTC is being implemented by techniques such as beamforming, MIMO, and array antenna. Application of a cloud radio access network (cloud RAN) as the above-described big data processing technology may also be an example of 5G-IoT convergence.

Along with the recent development of communication systems, various studies have been made to provide different network slicing (or network slices) in a 5G-based wireless communication system.

SUMMARY

Provided are an efficient communication method and apparatus for using a network slice in a wireless communication system.

Provided are an efficient communication method and apparatus for using a network slice in a wireless communication system supporting interworking between different networks.

Provided are a method and apparatus for interworking between a 5th generation (5G) network system structure (e.g., 5G core (5GC)) supporting a network slicing function and an evolved packet system (EPS) network system (e.g., evolved packet core (EPC)) in a wireless communication system.

Additional aspects will be set forth in part in the description which follows and, in part, will be apparent from the description, or may be learned by practice of the presented embodiments of the disclosure.

According to an embodiment of the disclosure, a method performed by a first network entity managing a packet data network (PDN) session in a wireless communication system supporting interworking between a first network and a second network is provided, the method comprises receiving, from a second network entity managing subscription information, subscription update information of a user equipment (UE) for which a PDN connection associated with a network slice is established in the second network, the network slice being subscribed in the first network, determining whether to release the PDN connection in case that the subscription update information includes information notifying that network slice related information of the UE is changed, and performing an operation for a release of the PDN connection associated with the network slice in case that the release of the PDN connection is determined.

In addition, according to an embodiment of the disclosure, a first network entity managing a packet data network (PDN)

session in a wireless communication system supporting interworking between a first network and a second network is provided, the first network entity comprises a transceiver, and a processor configured to receive, via the transceiver from a second network entity managing subscription information, subscription update information of a user equipment (UE) for which a PDN connection associated with a network slice is established in the second network, the network slice being subscribed in the first network, determine whether to release the PDN connection in case that the subscription update information includes information notifying that network slice related information of the UE is changed, and perform an operation for a release of the PDN connection associated with the network slice in case that the release of the PDN connection is determined.

In addition, according to an embodiment of the disclosure, a user equipment (UE) in a wireless communication system supporting interworking between a first network and a second network, the UE comprises a transceiver, and a processor configured to establish a packet data network (PDN) connection associated with a network slice in the second network, the network slice being subscribed in the first network, and identify a release of the PDN connection in case that the UE receives, via the second network from a first network entity managing a PDN session, information indicating a cause associated with the release of the PDN connection, the first network entity having receiving subscription update information including information notifying that network slice related information of the UE is changed.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
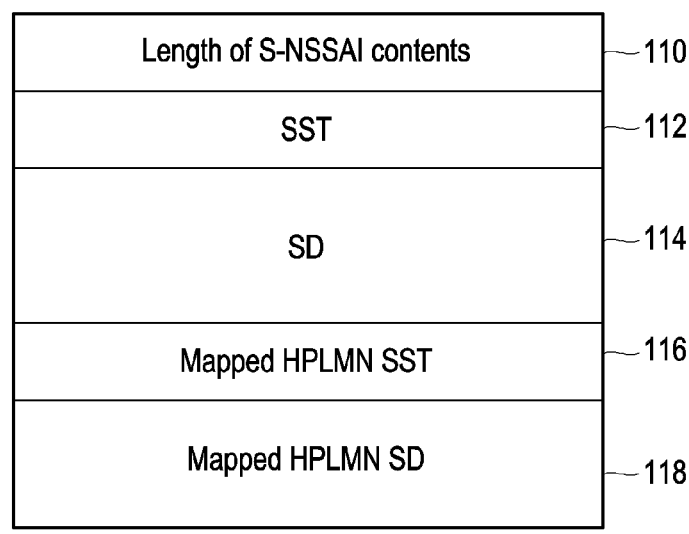
FIG. 1 is a diagram illustrating an exemplary configuration of a network slice-related information element (IE) according to an embodiment of the disclosure.

FIGS. 1 through 26B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Preferred embodiments of the disclosure are described below in detail with reference to the accompanying drawings. It is to be noted that like reference numerals denote the same components, if possible. Lest it should obscure the subject matter of the disclosure, a detailed description of functions and constructions known in the art will be avoided.

In describing embodiments herein, techniques which are known in the technical field of the disclosure and are not directly related to the disclosure will not be described. This is intended to clearly convey the subject matter of the disclosure without obscurity by avoiding unnecessary description.

For the same reason, some components shown in the drawings are exaggerated, omitted, or schematically illustrated, and the drawn size of each component does not exactly reflect its real size. In each drawing, the same reference numerals are assigned to the same or corresponding components.

The advantages and features of the disclosure, and a method of achieving them will become apparent from reference to embodiments described below in detail in conjunction with the attached drawings. However, the disclosure may be implemented in various manners, not limited to the embodiments set forth herein. Rather, these embodiments are provided such that the disclosure is complete and thorough and its scope is fully conveyed to those skilled in the art, and the disclosure is only defined by the appended claims. The same reference numerals denote the same components throughout the specification.

It will be understood that each block of the flowchart illustrations and/or block diagrams, and combinations of blocks in the flowchart illustrations and/or block diagrams can be implemented by computer program instructions. These computer program instructions may be loaded on a processor of a general purpose computer, special purpose computer, or other programmable data processing equipment, such that the instructions, which are executed via the processor of the computer or other programmable data processing equipment, create means for implementing the functions/acts specified in the flowchart and/or block diagram block(s). These computer program instructions may also be stored in a computer-usable or computer-readable memory that can direct the computer or other programmable data processing equipment to function in a particular manner, such that the instructions stored in the computer-usable or computer-readable memory produce an article of manufacture including instruction means which implement the function/act specified in the flowchart and/or block diagram block(s). The computer program instructions may also be loaded onto the computer or other programmable data processing equipment to cause a series of operations to be performed on the computer or other programmable data processing equipment to produce a computer implemented process such that the instructions which are executed on the computer or other programmable equipment provide operations for implementing the functions/acts specified in the flowchart and/or block diagram block(s).

Furthermore, the respective block diagrams may illustrate parts of modules, segments, or codes including one or more executable instructions for performing specific logic function(s). Moreover, it should be noted that the functions of the blocks may be performed in a different order in several modifications. For example, two successive blocks may be performed substantially at the same time, or may be performed in reverse order according to their functions.

The term "unit" as used herein means, but is not limited to, a software or hardware component, such as a field programmable gate array (FPGA) or application specific integrated circuit (ASIC), which performs certain tasks. A unit may advantageously be configured to reside on an addressable storage medium and configured to be executed on one or more processors. Thus, a unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided in the components and "units" may be combined into fewer components and "units" or further separated into additional components and "units". In addition, the components and "units" may be implemented such that they are executed on one or more central processing units (CPUs) in a device or a secure multimedia card.

In embodiments of the disclosure, a base station (BS), which is an entity that allocates resources to a user equipment (UE), may be at least one of a next generation Node B (gNode B or gNB), an evolved Node B (eNode B or eNB), a Node B, a radio access unit, a base station controller (BSC), or a network node. In addition, the BS may be a network entity including at least one of an integrated access and backhaul (IAB)-donor that is a gNB providing network access to UE(s) through a network of backhaul and access links or an IAB-node that is a radio access network (RAN) node supporting NR access link(s) to UE(s) and supporting NR backhaul links to the IAB-donor or another IAB-node in a new radio (NR) system. A UE may be wirelessly connected through an IAB-node and transmit and receive data to and from an LAB-donor connected to at least one IAB-node via a backhaul link.

Further, the UE may include a terminal, a mobile station (MS), a cellular phone, a smart phone, a computer, or various devices capable of executing a communication function. In the disclosure, a downlink (DL) is a wireless transmission path in a signal is transmitted from a BS to a UE, and an uplink (UL) is a wireless transmission path in which a signal is transmitted from a UE to a BS. While a long term evolution (LTE) or LTE-advanced (LTE-A) system may be described below as an example, embodiments of the disclosure are applicable to other communication systems having a similar technical background or channel structure. For example, the communication systems may include 5th generation (5G) mobile communication technology (5G NR) developed after LTE-A, and 5G may be a concept encompassing legacy LTE, legacy LTE-A, and other similar services in the following description. Further, the disclosure is also applicable to other communication systems through some modifications without greatly departing from the scope of the disclosure as judged by those skilled in the art.

The disclosure proposes an apparatus and method for providing interworking for a network slice (or network slicing) in a wireless communication system. Specifically, a description will be given of a technique of interworking between a 5G network system providing a network slicing function and an evolved packet system (EPS) network system in a wireless communication system) according to the disclosure. In the disclosure, the 5G network system may also be referred to as a first wireless communication system, the EPS network system may also be referred to as a second wireless communication system, and the two systems may be collectively referred to as a wireless communication system.

Terminology signifying signals, terminology signifying channels, terminology signifying control information, terminology signifying network entities, and terminology signifying components of a device as used in the following description are given for convenience of description. Further, terminology identifying nodes, terminology signifying messages, terminology signifying interfaces between network entities, terminology signifying various pieces of information, and so on as used in the following description are given for convenience of description. Accordingly, the disclosure is not limited to the terms described below, and the terms may be replaced by other equivalent terms in technical meanings.

Further, while various embodiments are described by using terms defined in some communication standards (e.g., 3GPP) in the disclosure, they are merely exemplary for illustrative purposes. Various embodiments of the disclosure may be readily modified and applied to other communication systems.

The 3GPP has standardized a 5G network system architecture and procedures. Mobile communication operators may provide various services in a 5G network. To provide the services, the mobile communication operators need to satisfy different service requirements (e.g., latencies, communication ranges, data rates, bandwidths, reliability, and so on) for the different services. In the disclosure, a technique of supporting various services by using a network slice in a wireless communication system will be described.

In a wireless communication system supporting network slicing, traffic for different network slices may be processed by different protocol data unit (PDU) sessions. A PDU session may refer to association between a data network providing a PDU connection service and a UE. The network slicing may be understood as a technology of logically configuring a network with a set of network functions (NFs) to support various services with different characteristics, such as mission critical services including broadband communication services, massive Internet of things (IoT), and vehicle-to-everything (V2X), and separating different network slices. Therefore, despite occurrence of a communication failure in one network slice, communication in other network slices is not affected, thereby enabling provisioning of a stable communication service. In the disclosure, "slice" and "network slice" may be used interchangeably in the same meaning. In this network environment, when a UE receives various services, the UE may access multiple network slices. An NF, which is a software instance driven in hardware, may be implemented as an instantiated virtual function in a network element or an appropriate platform.

A mobile communication operator may configure network slices and allocate network resources suitable for a specific service on a network slice basis or on a network slice set basis. A network resource may refer to an NF, a logical resource provided by the NF, or a radio resource allocation of a BS.

For example, the mobile communication operator may configure network slice A to provide a mobile broadband service, network slice B to provide a vehicle communication service, and network slice C to provide an IoT service. That is, the 5G network may efficiently provide each service through a network slice specialized for the characteristics of the service in this manner.

FIG. 1 is a diagram illustrating an exemplary configuration of a network slice-related information element (IE) according to an embodiment of the disclosure.

A single-network slice selection assistance information (S-NSSAI) defined by the 3GPP may be used as an identifier (or identification information) that identifies a network slice. FIG. 1 illustrates an example of the configuration of an S-NSSAI IE. One S-NSSAI may include at least one of a slice/service type (SST) 116 used in a home public land mobile network (HPLMN), a slice differentiator (SD) 118 used in the HPLMN, an SST 112 used in a serving PLMN, and an SD 114 used in the serving PLMN. The S-NSSAI IE may further include a field 110 indicating the length of the contents of the S-NSSAI IE.

In a non-roaming situation, the SST 112 used in the serving PLMN may be identical to the SST 116 used in the HPLMN, and the SD 114 used in the serving PLMN may be identical to the SD 118 used in the HPLMN.

In a roaming situation, the SST 112 used in the serving PLMN may be an SST used in a visited PLMN (VPLMN), and the SD 114 used in the serving PLMN may be an SD used in the VPLMN.

There may be or may not be a value for each SST and each SD in one S-NSSAI depending on a situation.

A network slice selection assistance information (NSSAI) may include one or more S-NSSAIs. Examples of the NSSAI may include a configured NSSAI stored in a UE, a requested NSSAI requested by a UE, an allowed NSSAI which is determined by an NF (e.g., an access and mobility function (AMF), a user plane function (UPF), a policy control function (PCF), a user data management (UDM), a user data repository (UDR), a network slice selection function (NSSF), or the like) in a 5G core network and allowed to be used by a UE, and a subscribed NSSAI subscribed by a UE. These NSSAIs are merely exemplary, not limiting the examples of the NSSAI.

A mobile communication operator may operate both of a 5G network and an EPS network (called an LTE-based network or a 4G network). A UE may access the 5G network, use a service in the 5G network, and then move to the EPS network. Alternatively, the UE may access the EPS network, use a service in the EPS network, and then move to the 5G network. Interworking between networks (systems), which is related to movement of the UE, may be referred to as 5G core (5GC)-EPC interworking or 5G system (5GS)-EPS interworking.

The disclosure proposes an example of a method of interworking between a 5G network system providing network slicing and an EPS network system (i.e., 5GS-EPS interworking or 5GC-EPC interworking).

Further, a description will be given of examples of a network operation and a UE operation which allow a UE to use a service seamlessly, when the UE establishes a session connection in a 5GS, uses a communication service in the 5GS, and then moves to an EPS or when the UE establishes a session connection in the EPS, uses a communication service in the EPS, and then moves to the 5GS.

Figure 2:
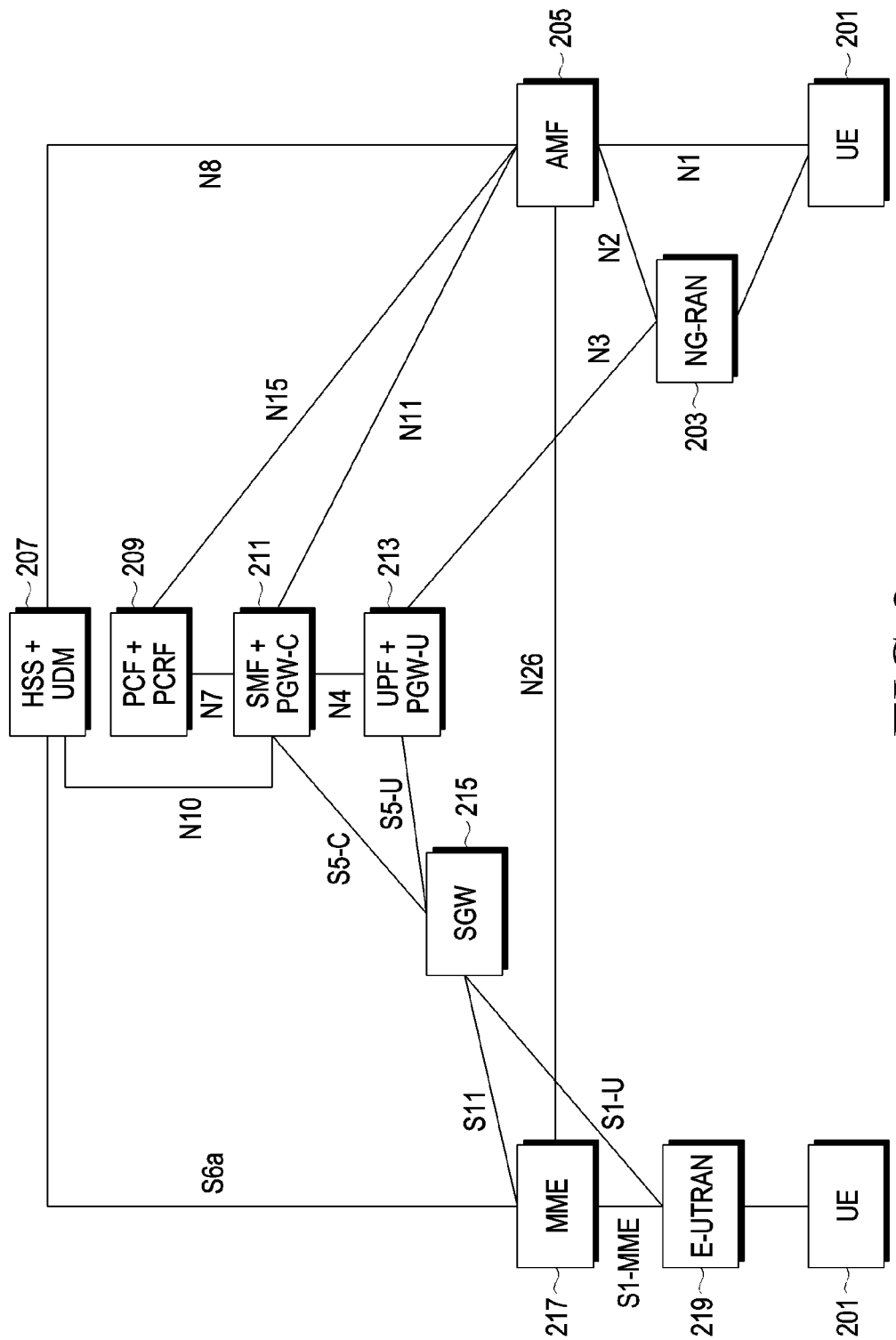
FIG. 2 is a diagram illustrating the structure of a wireless communication system supporting interworking between networks, for using a network slice related to an embodiment of the disclosure.

FIG. 2 is a diagram illustrating the structure of a wireless communication system supporting interworking between networks, for using a network slice according to an embodiment of the disclosure.

In the disclosure, standard specifications (e.g., TS 23.501, TS 23.502, TS 23.503, and so on) defined by the international telecommunication union (ITU) or the 3GPP may be referred to for the network technology, and each of the components included in the network structure of FIG. 2 may be a physical entity, or software or a combination of hardware and software that executes an individual function. Reference numeral Nx such as N1, N2, N3, . . . in FIG. 2 indicates a known interface between NFs in a 5G core network (CN), and a standard specification (TS 23.501) may be referred to for a related description. Accordingly, a detailed description of the interfaces will not be provided herein. NFs which are not directly related to the disclosure will not be illustrated/described.

FIG. 2 illustrates an example of a 5GS-EPS interworking structure in a non-roaming situation. A 5GS may include a new radio (NR) BS (next generation-radio access network (NG-RAN) or gNB) 203, an access and mobility management function (AMF) 205, a session management function (SMF), a user plane function (UPF), a policy control function (PCF), a network slice selection function (NSSF), a unified data management (UDM), a unified data repository (UDR), and so on, for wireless access of a UE 201. An EPS may include an evolved universal mobile telecommunications system (UMTS) terrestrial radio access (E-UTRA) BS (E-UMTS radio access network (E-UTRAN) or eNB) 219, a mobility management entity (MME) 217, a serving gateway (SGW) 215, a packet data network gateway (PGW including a PGW-U and a PGW-C), a policy and charging rule function (PCRF), a home subscriber server (HSS), and so on.

According to an embodiment, the AMF 205 and the MME 217 are NFs that manage wireless network access and mobility for a UE. The SMF, SGW, and PGW are NFs that manage a session for the UE, and session information includes quality of service (QoS) information, charging information, and packet processing information. The UPF and the PGW are NFs that process user-plane traffic and are under control of the SMF and the SGW. The PCF and the PCRF are NFs that manage an operator policy and/or a PLMN policy for providing a service in a wireless communication system. Additionally, the PCF may be divided into a PCF responsible for an access and mobility (AM) policy and a UE policy, and a PCF responsible for a session management (SM) policy. The PCF responsible for the AM/UE policy and the PCF responsible for the SM policy may be separate logical or physical NFs or one logical or physical NF. The UDM and the HSS are NFs that store and manage UE subscription data. The UDR is an NF or database (DB) that stores and manages data. The UDR may store UE subscription data and provide the UE subscription data to the UDM. In addition, the UDR may store operator policy information and provide the operator policy information to the PCF. The NSSF may be an NF that selects network slice instances servicing the UE or determines an NSSAI.

An instance may refer to a state in which an NF exists in the form of software code, and to execute the function of the NF in a physical computing system (e.g., a specific computing system existing in a CN), physical and/or logical resources are allocated by the computing system and thus the function of the NF is executable. For example, an AMF instance, an SMF instance, an NSSF Instance, or the like refers to a state in which physical and/or logical resources may be allocated for the operation of the AMF, the SMF, the NSSF, or the like from a specific computing system in the CN and thus usable. Therefore, physical AMF, SMF, and NSSF devices may perform the same operations as an AMF instance, an SMF instance, and an NSSF instance to which physical and/or logical resources for AMF, SMF, and NSSF operations are allocated by a specific computing system in the network.

The UDM of the 5GS and the HSS of the EPS may be configured as one combination (combo) node (referred to as UDM+HSS) 207. The UDM+HSS node 207 may store UE subscription data. The SMF of the 5GS and the PGW-C of the EPS may be configured as one combo node (referred to as SMF+PGW-C) 211. The PCF of the 5GS and the PCRF of the EPS may be configured as one combo node (referred to as PCF+PCRF) 209. The UPF of the 5GS and the PGW-U of the EPS may be configured as one combo node (referred to as UPF+PGW-C) 213. The UE 201 may use an EPS network service by accessing the MME 217 of the EPS through the E-UTRAN or eNB 219. In addition, the UE 201 may use a 5GS network service by accessing the AMF 205 of the 5GS through the NR-RAN or gNB 203.

As such, one NF or network entity may support different network systems at the same time, and this NF, network node, or network entity may be referred to as a combo node as described above, a combo NF, a combined node, a combined NF, an interworking node, an interworking NF, or the like. In addition, the function of an NF exemplified as a combo node may be executed through interworking between two or more network entities. In addition, for convenience of illustration and description, an NF simultaneously supporting different network systems may be indicated by using a "+" sign or a "/" sign. For example, when the SMF and the PGW-C are configured as one combo node, the combo node may be expressed as a PGW-C/SMF, a PGW-C+SMF, an SMF/PGW-C, or an SMF+PGW-C.

The UE establishes a session by accessing a data network (e.g., a network that provides the Internet service) through the 5GS or EPS system. The UE may identify each data network by an identifier called a data network name (DNN) or an access point name (APN). To distinguish data networks from each other, the 5GS may use a DNN, and the EPS may use an APN. The DNN and the APN may be used for the UE to determine a user plane-related NF, an interface between NFs, an operator policy, and so on, when the UE connects a session with a network system. The DNN and the APN may be understood as equivalent information and convey the same information. The DNN may be used, for example, to select an SMF and UPF(s) for a PDU session, and to select interface(s) (e.g., N6 interface(s)) between a data network and a UPF for a PDU session. Further, the DNN may be used to determine a policy of a mobile communication operator, for application to a PDU session.

In the 5GS, the UE may be connected to one data network through at least one network slice. When the UE moves to the EPS after establishing a PDU session connection with some data network through a plurality of network slices in the 5GS, the UE may select one network slice according to the determination of the SMF+PGW-C node 211 and establish a packet data network (PDN) session with the data network.

The disclosure proposes, when a change occurs to network slice-related subscription information about a UE which has established a session connection with the EPS and is receiving a communication service in the EPS, a network operation and a UE operation which enable application of the change to a connected session. The UE may have been registered as a subscriber to the 5GS.

To apply the change of the network slice-related subscription information which has occurred during use of the session connection established with the EPS to the on-going session, an operation of largely 2 steps is performed. One of the steps is to transmit a notification of the change of the network slice-related subscription information to an NF responsible for session management, and the other step is to apply the change to the session in the EPS in which the current session has been connected and is progressing according to the determination of the NF responsible for session management or to wait without any action in the EPS and then apply the change, when the UE moves to the 5GS and establishes a session again in the 5GS.

Regarding the network slice, the operation of the network system is performed in the 5GS, and the EPS performs an operation of preventing loss of network slice-related subscription information about the UE. As described above, the network slice-related subscription information may be stored as a kind of subscription data, for example, subscribed S-NSSAI(s) in the UDR. In addition, the NF responsible for session management may be, for example, the SMF+PGW-C node in the 5GS-EPS system.

The network slice-related subscription information may be changed at any time, even when the UE has established a session with any of the 5GS and the EPS.

In embodiments of the disclosure, the following methods (1), (2), and (3) are proposed as examples of a method of notifying an NF responsible for session management of a change of network slice-related subscription information. In embodiments of the disclosure, the terms subscription information and subscription data are used interchangeably in the same meaning:

(1) a method of using a subscription data update;
(2) a method of using a policy update; and
(3) a method of using an APN information update.

A detailed description will be given later of the methods (1), (2) and (3).

In a conventional EPS system, when a UE establishes a new session, the UE receives network slice-related subscription information from an entity responsible for session management (e.g., PGW) by Protocol Configuration Options (PCO). The PCO may be included in various messages for a PDN connection request, a bearer request, and so on. For a basic description of the PCO, refer to 3GPP TS 24.008. The UE may store the network slice-related subscription information as a part of the PCO. When the UE then moves to the 5GS, the UE may request use of a network slice based on this information. Accordingly, there is a need for a procedure of modifying or releasing an on-going session according to the change of the network slice-related subscription information that has occurred after a session was completely established. The disclosure proposes the following methods (a) and (b) as examples of a method of applying a change of network slice-related subscription information to an on-going session:

(a) a method of releasing the on-going session in the EPS;
(b) a method of modifying the on-going session in the EPS; and
(c) a method of taking no action in the EPS, and when the UE then moves to the 5GS, establishing a session according to the change of the subscription information by the UE.

A detailed description will be given later of the methods (a) and (b).

Among NF services provided by the SMF that manages the session, service operations related to a PDU session are defined in the 5G standard (TS 23.502) as shown in Table 1 below.

TABLE 1

| NF services provided by the SMF | | | |
| --- | --- | --- | --- |
| Service Name | Service Operations | Operation Semantics | Example Consumer(s) |
| Nsmf_PDUSession | Create | Request/Response | V-SMF/I-SMF |
| | Update | Request/Response | V-SMF/I-SMF, H-SMF |

TABLE 1-continued

NF services provided by the SMF

| Service Name | Service Operations | Operation Semantics | Example Consumer(s) |
|---|---|---|---|
| | Release | Request/Response | V-SMF/I-SMF |
| | CreateSMContext | Request/Response | AMF |
| | UpdateSMContext | Request/Response | AMF |
| | ReleaseSMContext | Request/Response | AMF |
| | SMContextStatusNotify | Subscribe/Notify | AMF |
| | StatusNotify | Subscribe/Notify | V-SMF/I-SMF |
| | ContextRequest | Request/Response | AMF, I-SMF, SMF |
| | ContextPush | Request/Response | SMF |
| | SendMOData | Request/Response | AMF |
| | TransferMOData | Request/Response | V-SMF/I-SMF |
| | TransferMTData | Request/Response | SMF, H-SMF |

The 5G system structure illustrated FIG. 2 supports service-based interfaces, and the service-based interfaces related to the SMF are defined by 'Nsmf' as illustrated in Table 1 above. In Table 1, 'Nsmf_PDUSession' means a service operating in a PDU session, and the service includes creation/deletion/modification of the PDU session, and these operations may be performed through transmission and reception of a PDU session request message and a PDU session response message between the AMF and the SMF. As shown in the example of Table 1, the SMF may receive an 'Nsmf_PDUSession_CreateSMContext' request message, which is a PDU session request message, from the AMF, and transmit an 'Nsmf_PDUSession_CreateSMContext' response message to the AMF in response to the 'Nsmf_PDUSession_CreateSMContext' request message, in an operation of creating association between the AMF and the SMF to support a PDU session. For other service operations in Table 1, refer to related standards and their detailed description will be avoided herein.

The proposed embodiments will be described on the premise that some or all of the above-described various methods and combinations thereof are supported. Since each NF basically operates in the embodiments of FIGS. 3 to 26 in the same manner as its counterpart described before with reference to FIG. 2, a detailed description of the NF will be avoided herein. The embodiments of FIGS. 3 to 26 are based on the assumption that a UE has subscribed to a 5GS, which is a first wireless communication system (or first network), has moved from the 5GS to an EPS which is a second wireless communication system (or second network), and has been connected to then E-UTRAN in the EPS. The following embodiments are described with the appreciation that combo nodes such as a UDM+HSS node, a PCF+PCRF node, an SMF+PGW-C node, and a UPF+PGW-C node are called without "node" in their appellations, for convenience of description. Further, in the following embodiments, the definition of a message in one embodiment may be applied in the same meaning to other embodiments using the same message. In addition, although the embodiments of FIGS. 3 to 26 have been separately described for convenience of description, the embodiments may be implemented individually or in combination of two or more thereof.

Figure 3:
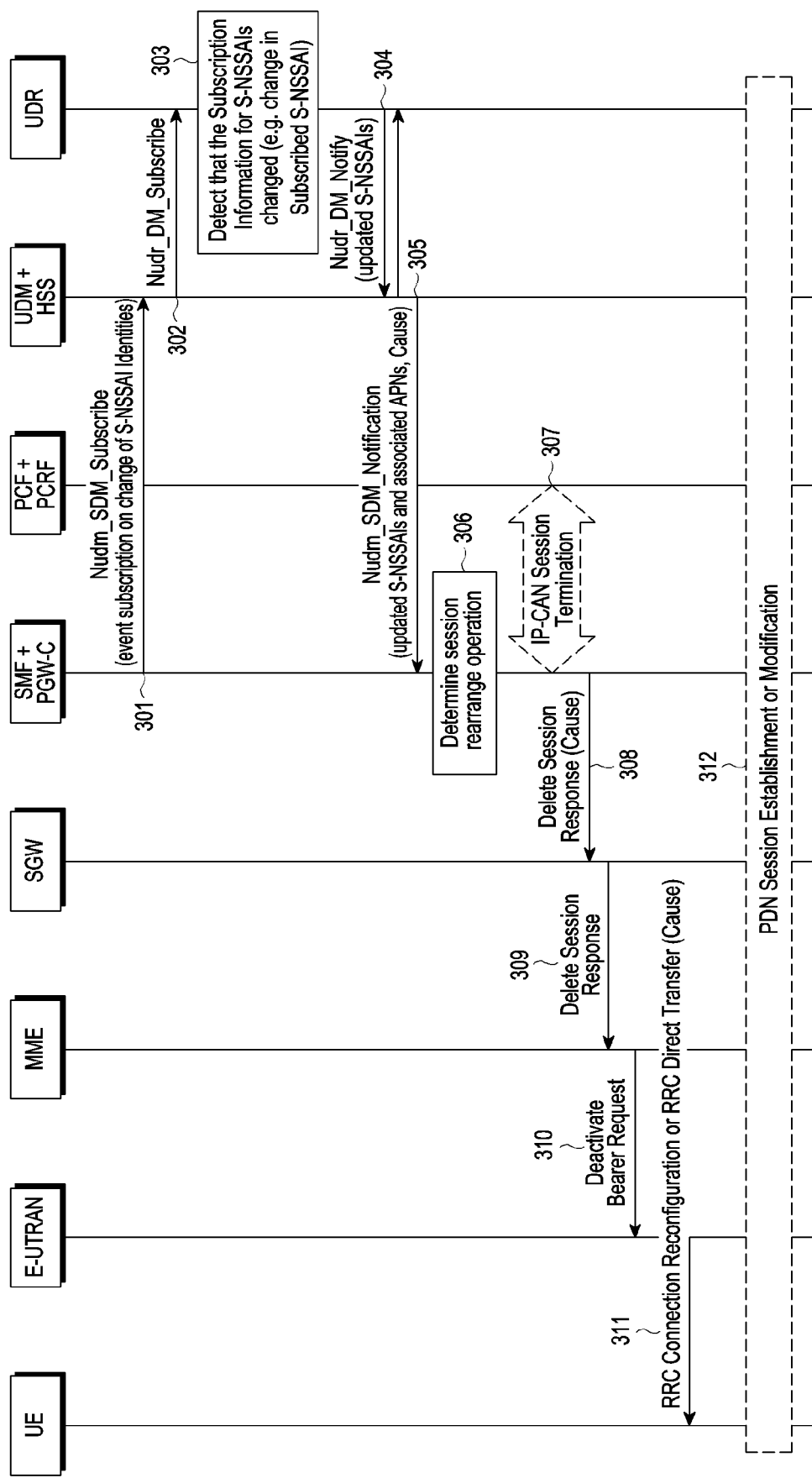
FIG. 3 is a diagram illustrating a signal flow for a subscription data update-based session release method according to an embodiment of the disclosure.

FIG. 3 is a diagram illustrating a signal flow for a subscription data update-based session release method according to an embodiment of the disclosure.

Referring to FIG. 3, the UDM+HSS may receive updated subscribed S-NSSAI information from the UDR and then transmit the updated subscribed S-NSSAI information and information about an APN associated with a corresponding S-NSSAI to the SMF+PGW-C. The SMF+PGW-C may determine whether there is any other substitute S-NSSAI that may enable the UE to access the APN. In the absence of any other substitute S-NSSAI, the SMF+PGW-C may release a session, indicating the cause of the session release to the UE.

Specifically, the SMF+PGW-C transmits a Nudm_SDM_subscribe message to the UDM+HSS in step 301. The Nudm_SDM_subscribe message is a message that subscribes to information about a change of subscription data. The Nudm_SDM_subscribe message may include information indicating transmission of information about a changed or deleted subscribed S-NSSAI to the SMF+PGW-C which has transmitted the Nudm_SDM_subscribe message, upon occurrence of an event of the change or deletion of the subscribed S-NSSAI for the UE.

A service-based interface related to the UDM is defined by 'Nudm' as noted from the appellation of the Nudm_SDM_subscribe message, and Nudm_subscriber data management (SDM) is one of services provided by the UDM+HSS. The UDM+HSS may allow the SMF+PGW-C to detect subscription data of the UE and provide updated subscription data to the SMF+PGW-C, through the Nudm_SDM, when needed.

In step 302, the UDM+HSS transmits a Nudr_DM_subscribe message to the UDR, requesting a notification of a change of the subscription data of the UE, when the subscription data of the UE is changed. A service-based interface related to the UDR is defined by 'Nudr' as noted from the appellation of the Nudr_DM_subscribe message, and Nudr_data management (DM) is one of services provided by the UDR. Regarding data stored in the UDR, the UDR may perform detection, generation, update, subscription to a change notification, cancelation of the subscription to a change notification, and/or deletion though the Nudr_DM.

In various embodiments of the disclosure, it is also possible to use a Nudr_DataRepository_subscribe message disclosed in TS 29.513, instead of the Nudm_SDM_subscribe message and/or the Nudr_DM_subscribe message. For example, the Nudm_SDM_subscribe message and/or the Nudr_DM_subscribe message may be used in a network registration procedure of the UE, and the Nudr_DataRepository_subscribe message may be used in a session establishment procedure or session modification procedure of the SMF+PGW-C.

When the UDR that has received the Nudr_DM_subscribe message detects that a change has occurred in subscription data for S-NSSAIs in step 303, the UDR notifies the UDM+HSS of the result of the change of the subscribed S-NSSAIs by transmitting a Nudr_DM_notify message to the UDM+HSS in step 304. The change result may include the updated subscribed S-NSSAI(s) (hereinafter, referred to as updated S-NSSAI(s)) for the UE.

In various embodiments of the disclosure, it is also possible to use the Nudr_DataRepository_Notify message disclosed in TS 29.513, instead of the Nudr_DM_notify message. For example, the Nudr_DM_notify message may be used in the network registration procedure of the UE, and the Nudr_DataRepository_Notify message may be used in the session establishment procedure or session modification procedure of the SMF+PGW-C.

In step 305, the UDM+HSS which has received the Nudr_DM_notify message transmits, to the SMF+PGW-C, a Nudm_SDM_Notification message including at least one of the updated S-NSSAI(s) received as the change result, information about APN(s) associated with the updated S-NSSAI(s) (that is, information about APN(s) connected to the updated subscribed S-NSSAI(s)), or cause information (e.g., a Cause value) about the subscription data change. For example, on the assumption of S-NSSAI A, S-NSSAI B, and S-NSSAI C as the subscribed S-NSSAIs for the UE, when S-NSSAI A and S-NSSAI B are connected to APN 1, and S-NSSAI C is connected to APN 2, S-NSSAI C may be deleted from a subscribed S-NSSAI list as a result of a change in subscription data in the UDR. In this case, the UDM+HSS may transmit, to the SMF+PGW-C, the subscribed S-NSSAI list from which S-NSSAI C has been deleted, information about APN 1 associated with S-NSSAI A and S-NSSAI B, and cause information (e.g., a Cause value) indicating that this change is attributed to a change in the subscribed S-NSSAIs, not a change in the APNs, by transmitting a Nudm_SDM_Notification message to the SMF+PGW-C.

In step 306, upon receipt of the Nudm_SDM_Notification message from the UDM+HSS, the SMF+PGW-C may identify the cause information (e.g., the Cause value) in the received message and determine a method of adjusting an on-going PDN session based on the information included in the received message. The determination method is performed in the following processes 1-1) to 1-4).

1-1) It is identified whether any S-NSSAI has been deleted from the subscribed S-NSSAI list.

1-2) There is a deleted S-NSSAI and it is determined whether there is any on-going PDN session connected to an APN associated with the deleted S-NSSAI.

1-3) In the presence of an on-going PDN session connected to the APN, it is identified whether there is any other substitute S-NSSAI available for accessing the APN in the subscribed S-NSSAI list.

1-4) When one S-NSSAI is available for accessing the APN and corresponds to the deleted S-NSSAI, or when there are a plurality of S-NSSAIs available for accessing the APN but none of the available S-NSSAIs are included in the subscribed S-NSSAI list received from the UDM+HSS in step 305, the SMF+PGW-C determines to release all PDN sessions connected to the APN. According to the example described in relation to step 305, S-NSSAI C has been deleted from the subscription data, and there is no other S-NSSAI available for accessing APN 2. Therefore, the SMF+PGW-C may determine to release all PDN sessions connected to APN 2.

In step 307, the SMF+PGW-C requests the PCF+PCRF to release/terminate the PDN sessions (e.g., IP connectivity access network (IP-CAN) sessions) connected to the APN according to the result of the determination made in step 306, to thereby release/terminate the PDN sessions. An IP-CAN session refers to association between a UE and an IP network (i.e., APN).

Subsequently in steps 308 to 311, the SMF+PGW-C allows the UE to release the PDN sessions and deactivate EPS bearers through the SGW, the MME, and the E-UTRAN. In this case, the SMF+PGW-C may notify the UE that the cause of the release/termination of the PDN sessions is not unavailability of the APN to the UE but a change in network slice-related information, as in step 305.

In step 312, the UE may then re-establish or change the PDN sessions for the APN based on the cause information (the Cause value) received from the SMF+PGW-C via the EPS. The UE and/or the network may start or may start and end the operation of re-establishing or changing the PDN sessions for the APN within a predetermined time set by the UE and/or the network. The predetermined time may be set individually for each of the UE and the network, or may be signaled to the UE by signaling (e.g., RRC signaling, system information, or the like) from the network. Further, when the UE re-establishes or changes the PDN sessions, the UE may assign IDs that have not been used previously as PDN session IDs and PDU session IDs corresponding to the PDN session IDs. The operation of the UE and/or the operation of the network may be applied equally to other embodiments to be described later.

Figure 4:
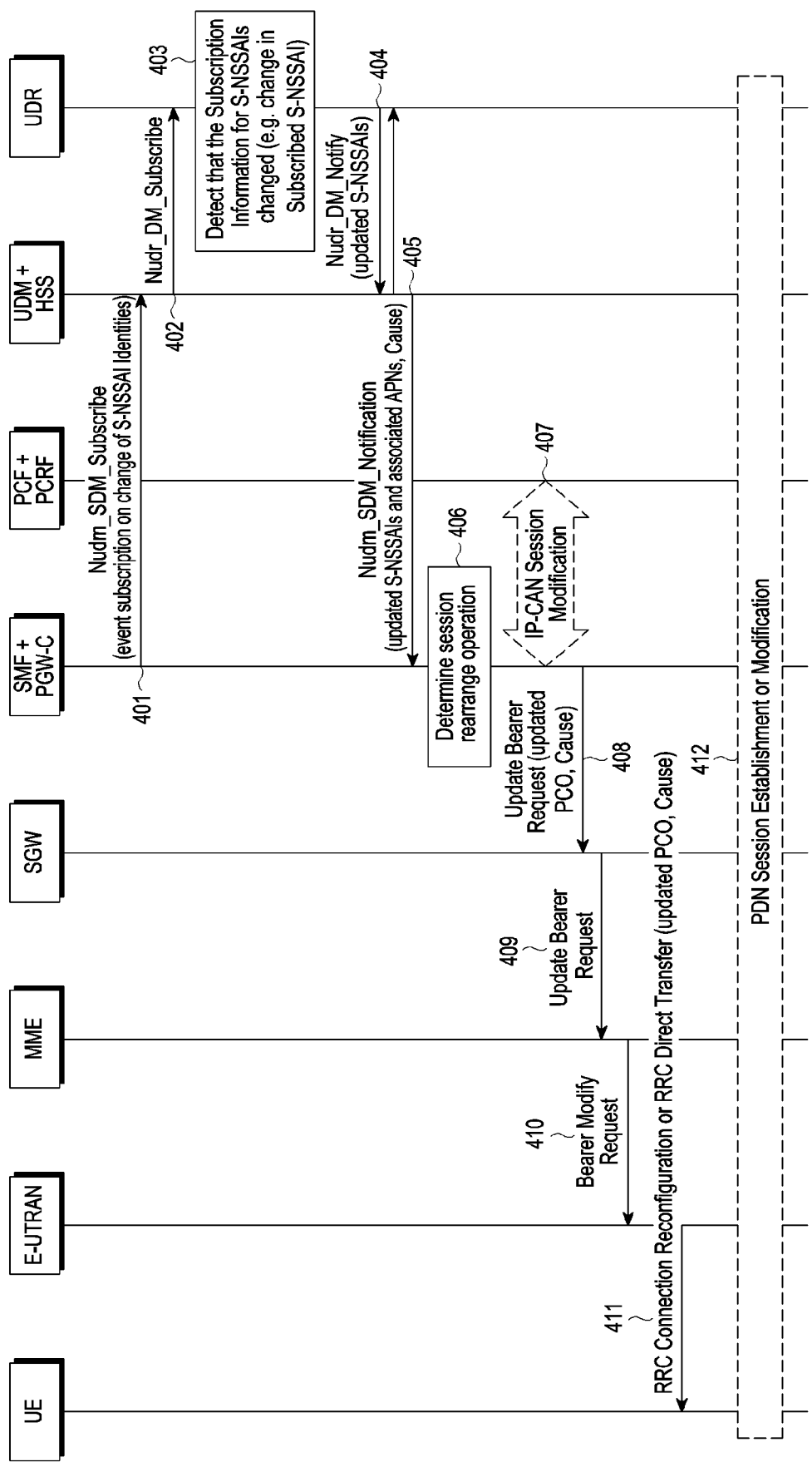
FIG. 4 is a diagram illustrating a signal flow for a subscription data update-based session modification method according to an embodiment of the disclosure.

FIG. 4 is a diagram illustrating a signal flow for a subscription data update-based session modification method according to an embodiment of the disclosure.

Referring to FIG. 4, the UDM+HSS may receive updated subscribed S-NSSAI information from the UDR and then transmit the updated subscribed S-NSSAI information and information about an APN associated with a corresponding S-NSSAI to the SMF+PGW-C. The SMF+PGW-C may determine whether there is any other substitute S-NSSAI that may enable the UE to access the APN. In the presence of any substitute S-NSSAI, the SMF+PGW-C may modify a session, indicating the cause of the session modification and the changed S-NSSAI to the UE.

Specifically, the SMF+PGW-C transmits a Nudm_SDM_subscribe message to the UDM+HSS in step 401. The Nudm_SDM_subscribe message is a message that subscribes to information about a change of subscription data. The Nudm_SDM_subscribe message may include information indicating transmission of information about a changed or deleted subscribed S-NSSAI to the SMF+PGW-C which has transmitted the Nudm_SDM_subscribe message, upon occurrence of an event of the change or deletion of the subscribed S-NSSAI for the UE.

In step 402, the UDM+HSS transmits a Nudr_DM_subscribe message to the UDR, requesting a notification of a change of the subscription data of the UE, when the subscription data of the UE is changed.

When the UDR that has received the Nudr_DM_subscribe message detects that a change has occurred in subscription data for S-NSSAIs in step 403, the UDR notifies the UDM+HSS of the result of the change of subscribed S-NSSAIs by transmitting a Nudr_DM_notify message to the UDM+HSS in step 404. The change result may include the updated S-NSSAI(s) for the UE.

In step 405, the UDM+HSS which has received the Nudr_DM_notify message transmits, to the SMF+PGW-C, a Nudm_SDM_Notification message including at least one of the updated S-NSSAI(s) received as the change result, information about APN(s) associated with the updated S-NSSAI(s) (that is, information about APN(s) connected to the updated subscribed S-NSSAI(s)), or cause information (e.g., a Cause value) about the subscription data change. For example, it may be assumed S-NSSAI A, S-NSSAI B, and S-NSSAI C are the subscribed S-NSSAIs for the UE, S-NSSAI A and S-NSSAI B are connected to APN 1, and S-NSSAI C is connected to APN 2, and S-NSSAI A is deleted from a subscribed S-NSSAI list as a result of a change in subscription data in the UDR. In this case, the UDM+HSS may transmit, to the SMF+PGW-C, the subscribed S-NSSAI list from which S-NSSAI A has been deleted, information about APN 1 associated with S-NSSAI A and S-NSSAI B, and cause information (e.g., a Cause value) indicating that this change is attributed to a change in the subscribed S-NSSAIs, not a change in the APNs by transmitting a Nudm_SDM_Notification message to the SMF+PGW-C.

In step 406, upon receipt of the Nudm_SDM_Notification message from the UDM+HSS, the SMF+PGW-C may identify the cause information (e.g., the Cause value) in the received message and determine a method of adjusting an on-going PDN session based on the information included in the received message. The determination method is performed in the following processes 2-1) to 2-4).

2-1) It is identified whether any S-NSSAI has been deleted from the subscribed S-NSSAI list.

2-2) There is a deleted S-NSSAI and it is determined whether there is any on-going PDN session connected to an APN associated with the deleted S-NSSAI.

2-3) In the presence of an on-going PDN session connected to the APN, it is identified whether there is any other S-NSSAI available for accessing the APN in the subscribed S-NSSAI list.

2-4) When at least one S-NSSAI other than the deleted S-NSSAI is available for accessing the APN and is included in the subscribed S-NSSAI list received from the UDM+HSS in step 405, the SMF+PGW-C determines to modify all PDN sessions connected to the APN, to thereby access the APN with the other S-NSSAI available for accessing the APN and included in the subscribed S-NSSAI list. For example, when APN 1 is accessible with S-NSSAI A and S-NSSAI B, and S-NSSAI A is deleted from the subscribed S-NSSAI list as described above, all PDN sessions connected to APN 1 may be modified such that instead of S-NSSAI A, S-NSSAI B is associated with APN 1.

In step 407, the SMF+PGW-C requests the PCF+PCRF to modify PDN sessions (e.g., IP-CAN sessions) connected to the APN according to the result of the determination made in step 406, to thereby modify the PDN sessions.

Subsequently in steps 408 to 411, the SMF+PGW-C may allow the UE to modify the PDN sessions and modify EPS bearers through the SGW, the MME, and the E-UTRAN. In this case, the SMF+PGW-C may notify the UE that the cause of the modification of the PDN sessions is not unavailability of the APN to the UE but a change in network slice-related information, as in step 405. Further, the SMF+PGW-C may transmit information about S-NSSAIs associated with the PDN sessions in a modified and thus updated PCO to the UE. Further, the SMF+PGW-C may transmit updated subscribed S-NSSAI information received from the UDM+HSS in the updated PCO to the UE. When it has already been determined that S-NSSAI B is associated with APN 1 at the time of initially establishing PDN sessions for APN 1, steps 407 to 411 may be skipped.

In step 412, the UE may then re-establish or change the PDN sessions for the APN based on the cause information (the Cause value) received from the SMF+PGW-C via the EPS. The UE and/or the network may start or may start and end the operation of re-establishing or changing the PDN session for the APN within a predetermined time set by the UE and/or the network. The predetermined time may be set individually for each of the UE and the network, or may be signaled to the UE by signaling (e.g., RRC signaling, system information, or the like) from the network. Further, when the UE re-establishes or changes the PDN sessions, the UE may assign IDs that have not been used previously as PDU session IDs.

Figure 5:
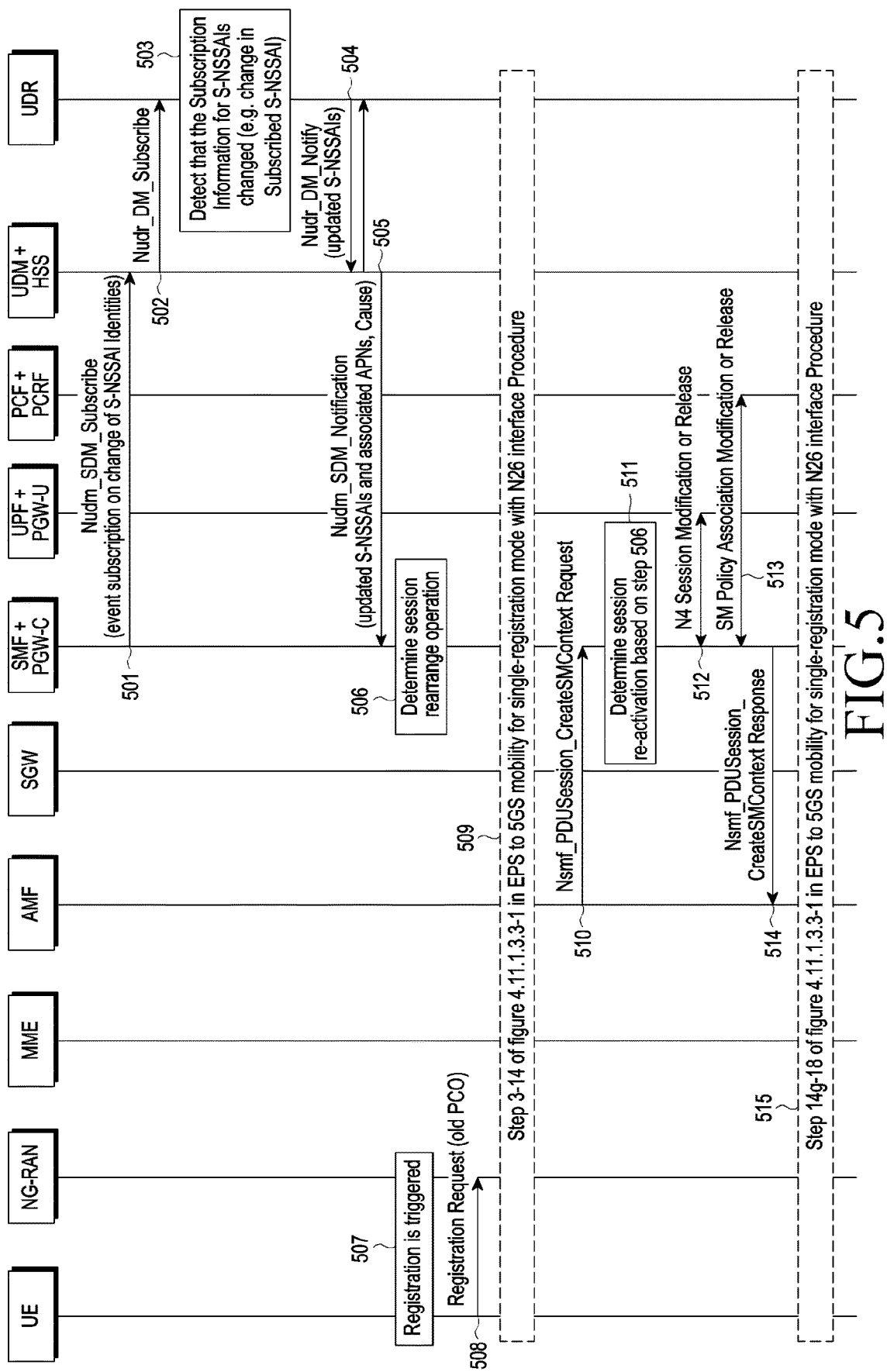
FIG. 5 is a diagram illustrating a signal flow for a subscription data update-based session modification method (when an N26 interface is used) according to an embodiment of the disclosure.

FIG. 5 is a diagram illustrating a signal flow for a subscription data update-based session modification method (when an N26 interface is used) according to an embodiment of the disclosure.

Referring to FIG. 5, the UDM+HSS may receive updated subscribed S-NSSAI information from the UDR and then transmit the updated subscribed S-NSSAI information and information about an APN associated with a corresponding S-NSSAI to the SMF+PGW-C. The SMF+PGW-C may determine whether there is any other substitute S-NSSAI that may enable the UE to access the APN, and then modify or release a related session, when the UE moves to the 5GS later.

Specifically, the SMF+PGW-C transmits a Nudm_SDM_subscribe message to the UDM+HSS in step 501. The Nudm_SDM_subscribe message is a message that subscribes to information about a change of subscription data. The Nudm_SDM_subscribe message may include information indicating transmission of information about a changed or deleted subscribed S-NSSAI to the SMF+PGW-C which has transmitted the Nudm_SDM_subscribe message, upon occurrence of an event of the change or deletion of the subscribed S-NSSAI for the UE.

In step 502, the UDM+HSS transmits a Nudr_DM_subscribe message to the UDR, requesting a notification of a change of the subscription data of the UE, when the subscription data of the UE is changed.

When the UDR that has received the Nudr_DM_subscribe message detects that a change has occurred in subscription data for S-NSSAIs in step 503, the UDR notifies the UDM+HSS of the result of the change of the subscribed S-NSSAIs by transmitting a Nudr_DM_notify message to the UDM+HSS in step 504. The change result may include the updated S-NSSAI(s) for the UE.

In step 505, the UDM+HSS which has received the Nudr_DM_notify message transmits, to the SMF+PGW-C, a Nudm_SDM_Notification message including at least one of the updated S-NSSAI(s) received as the change result, information about APN(s) associated with the updated S-NSSAI(s) (that is, information about APN(s) connected to the updated subscribed S-NSSAI(s)), or cause information (e.g., a Cause value) about the subscription data change. For example, on the assumption of S-NSSAI A, S-NSSAI B, and S-NSSAI C as the subscribed S-NSSAIs for the UE, when S-NSSAI A and S-NSSAI B are connected to APN 1, and S-NSSAI C is connected to APN 2, S-NSSAI C may be deleted from a subscribed S-NSSAI list as a result of a change in subscription data in the UDR. In this case, the UDM+HSS may transmit, to the SMF+PGW-C, the subscribed S-NSSAI list from which S-NSSAI C has been deleted, information about APN 1 associated with S-NSSAI A and S-NSSAI B, and cause information (e.g., a Cause value) indicating that this change is attributed to a change in the subscribed S-NSSAIs, not a change in the APNs by transmitting a Nudm_SDM_Notification message.

In step 506, upon receipt of the Nudm_SDM_Notification message from the UDM+HSS, the SMF+PGW-C may determine whether to release or modify PDN sessions according to the method of step 306 in the embodiment of FIG. 3 or the method of step 406 in the embodiment of FIG. 4.

Subsequently in step 507, along with movement of the UE, the UE or the NG-RAN may recognize that the UE has moved from the EPS to the 5GS, and a mobility registration procedure from the EPS to the 5GS is triggered.

In step 508, as the mobility registration procedure is triggered, the UE may transmit, to the NG-RAN, a Registration Request message including a PCO which was stored when the UE initially established a PDN session in the EPS. The PCO may not include information about a change in S-NSSAIs associated with used APNs or a subscribed S-NSSAI update as described in steps 501 to 506.

Subsequently in step 509, the UE which has moved from the EPS to the 5GS performs the registration procedure by using an N26 interface. The 5GS supporting interworking with the EPS may support an interworking procedure using the N26 interface. Section 4.11.1.3.3 and its related FIG. 4.11.1.3.3-1 in TS 23.502 (v16.6.0) disclose a mobility registration procedure from an EPS to a 5GS, which uses an N26 interface. As in step 509, part of the mobility registration procedure may be performed.

In step 510, the AMF requests the SMF+PGW-C to create an SM Context for PDU sessions during the mobility registration procedure. To request the SM Context creation, a 'Nsmf_PDUSession_CreateSMContext' request message which is a PDU session request message described in Table 1 may be used. In step 511, the SMF+PGW-C may determine to release or modify a PDN session connected to a corresponding DNN (APN) based on the determination of step 506.

Subsequently in steps 512, 513, and 514, the SMF+PGW-C releases or modifies an N4 session (a session between the SMF and the UPF) and an SM Policy Association according to the determination of step 511 and transmits a 'Nsmf_PDUSession_CreateSMContext' response message to the AMF in response to the 'Nsmf_PDUSession_CreateSMContext' request message received in step 510.

In step 515, the remaining operations of the mobility registration procedure are continuously performed by the method described in section 4.11.1.3.3 and its related FIG. 4.11.1.3.3-1 in TS 23.502 (v16.6.0), as illustrated in FIG. 5.

Figure 6:
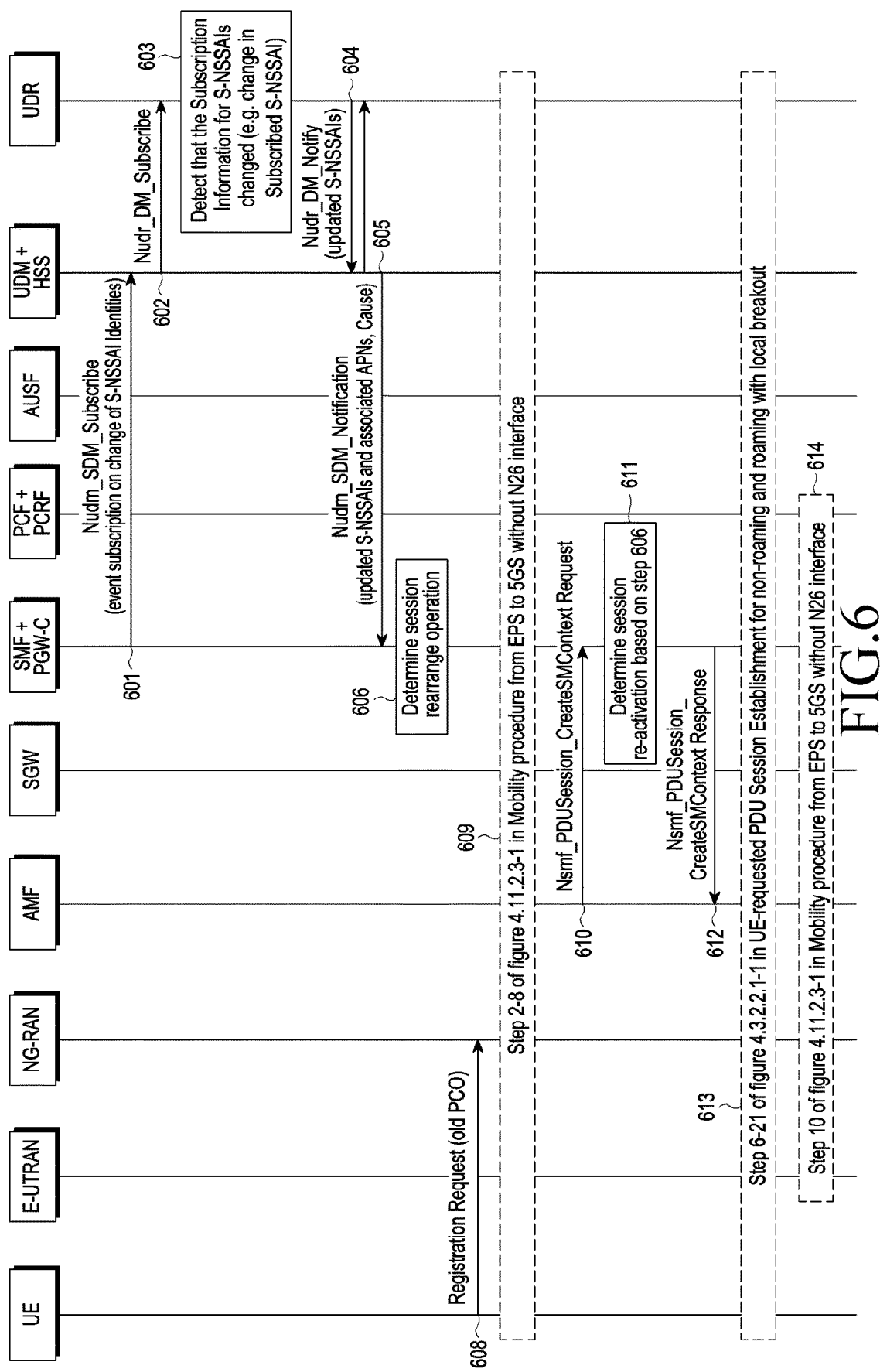
FIG. 6 is a diagram illustrating a signal flow for a subscription data update-based session modification method (when an N26 interface is not used) according to an embodiment of the disclosure.

FIG. 6 is a diagram illustrating a signal flow for a subscription data update-based session modification method (when an N26 interface is not used) according to an embodiment of the disclosure.

Referring to FIG. 6, the UDM+HSS may receive updated subscribed S-NSSAI information from the UDR and then transmit the updated subscribed S-NSSAI information and information about an APN associated with a corresponding S-NSSAI to the SMF+PGW-C. The SMF+PGW-C may determine whether there is any other substitute S-NSSAI that may enable the UE to access the APN, and then modify or release a related session, when the UE moves to the 5GS later.

Specifically, the SMF+PGW-C transmits a Nudm_SDM_subscribe message to the UDM+HSS in step 601. The Nudm_SDM_subscribe message is a message that subscribes to information about a change of subscription data. The Nudm_SDM_subscribe message may include information indicating transmission of information about a changed or deleted subscribed S-NSSAI to the SMF+PGW-C which has transmitted the Nudm_SDM_subscribe message, upon occurrence of an event of the change or deletion of the subscribed S-NSSAI for the UE.

In step 602, the UDM+HSS transmits a Nudr_DM_subscribe message to the UDR, requesting a notification of a change of the subscription data of the UE, when the subscription data of the UE is changed.

When the UDR that has received the Nudr_DM_subscribe message detects that a change has occurred in subscription data for S-NSSAIs in step 603, the UDR notifies the UDM+HSS of the result of the change of the subscribed S-NSSAIs by transmitting a Nudr_DM_notify message to the UDM+HSS in step 604. The change result may include the updated S-NSSAI(s) for the UE.

In step 605, the UDM+HSS which has received the Nudr_DM_notify message transmits, to the SMF+PGW-C, a Nudm_SDM_Notification message including at least one of the updated S-NSSAI(s) received as the change result, information about APN(s) associated with the updated S-NSSAI(s) (that is, information about APN(s) connected to the updated subscribed S-NSSAI(s)), or cause information (e.g., a Cause value) about the subscription data change. For example, on the assumption of S-NSSAI A, S-NSSAI B, and S-NSSAI C as the subscribed S-NSSAIs for the UE, when S-NSSAI A and S-NSSAI B are connected to APN 1, and S-NSSAI C is connected to APN 2, S-NSSAI C may be deleted from a subscribed S-NSSAI list as a result of a change in subscription data in the UDR. In this case, the UDM+HSS may transmit, to the SMF+PGW-C, the subscribed S-NSSAI list from which S-NSSAI C has been deleted, information about APN 1 associated with S-NSSAI A and S-NSSAI B, and cause information (e.g., a Cause value) indicating that this change is attributed to a change in the subscribed S-NSSAIs, not a change in the APNs by transmitting a Nudm_SDM_Notification message.

In step 606, upon receipt of the Nudm_SDM_Notification message from the UDM+HSS, the SMF+PGW-C may determine whether to release or modify PDN sessions according to the method of step 306 in the embodiment of FIG. 3 or the method of step 406 in the embodiment of FIG. 4.

Along with movement of the UE, the UE or the NG-RAN may recognize that the UE has moved from the EPS to the 5GS. In step 608, the UE may transmit, to the NG-RAN, a Registration Request message including a PCO which was stored when the UE initially established a PDN session in the EPS. The PCO may not include information about a change in S-NSSAIs associated with used APNs or a subscribed S-NSSAI update as described in steps 601 to 606. While step 507 of FIG. 5 is omitted in the example of FIG. 6 according to a selective embodiment, step 507 may be performed before step 608.

Subsequently in step 609, the UE which has moved from the EPS to the 5GS may start the registration procedure which does not use an N26 interface. The 5GS supporting interworking with the EPS may support an interworking procedure that does not use the N26 interface. Section 4.11.2.3 and its related FIG. 4.11.2.3-1 in TS 23.502 (v16.6.0) disclose a mobility registration procedure from an EPS to a 5GS, which does not use an N26 interface. As in step 609, part of the mobility registration procedure may be performed.

In step 610, the AMF requests the SMF+PGW-C to create an SM Context for PDU sessions during the mobility registration procedure. To request the SM Context creation, the 'Nsmf_PDUSession_CreateSMContext' request message which is a PDU session request message described in Table 1 may be used.

In step 611, the SMF+PGW-C may determine to establish a PDU session connected to a corresponding DNN (APN) based on the determination of step 606.

In step 612, the SMF+PGW-C creates the SM Context for the PDU session determined to be established and transmits a 'Nsmf_PDUSession_CreateSMContext' response message to the AMF in response to the 'Nsmf_PDUSession_CreateSMContext' request message received in step 610.

Subsequently in steps 613 and 614, a UE-initiated session establishment procedure and the remaining operations of the mobility registration procedure are continuously performed by the method described in section 4.3.2.2, section 4.11.2.3, and their related FIGS. 4.3.2.2.1-1 and 4.11.2.3-1 in TS 23.502 (v16.6.0) according to the determination of step 611, as illustrated in FIG. 6.

Figure 7:
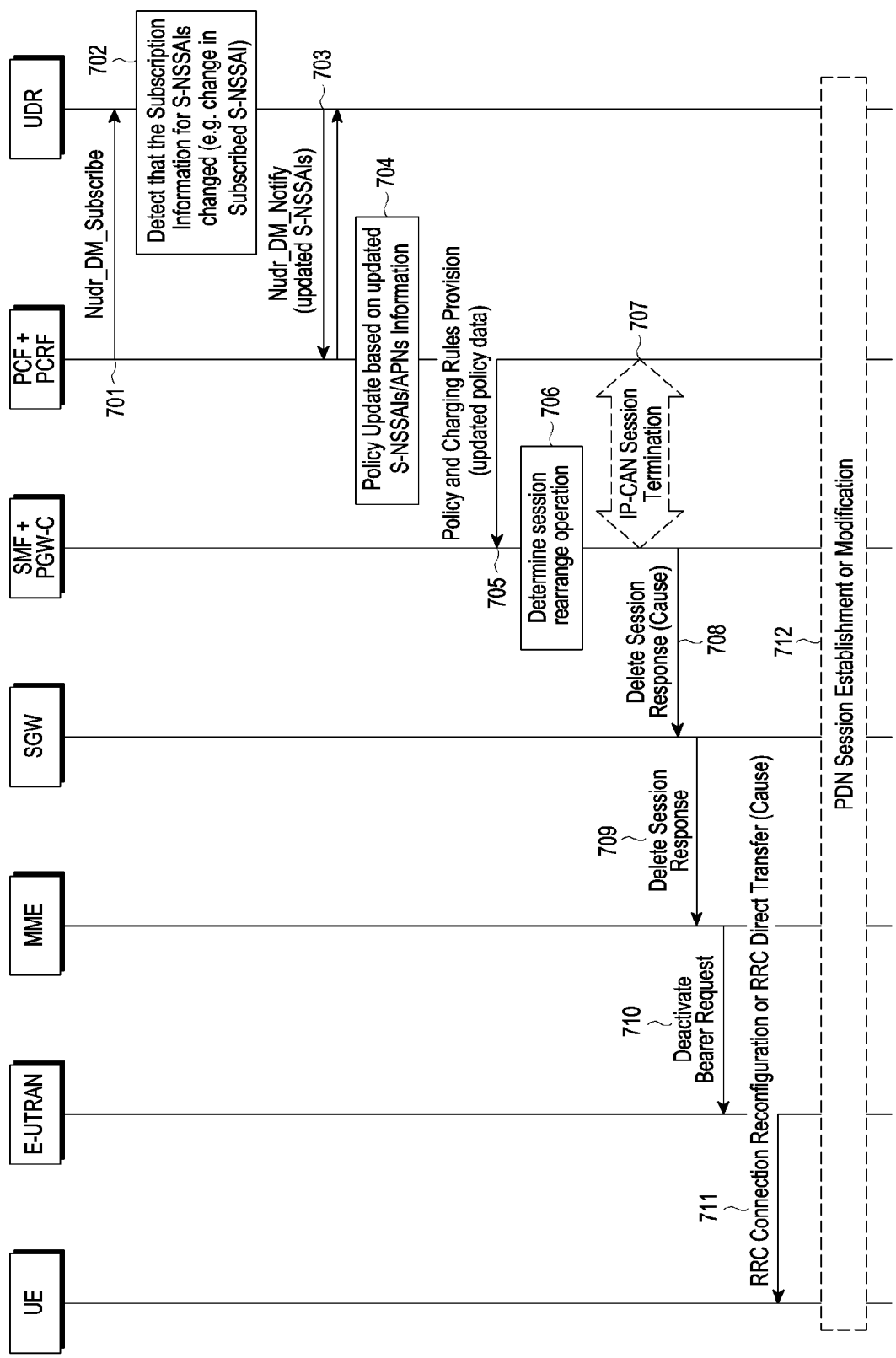
FIG. 7 is a diagram illustrating a signal flow for a policy update-based session release method according to an embodiment of the disclosure.

FIG. 7 is a diagram illustrating a signal flow for a policy update-based session release method according to an embodiment of the disclosure.

Referring to FIG. 7, the PCF+PCRF may receive updated subscribed S-NSSAI information from the UDR, update a policy based on the updated subscribed S-NSSAI information and information about an APN associated with a corresponding S-NSSAI, and then transmits the policy update to the SMF+PGW-C. The SMF+PGW-C may determine whether there is any other substitute S-NSSAI that may enable the UE to access the APN. In the absence of any other substitute S-NSSAI, the SMF+PGW-C may release a session, indicating the cause of the session release to the UE.

Specifically, the PCF+PCRF transmits a Nudr_DM_subscribe message to the UDR in step 701. The Nudr_DM_subscribe message is a message that subscribes to information about a change of subscription data. The Nudr_DM_subscribe message may include information indicating transmission of information about a changed or deleted subscribed S-NSSAI to the PCF+PCRF which has transmitted the Nudr_DM_subscribe message, upon occurrence of an event of the change or deletion of the subscribed S-NSSAI for the UE. A service-based interface related to the UDR is defined by 'Nudr' as noted from the appellation of the Nudr_DM_subscribe message, and Nudr_DM is one of services provided by the UDR. Regarding data stored in the UDR, the UDR may perform detection, generation, update, subscription to a change notification, cancelation of the subscription to a change notification, and/or deletion though the Nudr_DM. In the disclosure, the PCF+PCRF as well as the UDM+HSS may use the Nudr_DM service.

When the UDR that has received the Nudr_DM_subscribe message detects that a change has occurred in subscription data for S-NSSAIs in step 702, the UDR notifies the PCF+PCRF of the result of the change of the subscribed S-NSSAIs by transmitting a Nudr_DM_notify message to the PCF+PCRF in step 703. The change result may include at least one of the updated S-NSSAI(s) for the UE, information about APN(s) associated with the updated S-NSSAI(s) (that is, information about APN(s) connected to the updated subscribed S-NSSAI(s)), or cause information (e.g., a Cause value) about the subscription data change.

In step 704, upon receipt of the Nudr_DM_notify message, the PCF+PCRF may update a policy based on the result of the change. For example, when an S-NSSAI has been deleted as a result of the update, a policy applied to the deleted S-NSSAI and an APN associated with the deleted S-NSSAI may be deleted.

In step 705, the PCF+PCRF transmits information about the updated policy to the SMF+PGW-C.

Subsequent steps 706 to 712 are performed in the same manner as steps 306 to 312 in the embodiment of FIG. 3 and thus their detailed description is avoided herein.

Figure 23A:
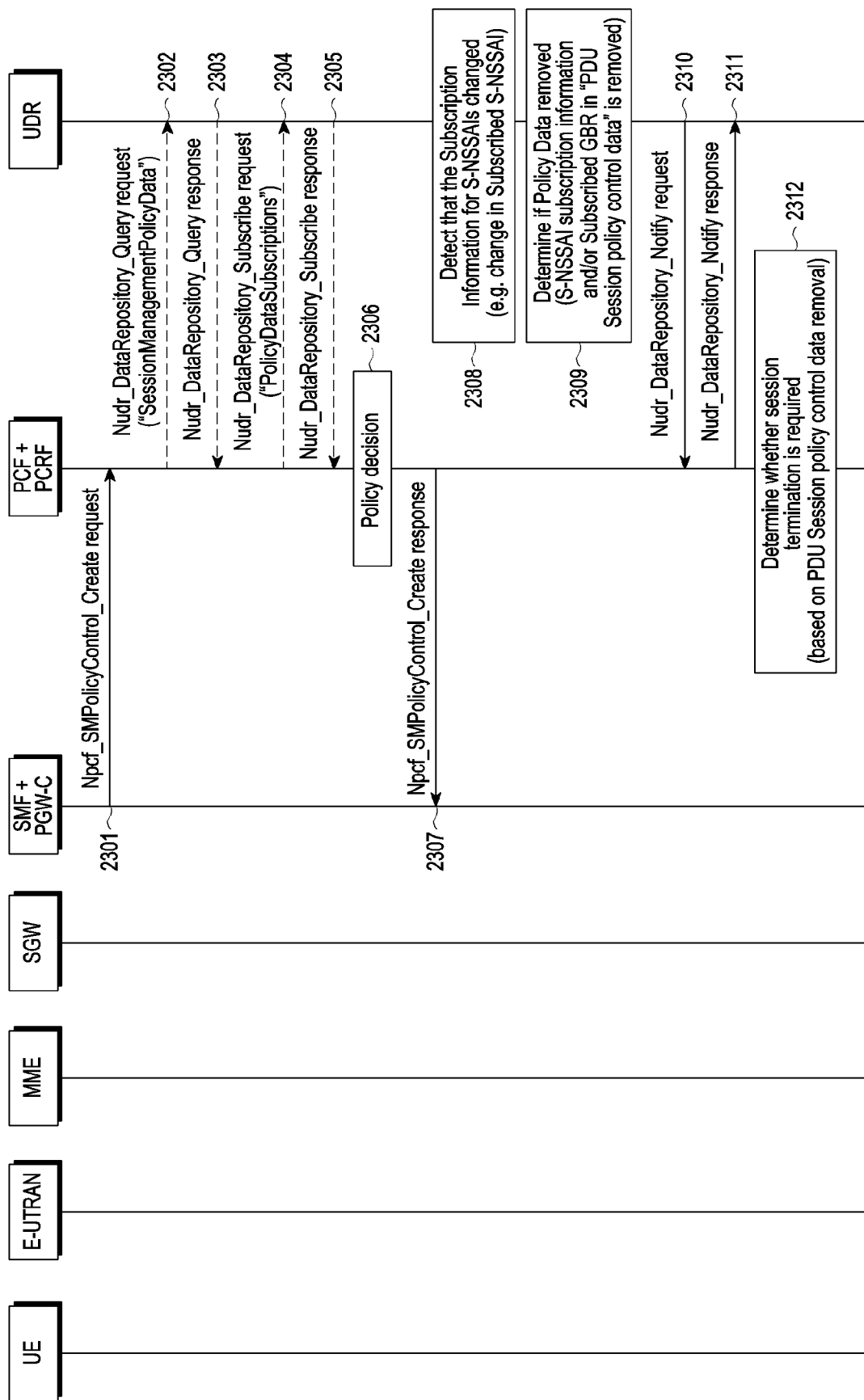
FIGS. 23A and 23B are diagrams illustrating a signal flow for another exemplary policy update-based session release method according to an embodiment of the disclosure.
Figure 23B:
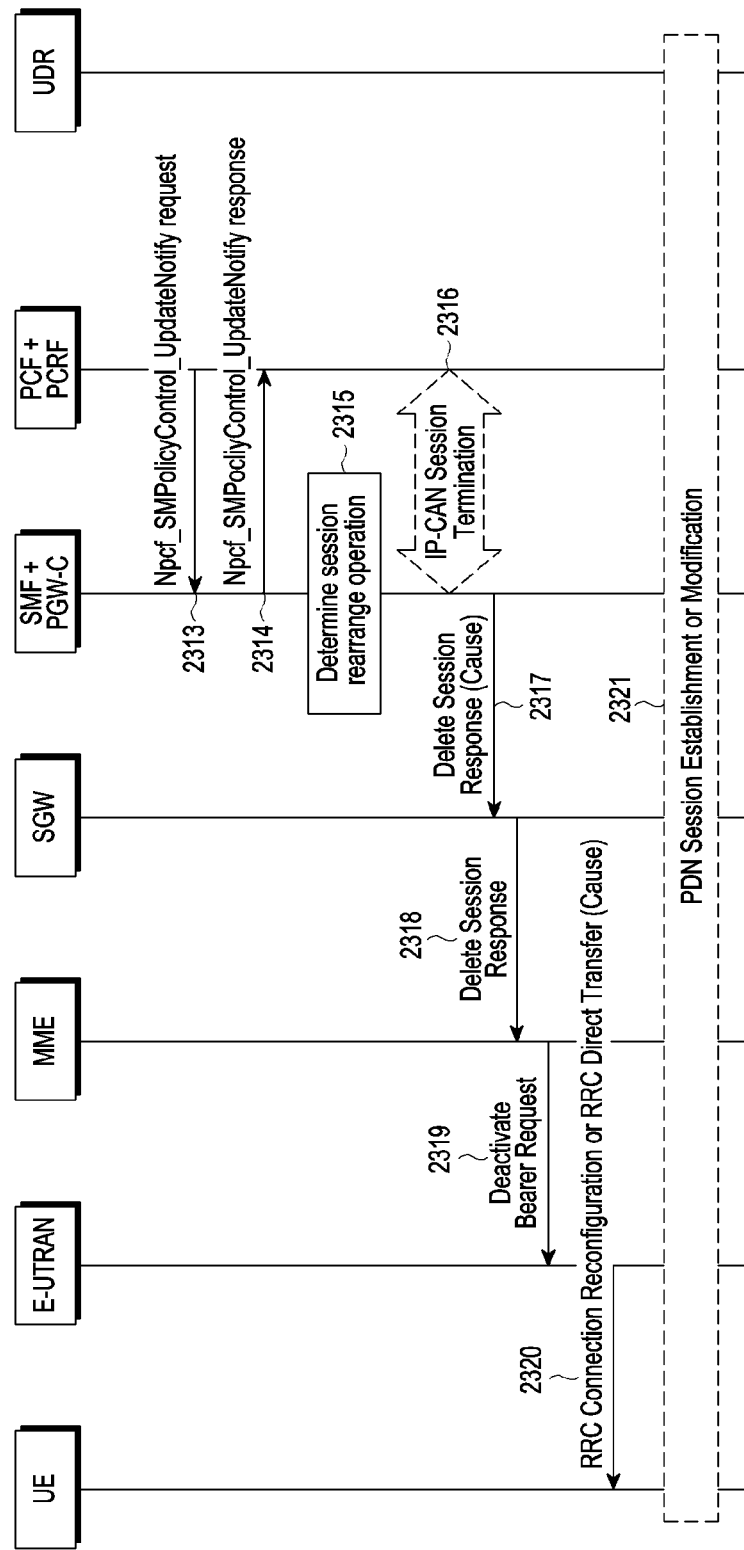

FIGS. 23A and 23B are diagrams illustrating another exemplary policy update-based session release method according to an embodiment of the disclosure.

In the embodiments of FIGS. 23A to 26, at least one of messages transmitted and received among the SMF+PGW-C, the PCF+PCRF, and the UDR may be basically a message used in the SM Policy Association Management procedure in NR standard TS 29.513. Various pieces of information according to the following embodiments may be delivered using the message. However, it should be noted that messages exemplified in the following embodiments are merely an example, not limited to the formats of specific messages.

Referring to FIGS. 23A and 23B, the SMF+PGW-C may request information related to a specific session to the PCF+PCRF, and the PCF+PCRF may request information related to a service to be used through the specific session to the UDR and receive the requested information from the UDR. When there is a change in information (e.g., subscription data, UE policy data, or session management policy data) that may be received from the UDR, the PCF+PCRF may request subscription to a notification of change or non-change and changed content to the UDR. When any of the subscription data, the UE policy data, and the session management policy data is changed, the UDR may notify the PCF+PCRF managing changed data of the change. The PCF+PCRF may determine a policy based on the information received from the UDR and notifies the SMF+PGW-C of the policy. The SMF+PGW-C may determine that subscribed S-NSSAI information has been changed and determine whether there is any other substitute S-NSSAI that enables the UE to access an APN associated with a corresponding S-NSSAI, based on the policy received from the PCF+PCRF. In the absence of any other substitute S-NSSAI, the SMF+PGW-C may release a session, indicating the cause of the session release to the UE.

Specifically, in step 2301, the SMF+PGW-C may transmit a Npcf_SMPolicyControl_Create request to the PCF+PCRF to request policy information used for managing a session to be established by the SMF+PGW-C. The PCF+PCRF may generate session management policy-related information (e.g., Session Management Policy Association or SM Policy Association) and provide the session management policy-related information to the SMF+PGW-C. The session management policy-related information may include at least one piece of information described in Table 2a and Table 2b. Table 2a and Table 2b below illustrate one table separately, for convenience of description. The session management policy-related information may be referred to as session policy-related information or session policy management/control subscription information.

TABLE 2a

| PDU Session policy control subscription information | | |
|---|---|---|
| Information name | Description | Category |
| Allowed services | List of subscriber's allowed service identifiers | Optional |
| Subscriber categories | List of category identifiers associated with the subscriber | Optional |

TABLE 2a-continued

PDU Session policy control subscription information

| Information name | Description | Category |
|---|---|---|
| Subscribed GBR | Maximum aggregate bitrate that can be provided across all GBR QoS Flows for the DNN and S-NSSAI. | Optional |
| ADC support | Indicates whether application detection and control can be enabled for a subscriber | Optional |
| Subscriber spending limits control | Indicates whether the PCF must enforce policies based on subscriber spending limits | Optional |
| IP index information | Information that identifies the IP Address allocation method during PDU Session establishment | Optional |
| Background Data Transfer Reference ID(s) | Reference ID(s) for Background Data Transfer Policies that apply to the UE. | Optional |
| Local routing indication | Indication on whether AF influence on traffic routing is allowed or not allowed | Optional |
| S-NSSAI subscription information | List of subscribed S-NSSAIs, its associated subscribed DNNs. | Optional |
| Charging related information | This part defines the charging related information in the policy control subscription profile | |
| Default charging method | Default charging method for the PDU Session (online/offline) | Optional |
| CHF address | The address of the Charging Function and optionally the associated CHF instance ID and CHF set ID (see clause 6.3.1.0 of TS 23.501 [2]) | Optional |
| Usage monitoring related information | This part includes a list of usage monitoring profiles associated with the subscriber. Each usage monitoring profile is logically associated with a particular operator offer, and includes the following elements | |
| Monitoring key | An identifier to a usage monitoring control instance that includes one or more PCC rules | Conditional (NOTE 1) |
| Usage monitoring level | Indicates the scope of the usage monitoring instance (PDU Session level or per Service) | Optional |
| Start date | Start date and time when the usage monitoring profile applies | Optional |
| End date | End date and time when the usage monitoring profile applies | Optional |

TABLE 2b

| Information name | Description | Category |
|---|---|---|
| Time limit | Maximum allowed resource time usage | Optional |
| Reset period | Time period to reset the remaining allowed consumed usage for periodic usage monitoring control (postpaid subscriptions) | Optional |
| MPS subscription data | This part defines the MPS subscription information in the policy control subscription profile | |
| MPS priority | Indicates subscription to MPS priority service; priority applies to all traffic on the PDU Session | Conditional (NOTE 1) |
| IMS signalling priority | Indicates subscription to IMS signalling priority service; priority only applies to IMS signalling traffic | Conditional (NOTE 1) |
| MPS priority level | Relative priority level for multimedia priority services | Conditional (NOTE 1) |
| MCS priority | Indicates subscription to MCS priority service; priority applies to all traffic on the PDU Session | Conditional (NOTE 1) |
| MCS priority level | Relative priority level for MCS services | Conditional (NOTE 1) |

(NOTE 1):
The information is mandatory if the specific part is included in the subscription information (e.g., the monitoring key is mandatory if the usage monitoring information part is included)

In step 2302 of FIG. 23A, the PCF+PCRF transmits a Nudr_DataRepository_Query request message to the UDR to request information about a session for which SMIF+PGW-C information is requested, information about a service to be used through the session, and subscriber-related information to the UDR. When the PCF+PCRF requests the information to the UDR, the PCF+PCRF may determine necessary information based on a subscription permanent identifier (SUPI), a DNN, and an S-NSSAI and request the necessary information based on the determination.

In step 2303, the UDR may transmit session management policy data (e.g., Session Management Policy Data) for the session requested by the PCF+PCRF to the PCF+PCRF by transmitting a Nudr_DataRepository_Query response message in response to the Nudr_DataRepository_Query request message.

In step 2304, the PCF+PCRF may transmit a Nudr_DataRepository_Subscribe request message to the UDR to request the UDR to transmit a notification of whether policy data for a session managed by the PCF+PCRF has been changed and/or changed information, upon occurrence of the change.

In step 2305, when the UDR determines whether to accept the request of step 2304 and accepts the request, the UDR may transmit a Nudr_DataRepository_Subscribe response message in response, to notify the PCF+PCRF of the request acceptance.

In step 2306, the PCF+PCRF may determine a session management policy based on information received from the UDR.

In step 2307, the PCF+PCRF may generate session management policy-related information and transmit a Nudr_DataRepository_Create response message including the generated information to the SMF+PGW-C. The session management policy-related information may include information about the policy determined in step 2306.

In step 2308, the UDR may recognize/identify whether a subscribed S-NSSAI or subscribed S-NSSAI-related information has been changed in at least one of subscription data, UE policy data, or session management policy data.

In step 2309, the UDR may determine whether there is session management policy data to be changed due to the change of the subscribed S-NSSAI. In an exemplary method of determining whether there is session management policy data to be changed, it may be identified whether there is information to be affected by the change of the subscribed S-NSSAI in the session management policy-related information exemplified in Table 2a and Table 2b. It may be identified whether information is affected by the change of the subscribed S-NSSAI by determining whether there is an S-NSSAI deleted from a subscribed S-NSSAIs list, whether there is a deleted subscribed DNN and an S-NSSAI associated with the DNN is included in the subscribed S-NSSAIs list, whether there is a deleted subscribed S-NSSAI or DNN and there is a subscribed GBR associated with the S-NSSAI or the DNN, whether there is a deleted subscribed S-NSSAI or DNN and there is subscribed S-NSSAI subscription information associated with the S-NSSAI or the DNN. The determination may be made based on Subscribed GBR information, S-NSSAI subscription information, and so on in Table 2a and Table 2b.

In step 2310, the UDR may transmit a Nudr_DataRepository_Notify request message to the PCF+PCRF that has requested subscription to the session management policy-related information described in relation to step 2304 based on the change in the session management policy-related information determined in step 2309, to notify the PCF+PCRF of the change of the session management policy-related information.

In step 2311, the PCF+PCRF may transmit a Nudr_DataRepository_Notify response message to the UDR in response to the Nudr_DataRepository_Notify request message received in step 2310.

In step 2312, the PCF+PCRF identifies information related to the change (e.g., removal of session policy control data) of the session management policy-related information received from the UDR in step 2310, and determines whether there is a session to be affected based on the information related to the change of the session management policy-related information. For example, the PCF+PCRF may determine whether specific session management policy-related information has been deleted and there is an SMF-PCW-C managing a session to which the corresponding policy is applied, by analyzing the information related to the change of the session management policy-related information. Further, the PCF+PCRF may determine whether release/termination of the session is required in step 2312.

In step 2313, the PCF+PCRF may transmit a Npcf_SMPolicyControl_UpdateNotify request message to the SMF+PGW-C managing the session to be changed based on the determination of step 2312, to notify that a session management policy should be changed.

In step 2314, the SMF+PGW-C may transmit an Npcf_SMPolicyControl_UpdateNotify response message in response to the Npcf_SMPolicyControl_UpdateNotify request message received in step 2313.

In step 2315, the SMF+PGW-C may determine a method of adjusting an on-going PDN session. The determination method is performed in the following processes 3-1) to 3-4).

3-1) It is identified whether there is any S-NSSAI deleted from a subscribed S-NSSAI list.

3-2) There is a deleted S-NSSAI, and it is determined whether a PDN session connected to an APN associated with the deleted S-NSSAI is in progress.

3-3) When there is a PDN session connected to the APN, it is identified whether any other S-NSSAI available for accessing the APN exists in the subscribed S-NSSAI list.

3-4) When one S-NSSAI is available for accessing the APN and corresponds to the deleted S-NSSAI or when a plurality of S-NSSAIs are available for accessing the APN and none of the S-NSSAIs are included in the subscribed S-NSSAI list, the SMF+PGW-C determines to release all PDN sessions connected to the APN. For example, on the assumption that there are S-NSSAI A, S-NSSAI B, and S-NSSAI C as the subscribed S-NSSAIs of the UE, S-NSSAI A and S-NSSAI B may be connected to APN 1, and S-NSSAI C may be connected to APN 2, when S-NSSAI C is changed as a result of a change in subscription data in the UDR, this corresponds to the case in which "one S-NSSAI is available for accessing the APN and corresponds to the deleted S-NSSAI" in the process 3-4). Because S-NSSAI C has been deleted from the subscription data and there is no other S-NSSAI available for accessing APN 2, the SMF+PGW-C may determine to release all PDN sessions connected to APN 2.

The SMF+PGW-C may have the subscribed S-NSSAI list before step 2313. This corresponds to a case in which the UDR or the UDM+HSS transmits user data information directly or through another NF (or network entity) in the network registration procedure of the UE or the session establishment procedure or session modification procedure of the SMF+PGW-C. A message delivering the subscription data may be Nudr_DataRepository_Query, Nudr_DM_Notify, or Nudm_SDM_Notification.

In step 2315, it may be determined whether there is a deleted or affected APN by determining whether there is a deleted or affected DNN and there is an APN indicating the same data network as indicated by the DNN. This determination may be made by the UDR in step 2309 or by the PCF+PCRF in step 2312.

In step 2316, the SMF+PGW-C requests the PCF+PCRF to release/terminate PDN sessions (e.g., IP-CAN sessions) connected to the APN according to the determination result of step 2315 to release/terminate the PDN sessions. An IP-CAN session refers to association between a UE and an IP network (i.e., APN).

Subsequently, in steps 2317 to 2320, the SMF+PGW-C allows the UE to release the PDN sessions and deactivate EPS bearers through the SGW, the MME, and the E-UTRAN. In this case, the SMF+PGW-C may notify the UE that the cause of the release/termination of the PDN sessions is not unavailability of the APN to the UE but a change in network slice-related information.

In step 2321, the UE may then re-establish or change the PDN sessions for the APN based on the cause information (the Cause value) received from the SMF+PGW-C via the EPS. The UE and/or the network may start or may start and end the operation of re-establishing or changing the PDN sessions for the APN within a predetermined time set by the UE and/or the network. The predetermined time may be set individually for each of the UE and the network, or may be signaled to the UE by signaling (e.g., RRC signaling, system information, or the like) from the network. Further, when the UE re-establishes or changes the PDN sessions, the UE may assign IDs that have not been used previously as PDN session IDs and PDU session IDs corresponding to the PDN session IDs. The operation of the UE and/or the operation of the network is applicable to other embodiments which will be described below.

Figure 8:
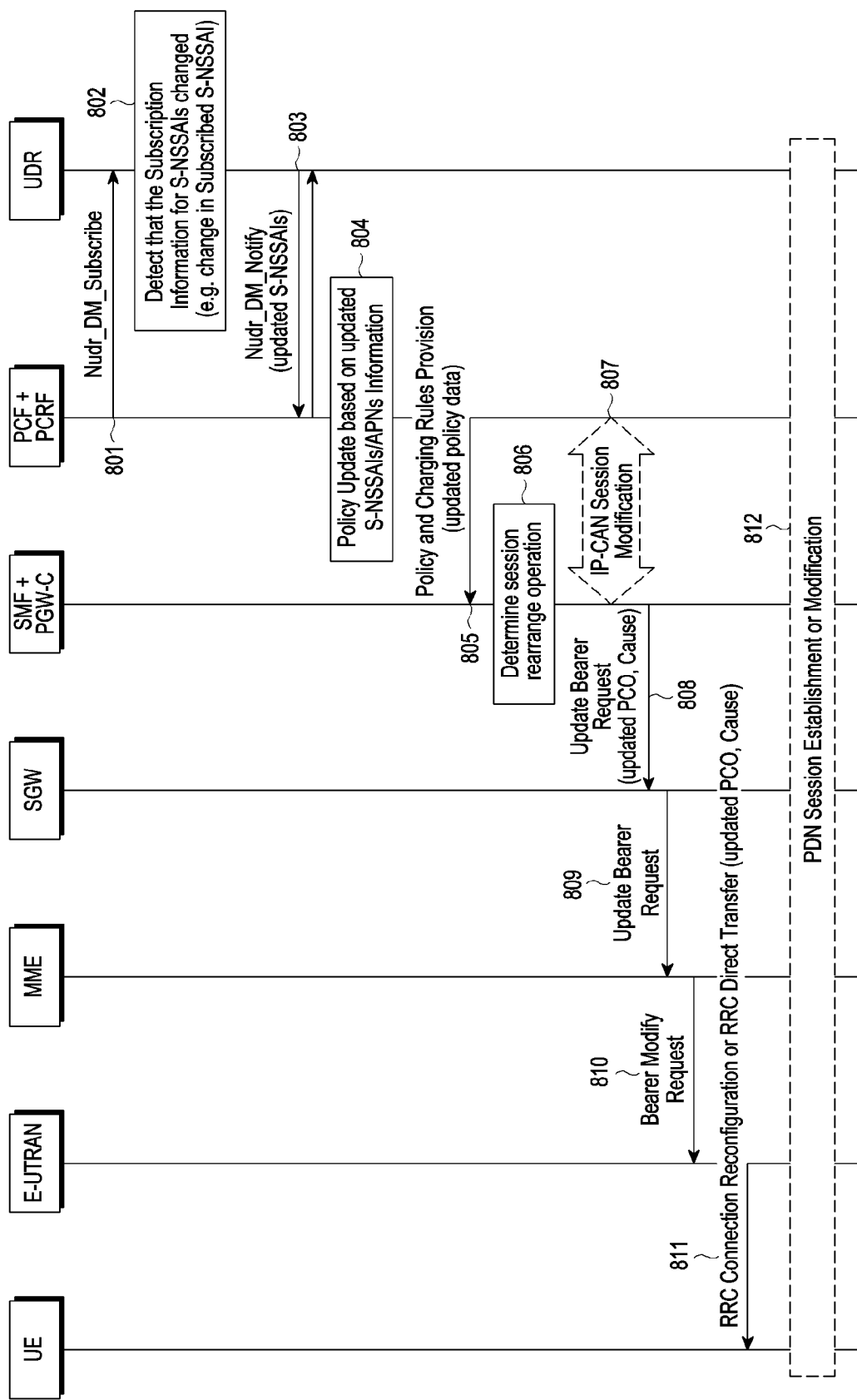
FIG. 8 is a diagram illustrating a signal flow for a policy update-based session modification method according to an embodiment of the disclosure.

FIG. 8 is a diagram illustrating a signal flow for a policy update-based session modification method according to an embodiment of the disclosure.

Referring to FIG. 8, the PCF+PCRF may receive updated subscribed S-NSSAI information from the UDR, update a policy based on the updated subscribed S-NSSAI information and information about an APN associated with a corresponding S-NSSAI, and transmit the policy update to the SMF+PGW-C. The SMF+PGW-C may determine whether there is any other substitute S-NSSAI that may enable the UE to access the APN. In the presence of any substitute S-NSSAI, the SMF+PGW-C may modify a session, indicating the cause of the session modification and the changed S-NSSAI to the UE.

Specifically, the PCF+PCRF transmits a Nudr_DM_subscribe message to the UDR in step 801. The Nudr_DM_subscribe message is a message that subscribes to information about a change of subscription data. The Nudr_DM_subscribe message may include information indicating transmission of information about a changed or deleted subscribed S-NSSAI to the PCF+PCRF which has transmitted the Nudr_DM_subscribe message, upon occurrence of an event of the change or deletion of the subscribed S-NSSAI for the UE.

Upon detection of a change in subscription data for S-NSSAIs in step 802, the UDR which has received the Nudr_DM_subscribe message notifies the PCF+PCRF of the result of the change of the subscribed S-NSSAIs by transmitting a Nudr_DM_notify message. The change result may include at least one of the updated S-NSSAI(s) for the UE, information about APN(s) associated with the updated S-NSSAI(s) (that is, information about APN(s) connected to the updated subscribed S-NSSAI(s)), or cause information (e.g., a Cause value) about the subscription data change.

In step 804, upon receipt of the Nudr_DM_notify message, the PCF+PCFR updates a policy based on the change result. For example, when there is a deleted S-NSSAI as the change result and another S-NSSAI is available for accessing an APN associated with the deleted S-NSSAI, the S-NSSAI of a policy applied to the associated APN may be changed.

In step 805, the PCF+PCFR transmits information about the updated policy to the SFM+PGW-C.

Subsequent steps 806 to 812 are performed in the same manner as steps 406 to 412 in the embodiment of FIG. 4 and thus will not be described in detail herein.

Figure 24A:
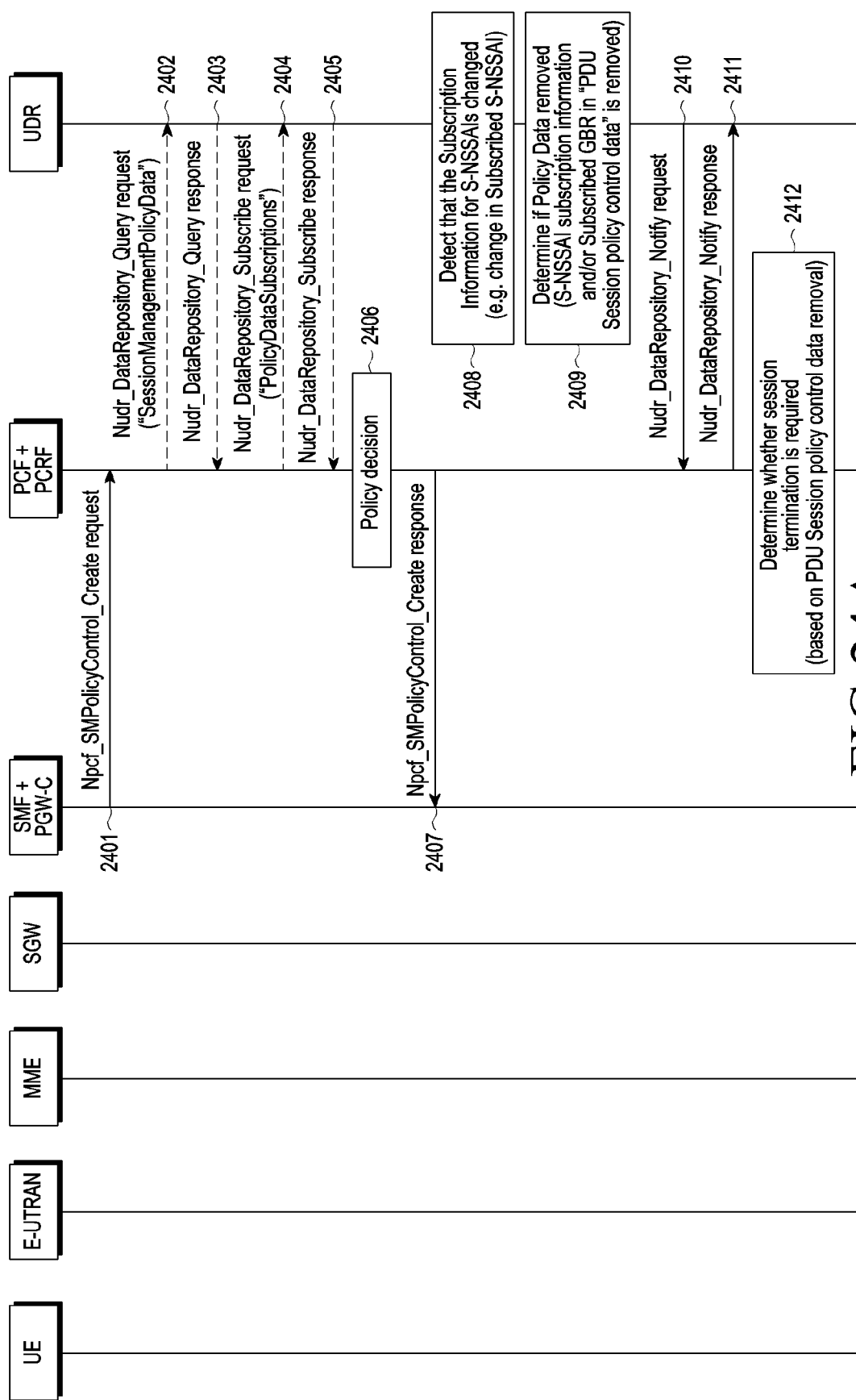
FIGS. 24A and 24B are diagrams illustrating a signal flow for another exemplary policy update-based session modification method according to an embodiment of the disclosure.
Figure 24B:
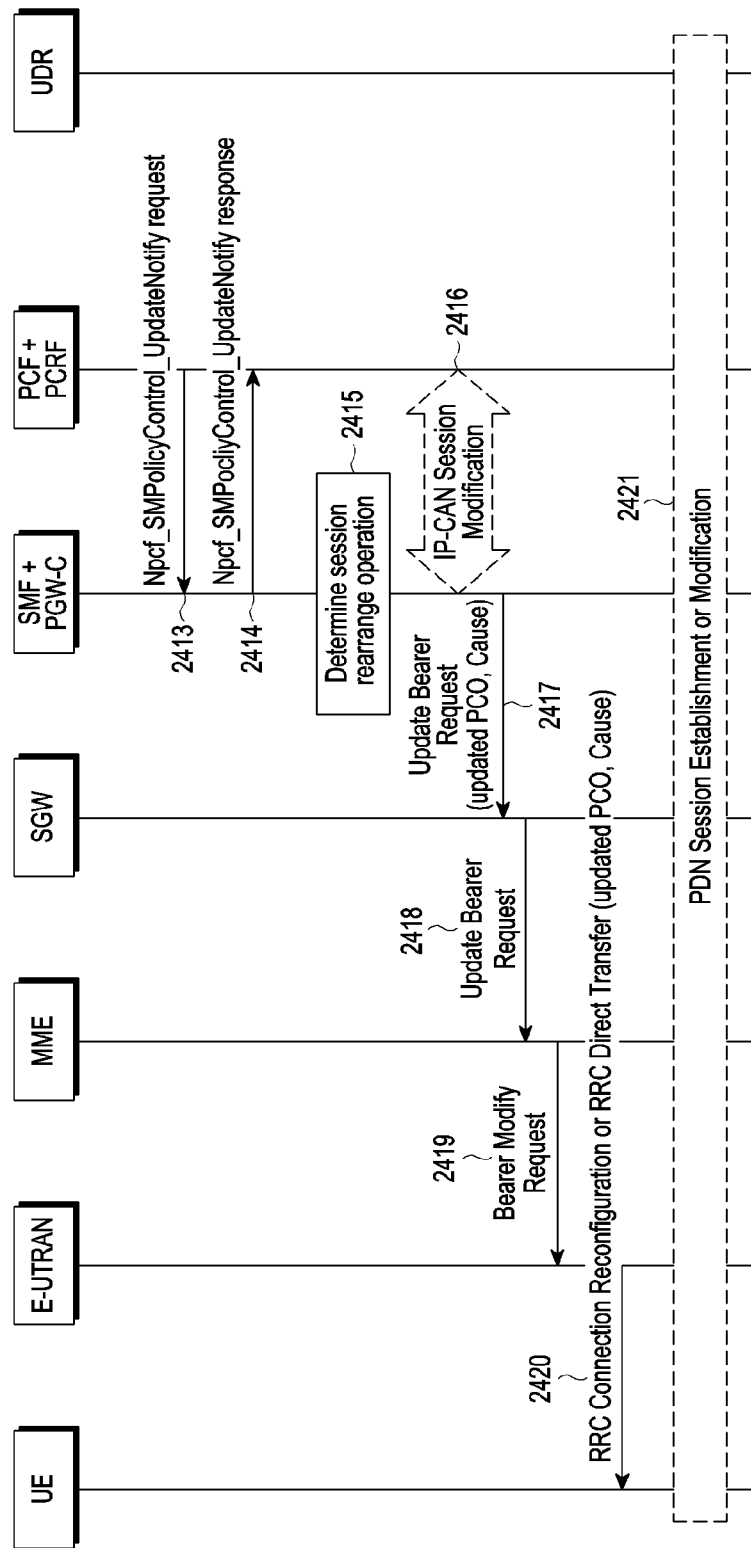

FIGS. 24A and 24B are diagrams illustrating another exemplary policy update-based session modification method according to an embodiment of the disclosure.

Referring to FIGS. 24A and 24B, the SMF+PGW-C may request information related to a specific session to the PCF+PCRF, and the PCF+PCRF may request information related to a service that the UE of a subscriber and the SMF+PGW-C intend to use through the session to the UDR, and receive the information from the UDR. Further, the PCF+PCRF may request subscription to a notification of change or non-change and changed content to the UDR, when there is a change in information (e.g., subscription data, UE policy data, or session management policy data) that may be received from the UDR. When any of the subscription data, the UE policy data, and the session management policy data is changed, the UDR may indicate the change to the PCF+PCRF that manages changed data. The PCF+PCRF may determine a policy based on the information received from the UDR and notifies the SMF+PGW-C of the policy. The SMF+PGW-C may determine that subscribed S-NSSAI information has been changed and determine whether there is any other substitute S-NSSAI that enables the UE to access an APN associated with a corresponding S-NSSAI, based on the policy notified by the PCF+PCRF. In the presence of any substitute S-NSSAI, the SMF+PGW-C may modify a session, indicating the cause of the session modification and the changed S-NSSAI to the UE.

In the embodiment of FIGS. 24A and 24B, steps 2401 to 2414 are performed in the same manner as steps 2301 to 2314 in the embodiment of FIGS. 23A and 23B, and thus will not be described in detail herein.

In step 2415 of FIG. 24A, the processes 3-1) to 3-4) of step 2315 are performed. In the process 3-4), when a plurality of S-NSSAIs are available for accessing a corresponding APN and any other S-NSSAI available for accessing the APN is included in the subscribed S-NSSAI list, the SMF+PGW-C determines to modify an S-NSSAI associated with the APN without releasing all PDN sessions connected to the APN. For example, on the assumption that there are S-NSSAI A, S-NSSAI B, and S-NSSAI C as the subscribed S-NSSAIs of the UE, S-NSSAI A and S-NSSAI B may be connected to APN 1, and S-NSSAI C may be connected to APN 2, when S-NSSAI A is changed as a result of a change in subscription data in the UDR, this corresponds to the case where 'a plurality of S-NSSAIs are available for accessing the APN and any other S-NSSAI available for accessing the APN is included in the subscribed S-NSSAI list'. Because S-NSSAI A has been deleted from the subscription data and there is another S-NSSAI available for accessing APN 1, the SMF+PGW-C may determine to modify all PDN sessions connected to APN 1.

In step 2415, it may be determined whether there is an affected APN by determining whether there is an affected DNN and there is an APN indicating the same data network as indicated by the DNN. This determination may be made by the UDR in step 2409 or by the PCF+PCRF in step 2412.

In step 2416, the SMF+PGW-C requests the PCF+PCRF to modify PDN sessions (e.g., IP-CAN sessions) connected to the APN according to the determination result of step 2415 to modify the PDN sessions. An IP-CAN session refers to association between a UE and an IP network (i.e., APN).

Subsequently, in steps 2417 to 2420, the SMF+PGW-C allows the UE to modify the PDN sessions and update EPS bearers through the SGW, the MME, and the E-UTRAN. In this case, the SMF+PGW-C may notify the UE of cause information (a Cause value) indicating that the modification of the PDN sessions is attributed to a change in network slice-related information, not unavailability of the APN to the UE, and the change of the network slice-related information.

In step 2421, the UE may then re-establish or change the PDN sessions for the APN based on the cause information (the Cause value) received from the SMF+PGW-C via the EPS. The UE and/or the network may start or may start and end the operation of re-establishing or changing the PDN session for the APN within a predetermined time set by the UE and/or the network. The predetermined time may be set individually for each of the UE and the network, or may be signaled to the UE by signaling (e.g., RRC signaling, system information, or the like) from the network. Further, when the UE re-establishes or changes the PDN sessions, the UE may assign IDs that have not been used previously as PDN session IDs and PDU session IDs corresponding to the PDN session IDs. The operation of the UE and/or the operation of the network may also be applied to other embodiments described below.

Figure 9:
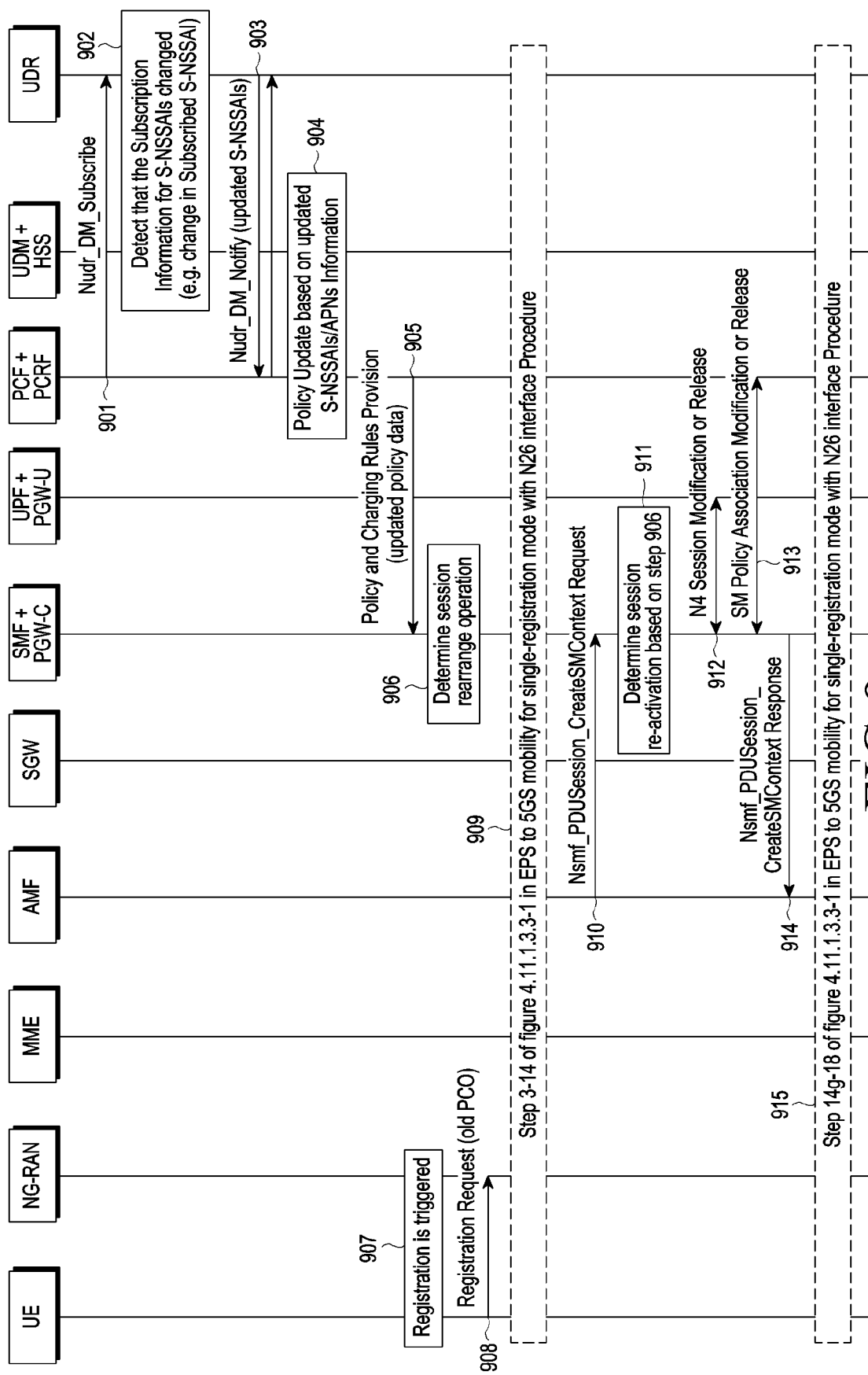
FIG. 9 is a diagram illustrating a signal flow for a policy update-based session modification method (when an N26 interface is used) according to an embodiment of the disclosure.

FIG. 9 is a diagram illustrating a signal flow for a policy update-based session modification method (when an N26 interface is used) according to an embodiment of the disclosure.

Referring to FIG. 9, the PCF+PCRF may receive updated subscribed S-NSSAI information from the UDR, update a policy based on the updated subscribed S-NSSAI information and information about an APN associated with a corresponding S-NSSAI, and transmit the policy update to the SMF+PGW-C. The SMF+PGW-C may determine whether there is any other substitute S-NSSAI that may enable the UE to access the APN, and then modify or release an associated session, when the UE moves to the 5GS later.

Specifically, the PCF+PCRF transmits a Nudr_DM_subscribe message to the UDR in step 901. The Nudr_DM_subscribe message is a message that subscribes to information about a change of subscription data. The Nudr_DM_subscribe message may include information indicating transmission of information about a changed or deleted subscribed S-NSSAI to the PCF+PCRF which has transmitted the Nudr_DM_subscribe message, upon occurrence of an event of the change or deletion of the subscribed S-NSSAI for the UE.

Upon detection of a change in subscription data for S-NSSAI(s) in step 902, the UDR which has received the Nudr_DM_subscribe message indicates the result of the change of subscribed S-NSSAIs to the PCF+PCRF by transmitting an Nudr_DM_notify message to the PCF+PCFR. The result of the change may include at least one of the updated S-NSSAI(s) for the UE, information about APN(s) associated with the updated S-NSSAI(s) (that is, information about APN(s) connected to the updated subscribed S-NSSAI(s)), or cause information (e.g., a Cause value) about the subscription data change.

In step 904, upon receipt of the Nudr_DM_notify message, the PCF+PCFR updates a policy based on the result of the change. For example, when there is a deleted S-NSSAI as the result of the update and another S-NSSAI is available for accessing an APN associated with the deleted S-NSSAI, the S-NSSAI of a policy applied to the associated APN may be changed.

In step 905, the PCF+PCFR transmits updated policy information to the SFM+PGW-C. Upon receipt of the updated policy information, the SMF+PGW-C may determine whether to release or modify a PDN session in the method of step 306 in the embodiment of FIG. 3 or the method of step 406 in the embodiment of FIG. 4.

In step 907, along with movement of the UE, the UE or the NG-RAN may recognize that the UE has moved from the EPS to the 5GS, and a mobility registration procedure from the EPS to the 5GS is triggered.

In step 908, as the mobility registration procedure is triggered, the UE may transmit, to the NG-RAN, a Registration Request message including a PCO which was stored when the UE initially established a PDN session in the EPS. The PCO may not include information about a change in S-NSSAIs associated with used APNs or a subscribed S-NSSAI update as described in steps 901 to 906.

Subsequently in step 909, the UE which has moved from the EPS to the 5GS performs the registration procedure by using an N26 interface. The 5GS supporting interworking with the EPS may support an interworking procedure using an N26 interface. Section 4.11.1.3.3 and its related FIG. 4.11.1.3.3-1 in TS 23.502 (v16.6.0) disclose a mobility registration procedure from an EPS to a 5GS, which uses an N26 interface. As in step 909, part of the mobility registration procedure may be performed.

In step 910, the AMF requests the SMF+PGW-C to create an SM Context for PDU sessions during the mobility registration procedure. To request the SM Context creation, the 'Nsmf_PDUSession_CreateSMContext' request message which is a PDU session request message described in Table 1 may be used. In step 911, the SMF+PGW-C may determine to release or modify PDN sessions connected to the corresponding DNN (APN) based on the determination of step 906.

Subsequently in steps 912, 913, and 914, the SMF+PGW-C releases or modifies an N4 session (a session between the SMF and the UPF) and an SM Policy Association according to the determination of step 911 and transmits a 'Nsmf_PDUSession_CreateSMContext' response message to the AMF in response to the 'Nsmf_PDUSession_CreateSMContext' request message received in step 910.

In step 915, the remaining operations of the mobility registration procedure are continuously performed by the method described in section 4.11.1.3.3 and its related FIG. 4.11.1.3.3-1 in TS 23.502 (v16.6.0), as illustrated in FIG. 9.

Figure 25A:
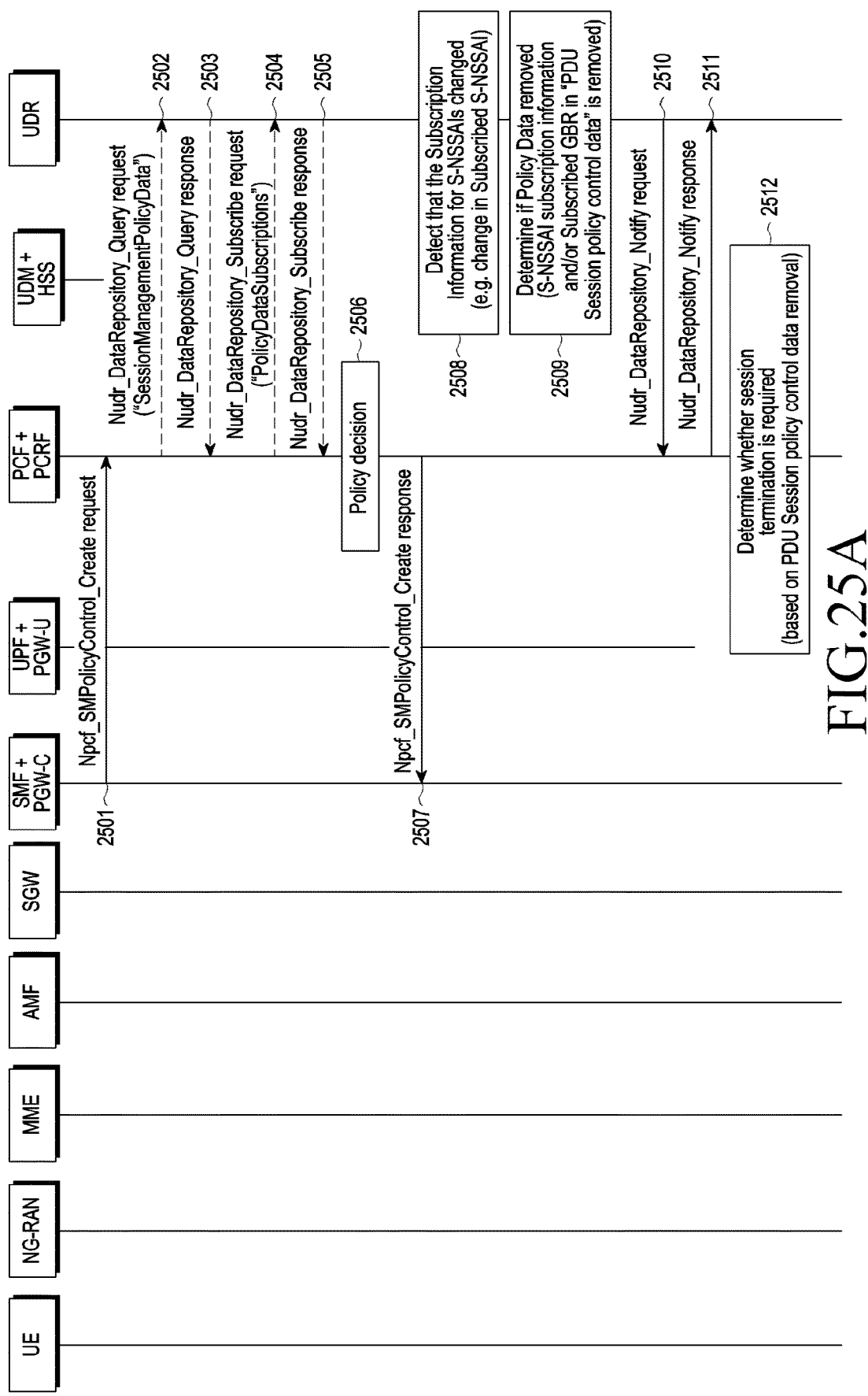
FIGS. 25A and 25B are diagrams illustrating a signal flow for another exemplary policy update-based session modification method (when an N26 interface is used) according to an embodiment of the disclosure.
Figure 25B:
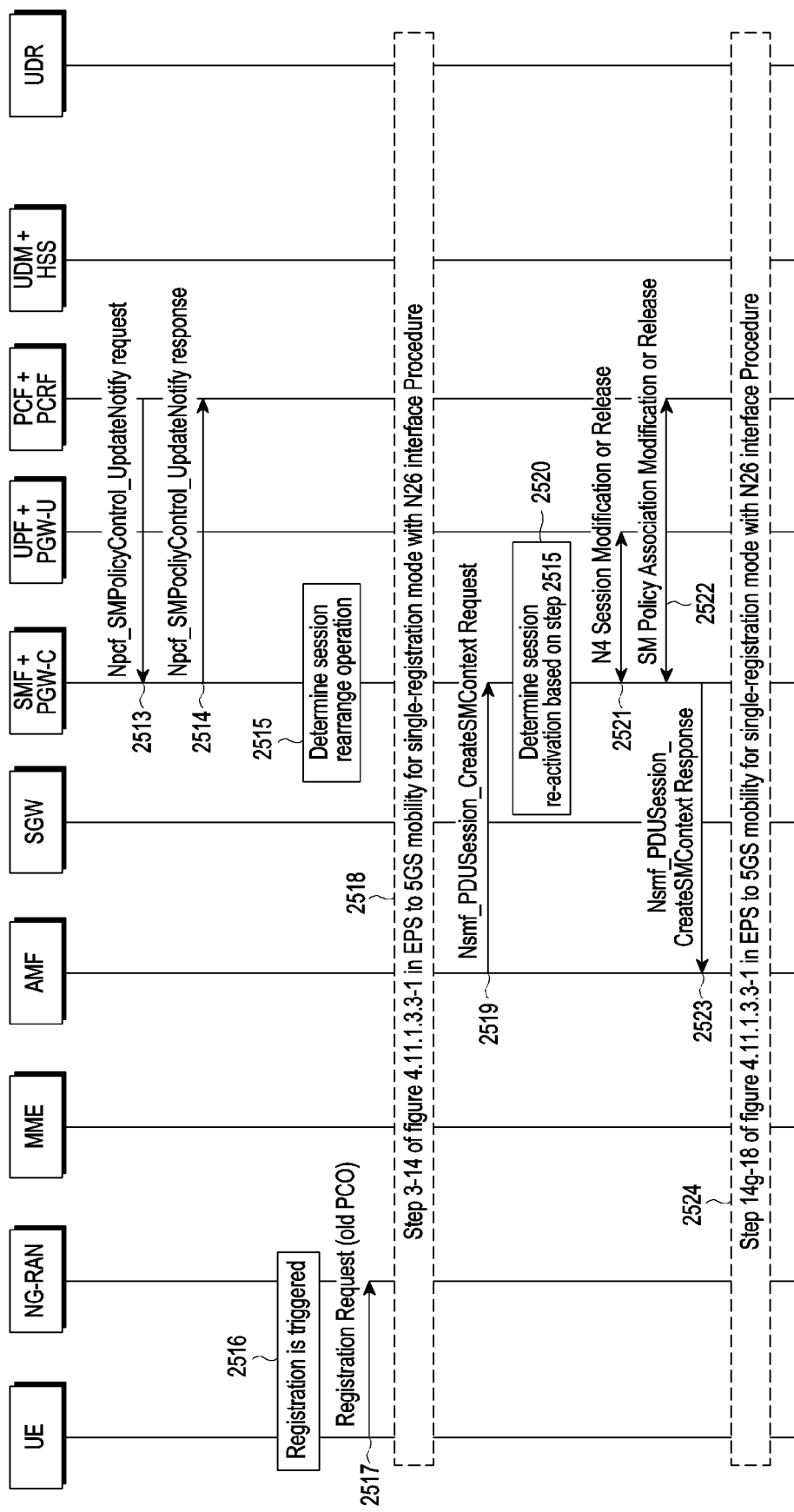

FIGS. 25A and 25B are diagrams illustrating another exemplary policy update-based session modification method (when an N26 interface is used) according to an embodiment of the disclosure.

Referring to FIGS. 25A and 25B, the SMF+PGW-C may request information related to a specific session to the PCF+PCRF, and the PCF+PCRF may request information related to a service that the UE of the subscriber and the SMF+PGW-C intend to use through the session to the UDR, and receive the information from the UDR. Further, the PCF+PCRF may request subscription to a notification of change or non-change and changed content to the UDR, when there is a change in information (e.g., subscription data, UE policy data, or session management policy data) that may be received from the UDR. When any of the subscription data, the UE policy data, and the session management policy data is changed, the UDR may indicate the change to the PCF+PCRF that manages changed data. The PCF+PCRF may determine a policy based on the information received from the UDR and notifies the SMF+PGW-C of the policy. The SMF+PGW-C may determine that subscribed S-NSSAI information has been changed and determine whether there is any other substitute S-NSSAI that enables the UE to access an APN associated with a corresponding S-NSSAI, based on the policy indicated by the PCF+PCRF. Thus, the SMF+PGW-C may modify or release a related session, when the UE moves to the 5GS.

In the embodiment of FIGS. 25A and 25B, steps 2501 to 2514 are performed in the same manner as steps 2301 to 2314 in the embodiment of FIGS. 23A and 23B and thus will not be described in detail herein.

In step 2515 of FIG. 25, upon receipt of policy-related information from the PCF+PCRF, the SMF+PGW-C may determine whether to release or modify PDN sessions according to the method of step 2315 in the embodiment of FIGS. 23A and 23B or the method of step 2415 in the embodiment of FIGS. 24A and 24B.

Subsequently in step 2516, the UE or the NG-RAN may recognize that the UE has moved from the EPS to the 5GS, and a mobility registration procedure from the EPS to the 5GS is triggered.

In step 2517, as the mobility registration procedure is triggered, the UE may transmit, to the NG-RAN, a Registration Request message including a PCO which was stored when the UE initially established a PDN session in the EPS. The PCO may not include information about a change in S-NSSAIs associated with used APNs or a subscribed S-NSSAI update.

Subsequently in step 2518, the UE which has moved from the EPS to the 5GS performs the registration procedure by using an N26 interface. The 5GS supporting interworking with the EPS may support an interworking procedure using an N26 interface. Section 4.11.1.3.3 and its related FIG. 4.11.1.3.3-1 in TS 23.502 (v16.6.0) disclose a mobility registration procedure from an EPS to a 5GS, which uses an N26 interface. As in step 2518, part of the mobility registration procedure may be performed.

In step 2519, the AMF requests the SMF+PGW-C to create an SM Context for PDU sessions during the mobility registration procedure. To request the SM Context creation, the 'Nsmf_PDUSession_CreateSMContext' request message which is a PDU session request message described in Table 1 may be used. In step 2520, the SMF+PGW-C may determine to release or modify PDN sessions connected to the corresponding DNN (APN) based on the determination of step 2515.

Subsequently in steps 2521, 2522, and 2523, the SMF+PGW-C releases or modifies an N4 session (a session between the SMF and the UPF) and an SM Policy Association according to the determination of step 2520 and transmits a 'Nsmf_PDUSession_CreateSMContext' response message to the AMF in response to the 'Nsmf_PDUSession_CreateSMContext' request message received in step 2519.

In step 2524, the remaining operations of the mobility registration procedure are continuously performed by the method described in section 4.11.1.3.3 and its related FIG. 4.11.1.3.3-1 in TS 23.502 (v16.6.0), as illustrated in FIG. 25.

Figure 10:
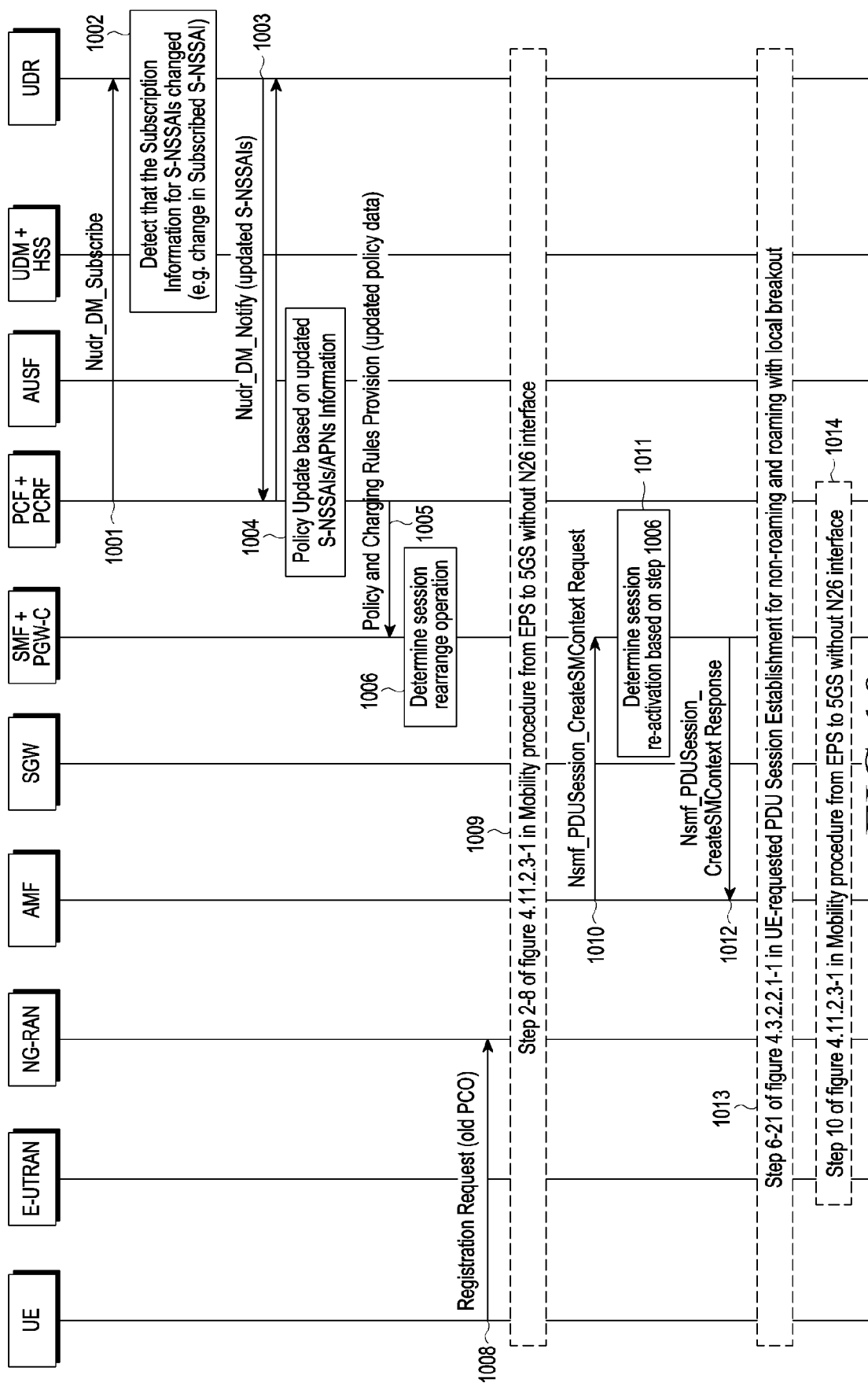
FIG. 10 is a diagram illustrating a signal flow for a policy update-based session modification method (when an N26 interface is not used) according to an embodiment of the disclosure.

FIG. 10 is a diagram illustrating a signal flow for a policy update-based session modification method (when an N26 interface is not used) according to an embodiment of the disclosure.

Referring to FIG. 10, the PCF+PCRF may receive updated subscribed S-NSSAI information from the UDR, update a policy based on the updated subscribed S-NSSAI information and information about an APN associated with a corresponding S-NSSAI, and transmit the policy update to the SMF+PGW-C. The SMF+PGW-C may determine whether there is any other substitute S-NSSAI that may enable the UE to access the APN, and then modify or release an associated session, when the UE moves to the 5GS later.

Specifically, the PCF+PCRF transmits a Nudr_DM_subscribe message to the UDR in step 1001. The Nudr_DM_subscribe message is a message that subscribes to information about a change of subscription data. The Nudr_DM_subscribe message may include information indicating transmission of information about a changed or deleted subscribed S-NSSAI to the PCF+PCRF which has transmitted the Nudr_DM_subscribe message, upon occurrence of an event of the change or deletion of the subscribed S-NSSAI for the UE.

Upon detection of a change in subscription data for S-NSSAI(s) in step 1002, the UDR which has received the Nudr_DM_subscribe message indicates the result of the change of the subscribed S-NSSAIs to the PCF+PCFR by transmitting an Nudr_DM_notify message to the PCF+PCFR in step 1003. The result of the change may include at least one of the updated S-NSSAI(s) for the UE, information about APN(s) associated with the updated S-NSSAI(s) (that is, information about APN(s) connected to the updated subscribed S-NSSAI(s)), or cause information (e.g., a Cause value) about the subscription data change.

In step 1004, upon receipt of the Nudr_DM_notify message, the PCF+PCFR updates a policy based on the result of the change. For example, when there is a deleted S-NSSAI as the result of the update and another S-NSSAI is available for accessing an APN associated with the deleted S-NSSAI, the S-NSSAI of a policy applied to the associated APN may be changed.

In step 1005, the PCF+PCFR transmits updated policy information to the SFM+PGW-C.

In step 1006, upon receipt of the Nudm_SDM_Notification message (not depicted), the SMF+PGW-C may determine whether to release or modify a PDN session in the method of step 306 in the embodiment of FIG. 3 or the method of step 406 in the embodiment of FIG. 4.

In step 1007, along with movement of the UE, the UE or the NG-RAN may recognize that the UE has moved from the EPS to the 5GS.

In step 1008, the UE may transmit, to the NG-RAN, a Registration Request message including a PCO which was stored when the UE initially established a PDN session in the EPS. The PCO may not include information about a change in S-NSSAIs associated with used APNs or a subscribed S-NSSAI update as described in steps 1001 to 1006.

Subsequently in step 1009, the UE which has moved from the EPS to the 5GS may start the registration procedure which does not use an N26 interface. The 5GS supporting interworking with the EPS may support an interworking procedure without using a N26 interface. Section 4.11.2.3 and its related FIG. 4.11.2.3-1 in TS 23.502 (v16.6.0) disclose a mobility registration procedure from an EPS to a 5GS, which does not use an N26 interface. As in step 609, part of the mobility registration procedure may be performed.

In step 1010, the AMF requests the SMF+PGW-C to create an SM Context for PDU sessions during the mobility registration procedure. To request the SM Context creation, the 'Nsmf_PDUSession_CreateSMContext' request message which is a PDU session request message described in Table 1 may be used.

In step 1011, the SMF+PGW-C may determine to establish a PDU session connected to the corresponding DNN (APN) based on the determination of step 1006.

In step 1012, the SMF+PGW-C creates the SM Context for the PDU session determined to be established and transmits an 'Nsmf_PDUSession_CreateSMContext' response message to the AMF in response to the 'Nsmf_P-DUSession_CreateSMContext' request message received in step 1010.

Subsequently in steps 1013 and 1014, a UE-initiated session establishment procedure and the remaining operations of the mobility registration procedure are continuously performed by the method described in section 4.3.2.2, section 4.11.2.3, and their related FIGS. 4.3.2.2.1-1 and 4.11.2.3-1 in TS 23.502 (v16.6.0) according to the determination of step 1011, as illustrated in FIG. 10.

Figure 26A:
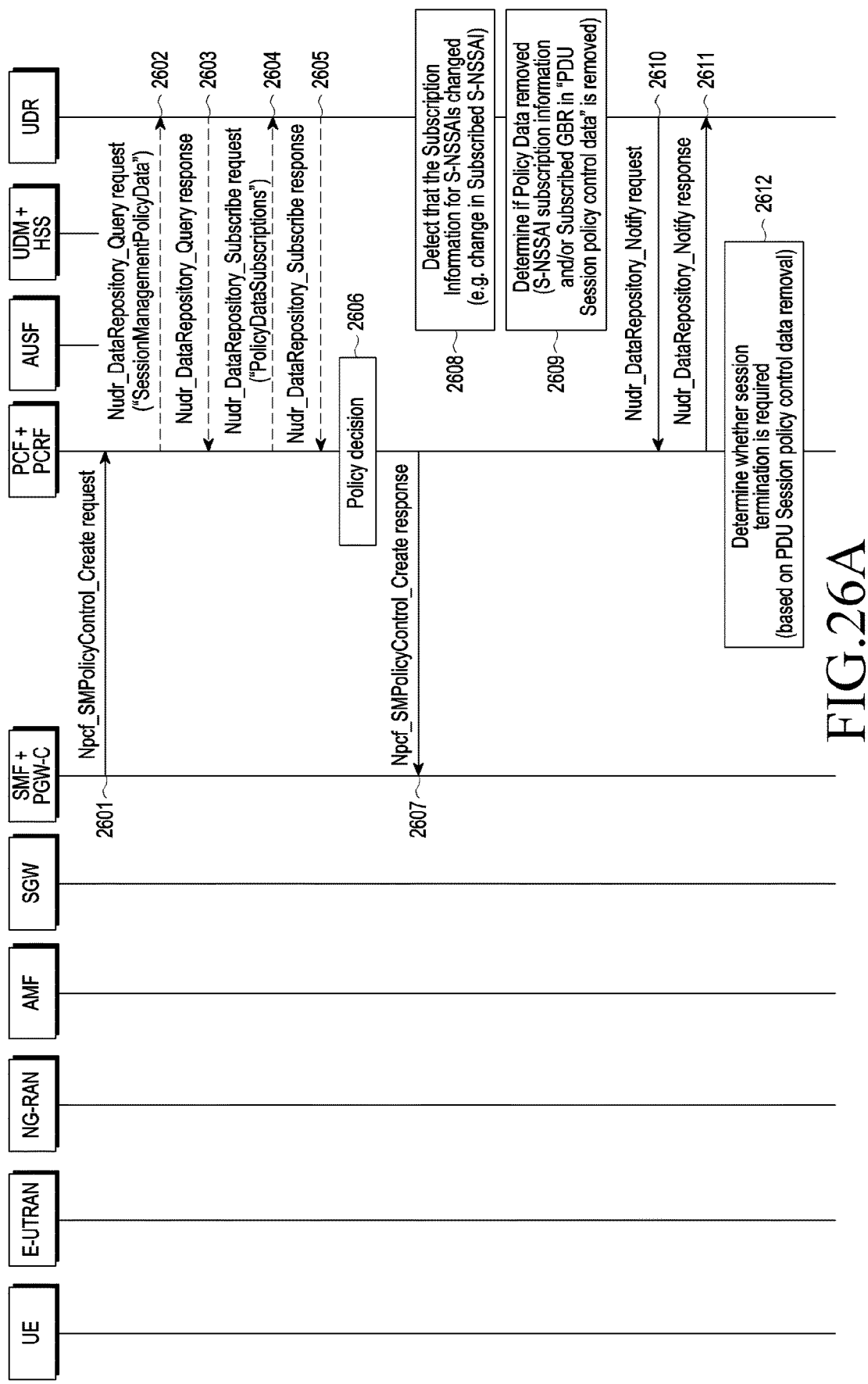
FIGS. 26A and 26B are diagrams illustrating a signal flow for another exemplary policy update-based session modification method (when an N26 interface is not used) according to an embodiment of the disclosure.
Figure 26B:
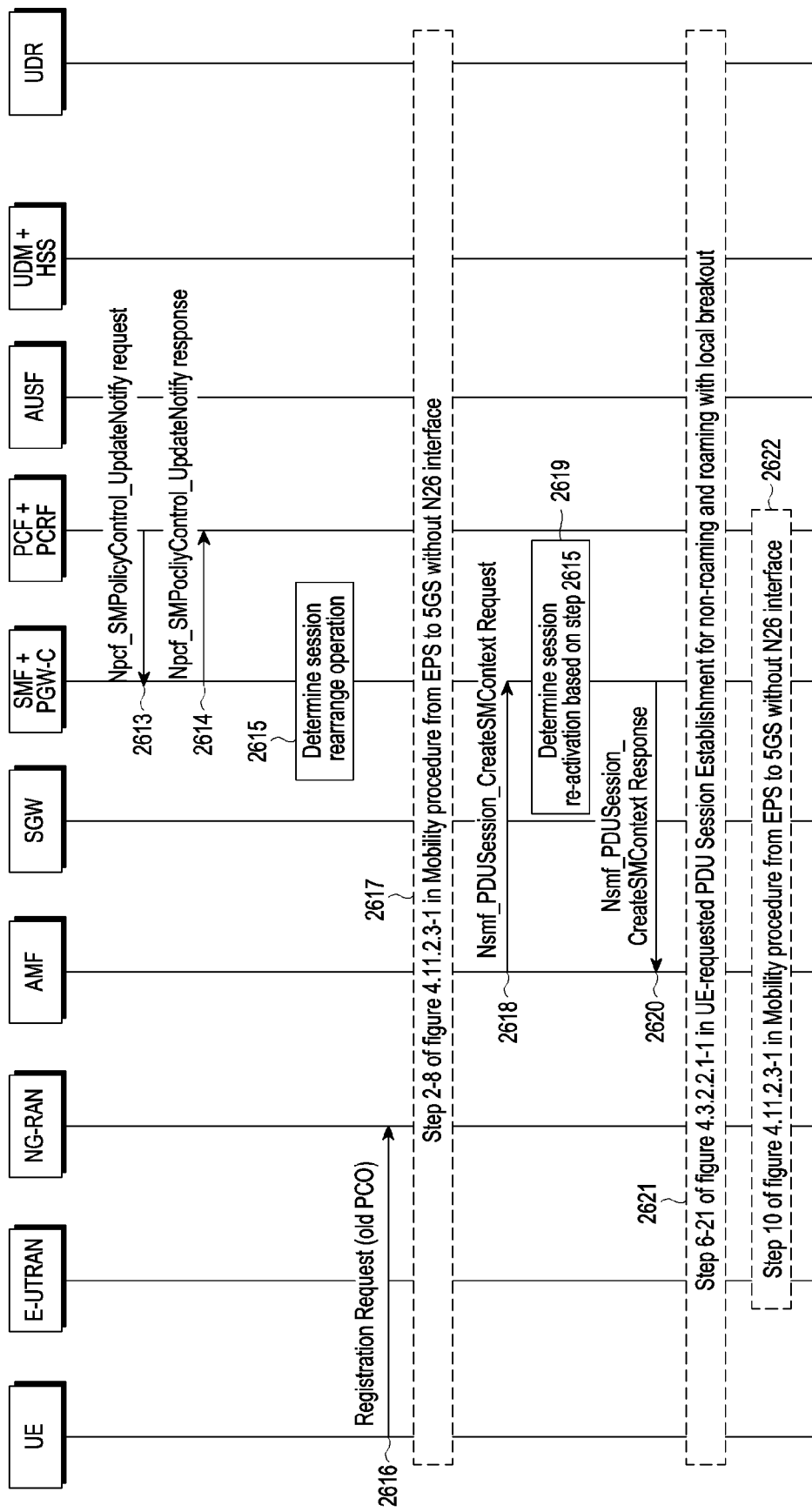

FIGS. 26A and 26B are diagrams illustrating a signal flow for another exemplary policy update-based session modification method (when an N26 interface is not used) according to an embodiment of the disclosure.

Referring to FIGS. 26A and 26B, the SMF+PGW-C may request information related to a specific session to the PCF+PCRF, and the PCF+PCRF may request information related to a service that the UE of the subscriber and the SMF+PGW-C intend to use through the session to the UDR, and receive the information from the UDR. Further, the PCF+PCRF may request subscription to a notification of change or non-change and changed content to the UDR when there is a change in information (e.g., subscription data, UE policy data, or session management policy data) that may be received from the UDR. When any of the subscription data, the UE policy data, and the session management policy data is changed, the UDR may indicate the change to the PCF+PCRF that manages changed data. The PCF+PCRF may determine a policy based on the information received from the UDR and notifies the SMF+PGW-C of the policy. The SMF+PGW-C may determine that subscribed S-NSSAI information has been changed and determine whether there is any other substitute S-NSSAI that enables the UE to access an APN associated with a corresponding S-NSSAI, based on the policy indicated by the PCF+PCRF, to modify or release a related session, when the UE later moves to the 5GS.

In the embodiment of FIGS. 26A and 26B, steps 2601 to 2614 are performed in the same manner as steps 2301 to 2314 in the embodiment of FIGS. 23A and 23B and thus will not be described in detail herein.

In step 2615 of FIG. 26A, upon receipt of policy-related information from the PCF+PCRF, the SMF+PGW-C may determine whether to release or modify PDN sessions according to the method of step 2315 in the embodiment of FIGS. 23A and 23B or the method of step 2415 in the embodiment of FIGS. 24A and 24B.

Subsequently, along with movement of the UE, the UE or the NG-RAN may recognize that the UE has moved from the EPS to the 5GS.

In step 2616, the UE may transmit, to the NG-RAN, a Registration Request message including a PCO which was stored when the UE initially established a PDN session in the EPS. The PCO may not include information about a change in S-NSSAIs associated with used APNs or a subscribed S-NSSAI update.

Subsequently in step 2617, the UE which has moved from the EPS to the 5GS may start a registration procedure which does not use an N26 interface. The 5GS supporting interworking with the EPS may support an interworking procedure which does not use the N26 interface. Section 4.11.2.3 and its related FIG. 4.11.2.3-1 in TS 23.502 (v16.6.0) disclose a mobility registration procedure from an EPS to a 5GS, which does not use an N26 interface. As in step 609, part of the mobility registration procedure may be performed.

In step 2618, the AMF requests the SMF+PGW-C to create an SM Context for PDU sessions during the mobility registration procedure. To request the SM Context creation, the 'Nsmf_PDUSession_CreateSMContext' request message which is a PDU session request message described in Table 1 may be used.

In step 2619, the SMF+PGW-C may determine to establish a PDU session connected to the corresponding DNN (APN) based on the determination of step 2615.

In step 2620, the SMF+PGW-C creates the SM Context for the PDU session determined to be established and transmits an 'Nsmf_PDUSession_CreateSMContext' response message to the AMF in response to the 'Nsmf_P-DUSession_CreateSMContext' request message received in step 2618.

Subsequently in steps 2621 and 2622, a UE-initiated session establishment procedure and the remaining operations of the mobility registration procedure are continuously performed by the method described in section 4.3.2.2, section 4.11.2.3, and their related FIGS. 4.3.2.2.1-1 and 4.11.2.3-1 in TS 23.502 (v16.6.0) according to the determination of step 2619, as illustrated in FIG. 10.

Figure 11:
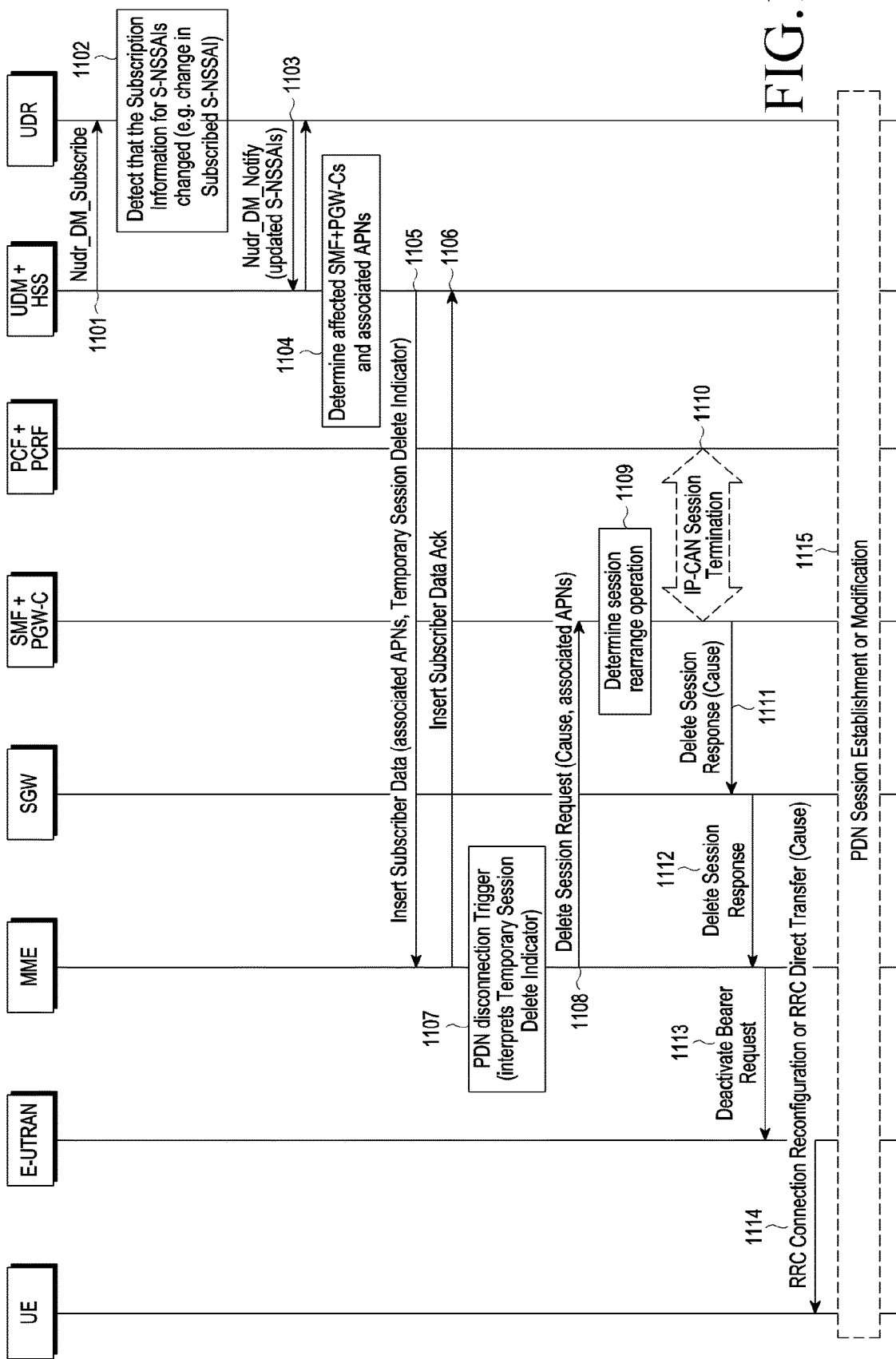
FIG. 11 is a diagram illustrating a signal flow for a session release method based on an access point name (APN) information update and a temporary session delete indicator according to an embodiment of the disclosure.

FIG. 11 is a diagram illustrating a signal flow for a session release method based on an APN information update and a temporary session delete indicator according to an embodiment of the disclosure.

Referring to FIG. 11, the UDM+HSS may receive updated subscribed S-NSSAI information from the UDR, transmit APN information associated with updated subscribed S-NSSAIs and a temporary session delete indicator to the MME. The MME may notify that all PDN sessions connected to a corresponding APN will be released temporarily, and the SMF+PGW-C may determine whether there is any other substitute S-NSSAI that may enable a UE to access the APN. In the absence of any substitute S-NSSAI, the SMF+PGW-C may release a session, indicating the cause of the session release to the UE.

Specifically, the UDM+HSS transmits a Nudr_DM_subscribe message to the UDR in step 1101. The Nudr_DM_subscribe message is a message that subscribes to information about a change of subscription data. The Nudr_DM_subscribe message may include information indicating transmission of information about a changed or deleted subscribed S-NSSAI to the UDM+HSS which has transmitted the Nudr_DM_subscribe message, upon occurrence of an event of the change or deletion of the subscribed S-NSSAI for the UE.

When the UDR that has received the Nudr_DM_subscribe message detects that a change has occurred in subscription data for S-NSSAIs in step 1102, the UDR notifies the UDM+HSS of the result of the change of the subscribed S-NSSAIs by transmitting an Nudr_DM_notify message in step 1103. The change result may include at least one of the updated S-NSSAI(s) for the UE, information about APN(s) associated with the updated S-NSSAI(s) (that is, information about APN(s) connected to the updated subscribed jS-NSSAI(s)), or cause information (e.g., a Cause value) about the subscription data change.

In step 1104, upon receipt of the Nudr_DM_notify message, the UDM+HSS may identify an associated APN and SMF+PGW-C based on the result of the change. In step 1105, the UDM+HSS transmits a message including subscription data including the APN information determined in step 1104 and the temporary session delete indicator to the MME. In step 1106, the MME transmits a response message to the UDM+HSS, confirming that the subscription data has been received/reflected.

Subsequently in step 1107, the MME identifies the temporary session delete indicator included in the received message, recognizes that all PDN sessions for the APN should be released temporarily, and thus triggers PDN session release. In step 1108, the MME may transmit, to the SMF+PGW-C, a message including at least one of the APN information or cause information (a Cause value) indicating that the session release is attributed to the change of subscribed S-NSSAIs, not a change in APNs.

Subsequent steps 1109 to 1115 are performed in the same manner as steps 306 to 312 in the embodiment of FIG. 3 and thus their detailed description is avoided herein.

Figure 12:
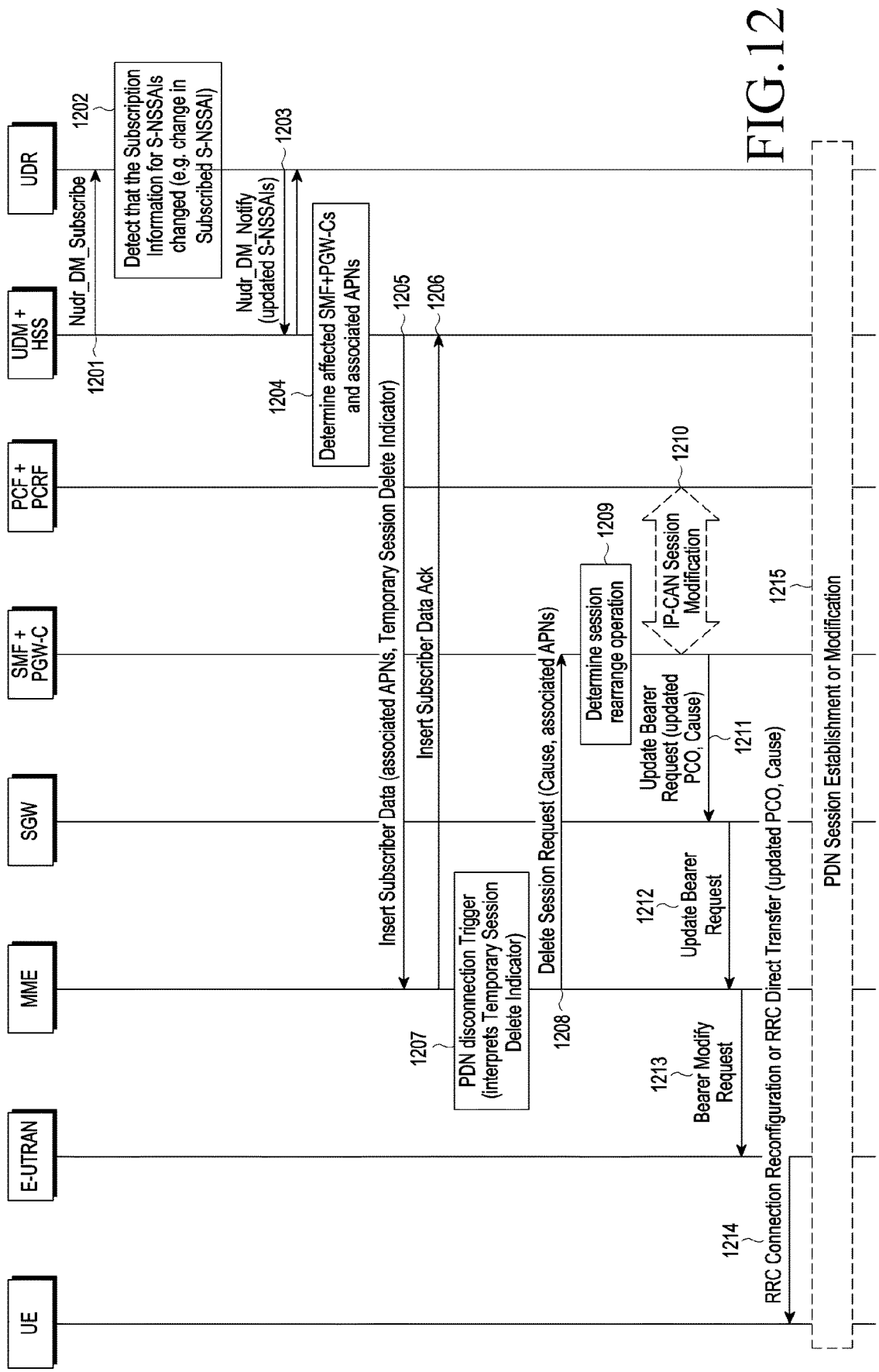
FIG. 12 is a diagram illustrating a signal flow for a session modification method based on an APN information update and a temporary session delete indicator according to an embodiment of the disclosure.

FIG. 12 is a diagram illustrating a signal flow for a session modification method based on an APN information update and a temporary session delete indicator according to an embodiment of the disclosure.

Referring to FIG. 12, the UDM+HSS may receive updated subscribed S-NSSAI information from the UDR, transmit APN information associated with updated subscribed S-NSSAIs n and a temporary session delete indicator to the MME. The MME notifies that all PDN sessions connected to a corresponding APN should be released temporarily, and the SMF+PGW-C may determine whether there is any other substitute S-NSSAI that may enable the UE to access the APN. In the presence of any substitute S-NSSAI, the SMF+PGW-C may modify a session, indicating the cause of the session modification and the changed S-NSSAI to the UE.

Specifically, the UDM+HSS transmits a Nudr_DM_subscribe message to the UDR in step 1201. The Nudr_DM_subscribe message is a message that subscribes to information about a change of subscription data. The Nudr_DM_subscribe message may include information indicating transmission of information about a changed or deleted subscribed S-NSSAI to the UDM+HSS which has transmitted the Nudr_DM_subscribe message, upon occurrence of an event of the change or deletion of the subscribed S-NSSAI for the UE.

When the UDR that has received the Nudr_DM_subscribe message detects that a change has occurred in subscription data for S-NSSAIs in step 1202, the UDR notifies the UDM+HSS of the result of the change of the subscribed S-NSSAIs by transmitting an Nudr_DM_notify message in step 1203. The change result may include at least one of the updated S-NSSAI(s) for the UE, information about APN(s) associated with the updated S-NSSAI(s) (that is, information about APN(s) connected to the updated subscribed S-NSSAI(s)), or cause information (e.g., a Cause value) about the subscription data change.

In step 1204, upon receipt of the Nudr_DM_notify message, the UDM+HSS may identify an associated APN and SMF+PGW-C based on the result of the change. In step 1205, the UDM+HSS transmits a message including subscription data including the APN information determined in step 1204 and the temporary session delete indicator to the MME. In step 1206, the MME transmits a response message to the UDM+HSS, confirming that the subscription data has been received/reflected.

Subsequently in step 1207, the MME identifies the temporary session release indicator included in the received message, recognizes that all PDN sessions for the APN should be released temporarily, and thus triggers PDN session release. In step 1208, the MME may transmit, to the SMF+PGW-C, a message including at least one of the APN information or cause information (a Cause value) indicating that the session release is attributed to the change of subscribed S-NSSAIs, not a change in APNs.

Subsequent steps 1209 to 1215 are performed in the same manner as steps 406 to 412 in the embodiment of FIG. 4 and thus their detailed description is avoided herein.

Figure 13A:
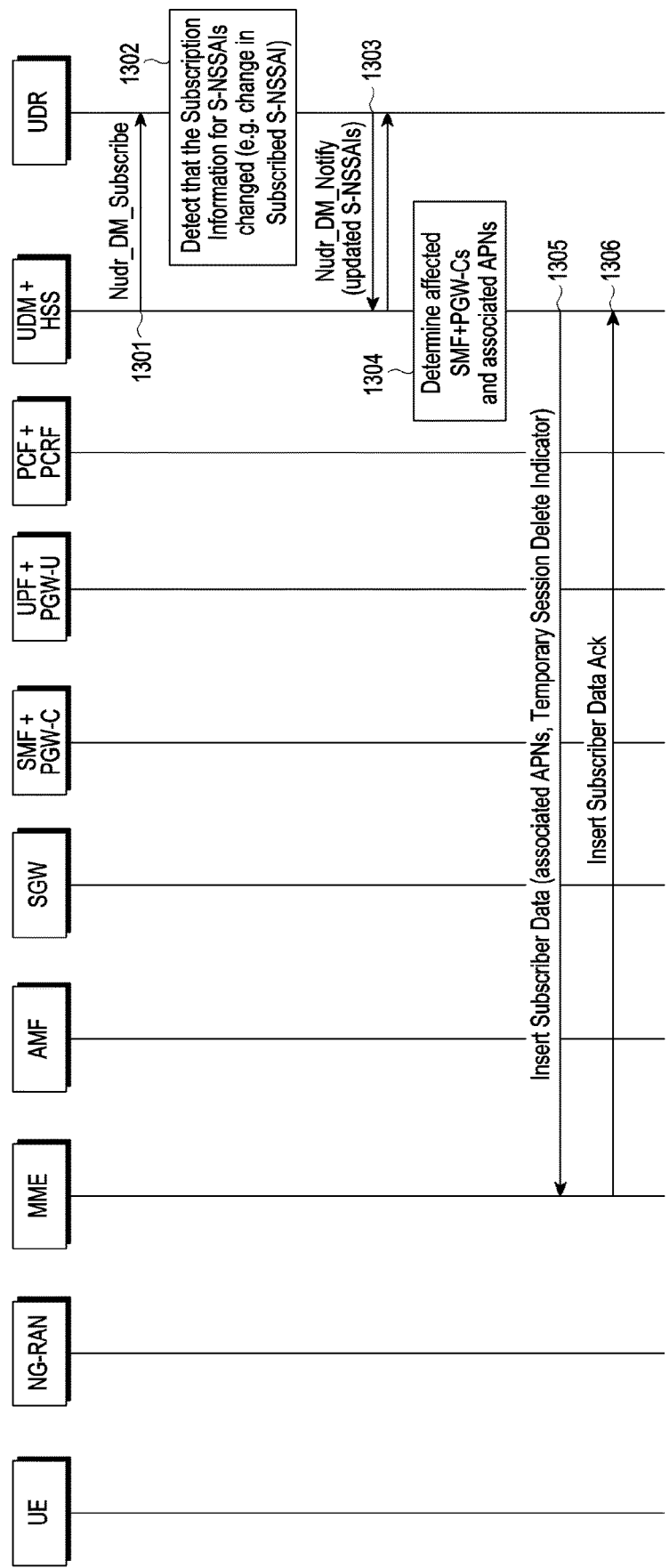
FIGS. 13A and 13B are diagrams illustrating a signal flow for a method of establishing a 5th generation system (5GS) protocol data unit (PDU) session based on an APN information update and a temporary session delete indicator (when an N26 interface is used) according to an embodiment of the disclosure.
Figure 13B:
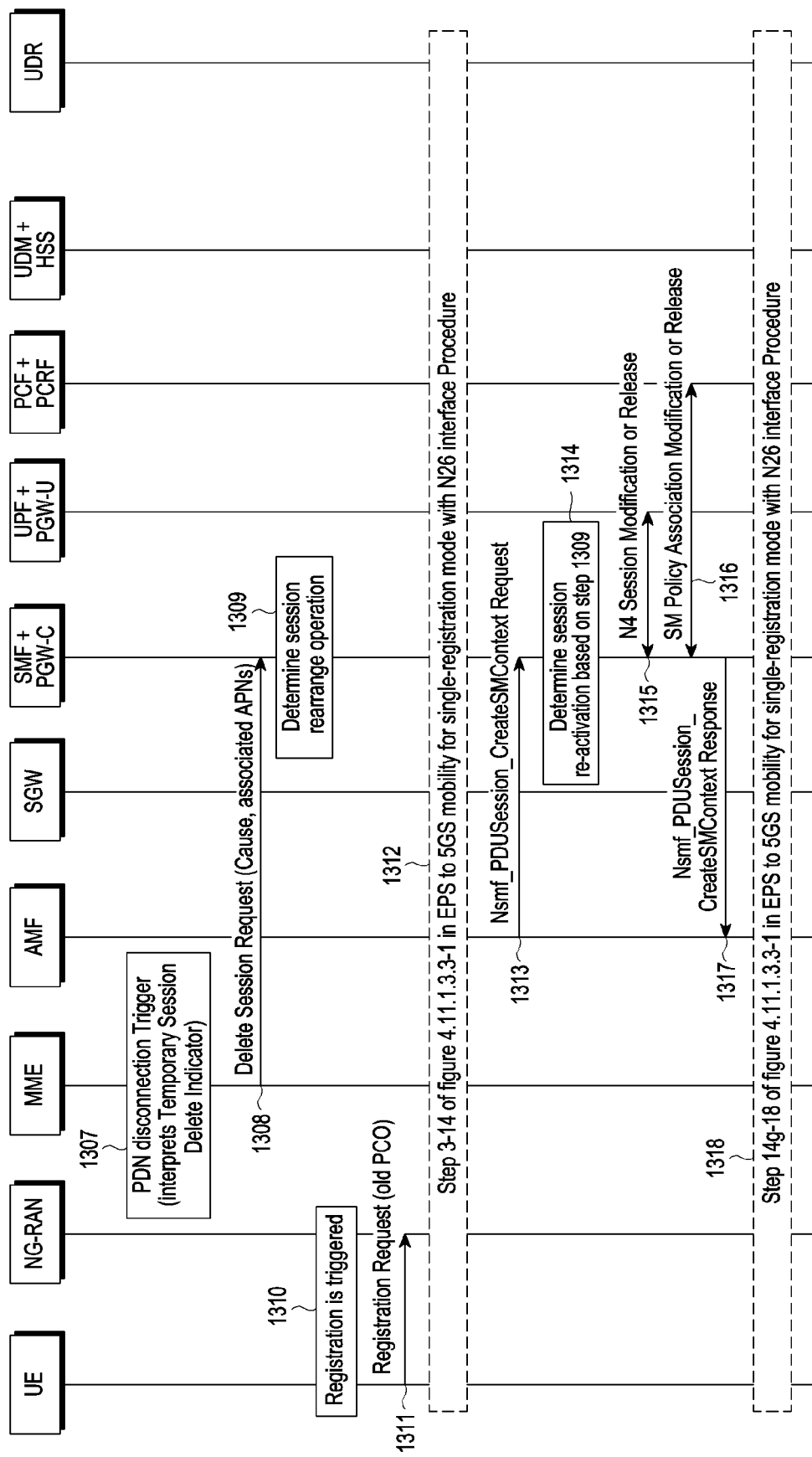

FIGS. 13A and 13B are diagrams illustrating a signal flow for a method of establishing a 5GS PDU session by using an APN information update and a temporary session delete indicator (when an N26 interface is used) according to an embodiment of the disclosure.

Referring to FIGS. 13A and 13B, the UDM+HSS may receive updated subscribed S-NSSAI information from the UDR, transmit APN information associated with updated subscribed S-NSSAIs and a temporary session delete indicator to the MME. The MME notifies that all PDN sessions connected to a corresponding APN should be released temporarily, and the SMF+PGW-C may determine whether there is any other substitute S-NSSAI that may enable the UE to access the APN and then modify or release a session, when the UE moves to the 5GS.

Specifically, the UDM+HSS transmits a Nudr_DM_subscribe message to the UDR in step 1301. The Nudr_DM_subscribe message is a message that subscribes to information about a change of subscription data. The Nudr_DM_subscribe message may include information indicating transmission of information about a changed or deleted subscribed S-NSSAI to the UDM+HSS which has transmitted the Nudr_DM_subscribe message, upon occurrence of an event of the change or deletion of the subscribed S-NSSAI for the UE.

When the UDR that has received the Nudr_DM_subscribe message detects that a change has occurred in subscription data for S-NSSAIs in step 1302, the UDR notifies the UDM+HSS of the result of the change of the subscribed S-NSSAIs by transmitting an Nudr_DM_notify message in step 1303. The change result may include at least one of the updated S-NSSAI(s) for the UE, information about APN(s) associated with the updated S-NSSAI(s) (that is, information about APN(s) connected to the updated subscribed S-NSSAI(s)), or cause information (e.g., a Cause value) about the subscription data change.

In step 1304, upon receipt of the Nudr_DM_notify message, the UDM+HSS may identify an associated APN and SMF+PGW-C based on the result of the change. In step 1305, the UDM+HSS transmits a message including subscription data including the APN information determined in step 1304 and the temporary session delete indicator to the MME. In step 1306, the MME transmits a response message to the UDM+HSS, confirming that the subscription data has been received/reflected.

Subsequently in step 1307, the MME identifies the temporary session delete indicator included in the received message, recognizes that all PDN sessions for the APN should be released temporarily, and thus triggers PDN session release. In step 1308, the MME may transmit, to the SMF+PGW-C, a message including at least one of the APN information or cause information (a Cause value) indicating that the session release is attributed to the change of subscribed S-NSSAIs, not a change in APNs.

Upon receipt of the message from the MME in step 1308, the SMF+PGW-C may determine whether to release or modify the PDN sessions according to the method of step 306 in the embodiment of FIG. 3 or the method of step 406 in the embodiment of FIG. 4 in step 1309.

Subsequent steps 1310 to 1318 are performed in the same manner as steps 507 to 515 in the embodiment of FIG. 5 and thus their detailed description is avoided herein.

Figure 14A:
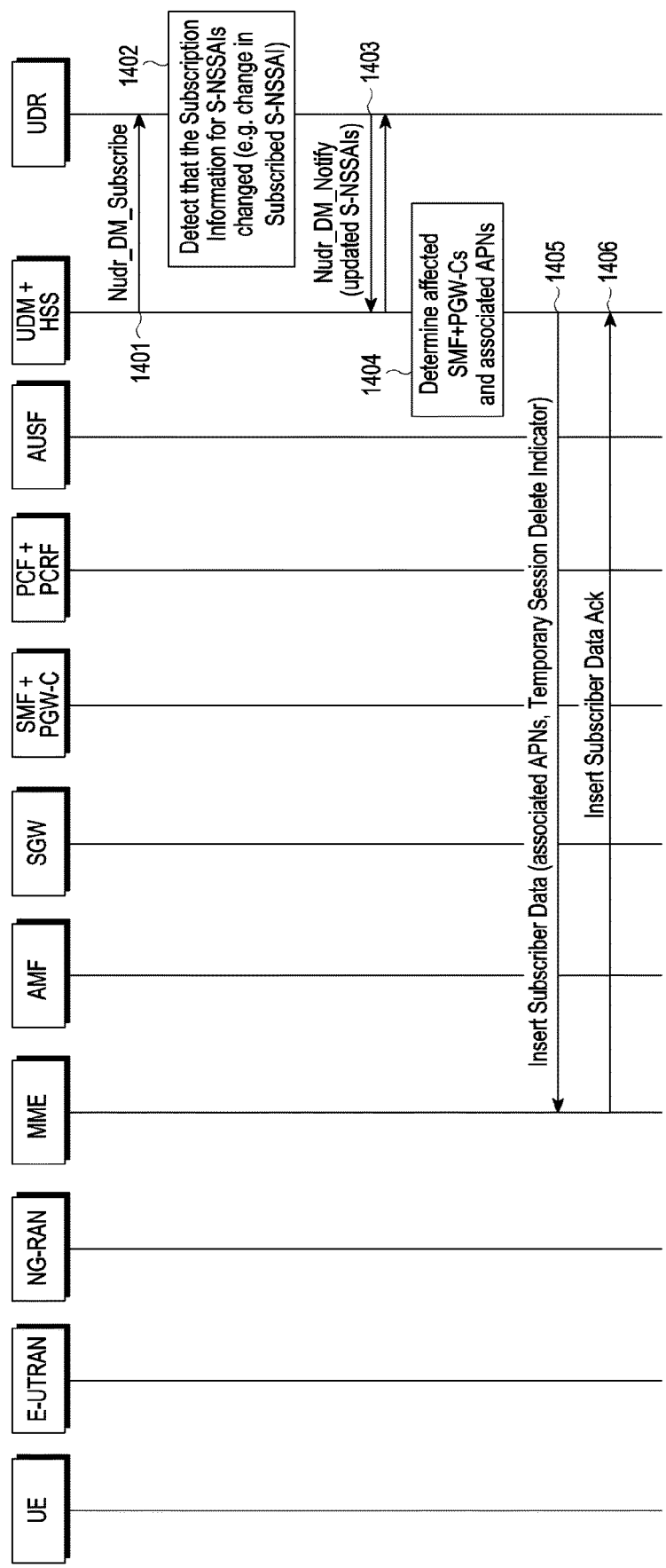
FIGS. 14A and 14B are diagrams illustrating a signal flow for a method of establishing a 5GS PDU session based on an APN information update and a temporary session delete indicator (when an N26 interface is not used) according to an embodiment of the disclosure.
Figure 14B:
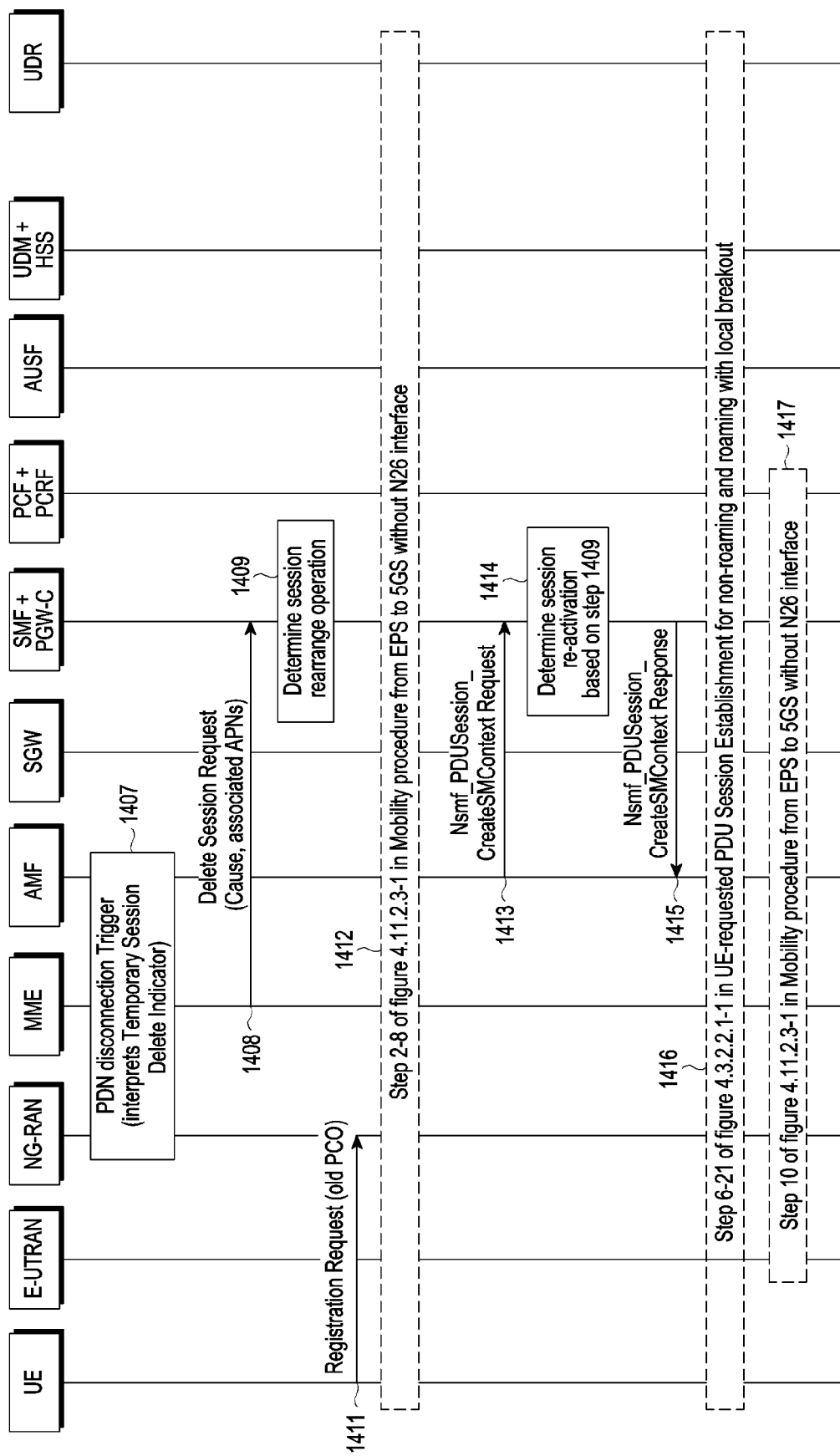

FIGS. 14A and 14B are diagrams illustrating a signal flow for a method of establishing a 5GS PDU session by using an APN information update and a temporary session delete indicator (when an N26 interface is not used) according to an embodiment of the disclosure.

Referring to FIGS. 14A and 14B, the UDM+HSS may receive updated subscribed S-NSSAI information from the UDR, transmit APN information associated with updated subscribed S-NSSAIs and a temporary session delete indicator to the MME. The MME notifies that all PDN sessions connected to a corresponding APN should be released temporarily, and the SMF+PGW-C may determine whether there is any other substitute S-NSSAI that may enable the UE to access the APN and then modify or release an associated session when the UE moves to the 5GS.

Specifically, the UDM+HSS transmits a Nudr_DM_subscribe message to the UDR in step 1401. The Nudr_DM_subscribe message is a message that subscribes to information about a change of subscription data. The Nudr_DM_subscribe message may include information indicating transmission of information about a changed or deleted subscribed S-NSSAI to the UDM+HSS which has transmitted the Nudr_DM_subscribe message, upon occurrence of an event of the change or deletion of the subscribed S-NSSAI for the UE.

When the UDR that has received the Nudr_DM_subscribe message detects that a change has occurred in subscription data for S-NSSAIs in step 1402, the UDR notifies the UDM+HSS of the result of the change of the subscribed S-NSSAIs by transmitting an Nudr_DM_notify message to the UDM+HSS in step 1403. The change result may include at least one of the updated S-NSSAI(s) for the UE, information about APN(s) associated with the updated S-NSSAI(s) (that is, information about APN(s) connected to the updated subscribed S-NSSAI(s)), or cause information (e.g., a Cause value) about the subscription data change.

In step 1404, upon receipt of the Nudr_DM_notify message, the UDM+HSS may identify an associated APN and SMF+PGW-C based on the result of the change. In step 1405, the UDM+HSS transmits a message including subscription data including the APN information determined in step 1404 and the temporary session delete indicator to the MME. In step 1406, the MME transmits a response message to the UDM+HSS, confirming that the subscription data has been received/reflected.

Subsequently in step 1407, the MME identifies the temporary session delete indicator included in the received message, recognizes that all PDN sessions for the APN should be released temporarily, and thus triggers PDN session release. In step 1408, the MME may transmit, to the SMF+PGW-C, a message including at least one of the APN information or cause information (a Cause value) indicating that the session release is attributed to the change of subscribed S-NSSAIs, not a change in APNs.

Upon receipt of the message from the MME in step 1408, the SMF+PGW-C may determine whether to release or modify the PDN sessions according to the method of step 306 in the embodiment of FIG. 3 or the method of step 406 in the embodiment of FIG. 4 in step 1409.

Subsequent steps 1411 to 1417 are performed in the same manner as steps 608 to 614 in the embodiment of FIG. 4 and thus their detailed description is avoided herein.

Figure 15:
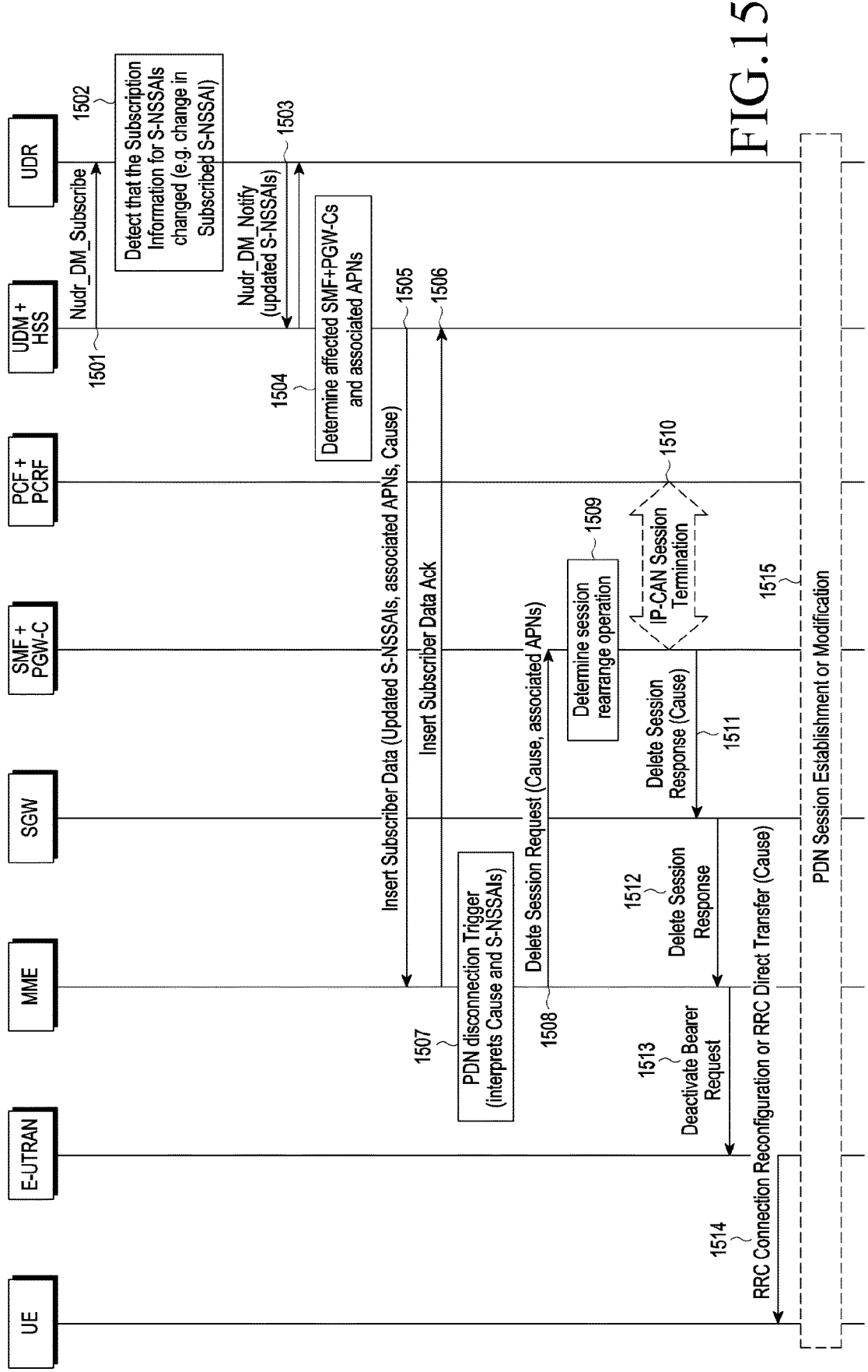
FIG. 15 is a diagram illustrating a signal flow for a session release method based on APN information and single-network slice selection assistance information (S-NSSAI) update information according to an embodiment of the disclosure.

FIG. 15 is a diagram illustrating a signal flow for a session release method based on APN information and S-NSSAI update information according to an embodiment of the disclosure.

In the embodiment of FIG. 15, a list of S-NSSAIs available for accessing a corresponding APN and cause information (a Cause value) indicating that S-NSSAI information has been changed with no change in APN information may be transmitted in the message in which the UDM+HSS notifies the MME of an APN information update in the embodiment of FIG. 11. The MME may determine to release a PDN session based on the Cause value and the S-NSSAI information received from the UDM-HSS. The SMF+PGW-C may determine whether there is any other substitute S-NSSAI that may enable the UE to access the APN. In the absence of any substitute S-NSSAI, the SMF+PGW-C may release a session, indicating the cause of the session release to the UE.

Specifically, the UDM+HSS transmits a Nudr_DM_subscribe message to the UDR in step 1501. The Nudr_DM_subscribe message is a message that subscribes to information about a change of subscription data. The Nudr_DM_subscribe message may include information indicating transmission of information about a changed or deleted subscribed S-NSSAI to the UDM+HSS which has transmitted the Nudr_DM_subscribe message, upon occurrence of an event of the change or deletion of the subscribed S-NSSAI for the UE.

When the UDR that has received the Nudr_DM_subscribe message detects that a change has occurred in subscription data for S-NSSAIs in step 1502, the UDR notifies the UDM+HSS of the result of the change of the subscribed S-NSSAIs by transmitting an Nudr_DM_notify message to the UDM+HSS in step 1503. The change result may include at least one of the updated S-NSSAI(s) for the UE, information about APN(s) associated with the updated S-NSSAI(s) (that is, information about APN(s) connected to the updated subscribed S-NSSAI(s)), or cause information (e.g., a Cause value) about the subscription data change.

In step 1504, upon receipt of the Nudr_DM_notify message, the UDM+HSS may identify an associated APN and SMF+PGW-C based on the result of the change. In step 1505, the UDM+HSS transmits a message including subscription data including at least one of the APN information determined in step 1504, the updated S-NSSAI(s), or the cause information to the MME. In step 1506, the MME transmits a response message to the UDM+HSS, confirming that the subscription data has been received/reflected.

Subsequently in step 1507, the MME identifies the subscription data including the Cause information, recognizes that all PDN sessions for the APN should be released temporarily, and thus triggers PDN session release. In step 1508, the MME may transmit, to the SMF+PGW-C, a message including at least one of the APN information or cause information (a Cause value) indicating that the session release is attributed to the change of subscribed S-NSSAIs, not a change in APNs.

Subsequent steps 1509 to 1515 are performed in the same manner as steps 306 to 312 in the embodiment of FIG. 3 and thus their detailed description is avoided herein.

Figure 16:
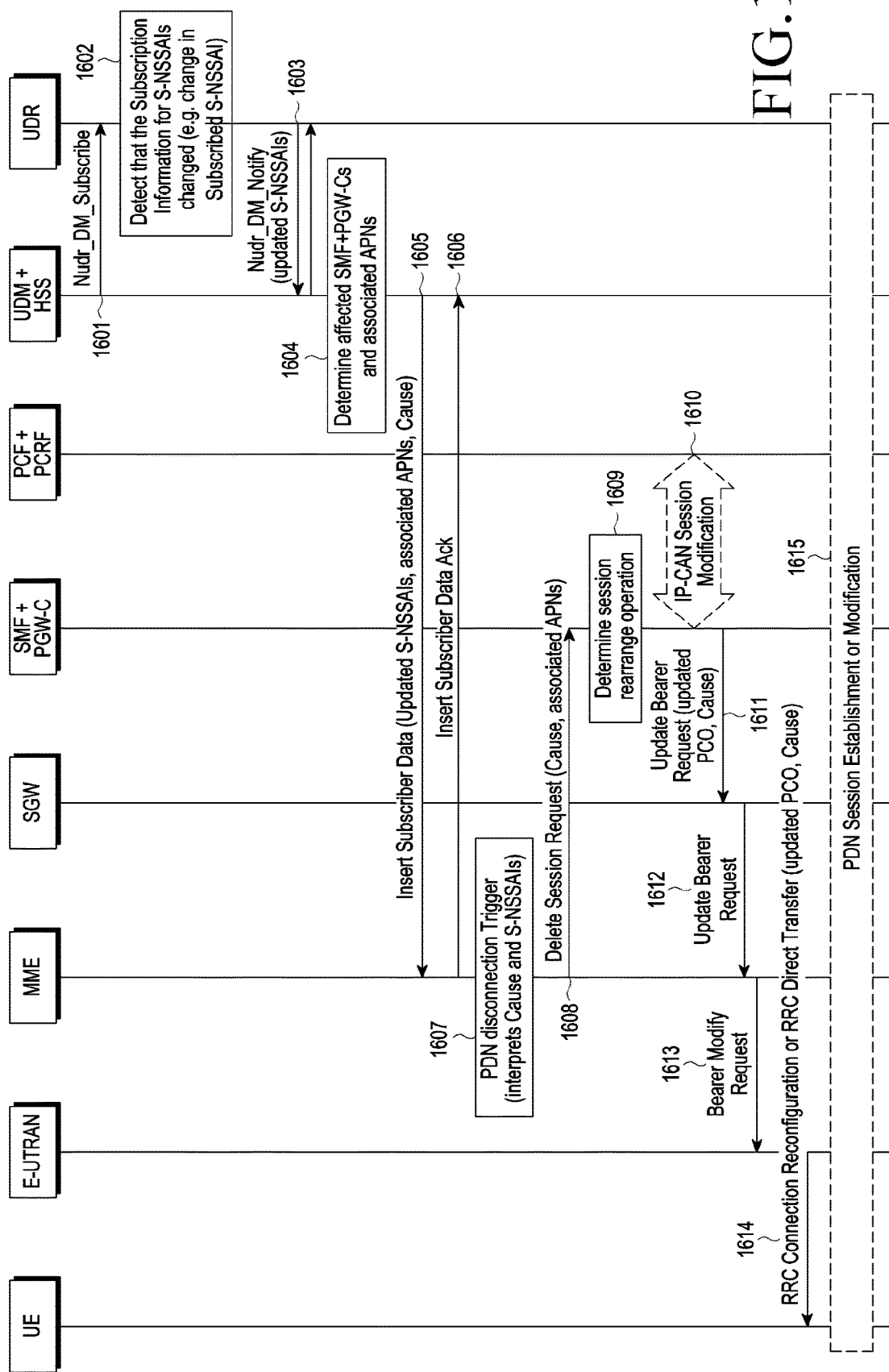
FIG. 16 is a diagram illustrating a signal flow for a session modification method based on APN information and S-NSSAI update information according to an embodiment of the disclosure.

FIG. 16 is a diagram illustrating a signal flow for a session modification method based on APN information and S-NSSAI update information according to an embodiment of the disclosure.

In the embodiment of FIG. 16, a list of S-NSSAIs available for accessing a corresponding APN and cause information (a Cause value) indicating that S-NSSAI information has been changed with no change in APN information may be transmitted in the message in which the UDM+HSS notifies the MME of an APN information update in the embodiment of FIG. 16. The MME may determine to release a PDN session based on the Cause value and the S-NSSAI information received from the UDM+HSS. The SMF+PGW-C may determine whether there is any other substitute S-NSSAI that may enable the UE to access the APN. In the presence of any substitute S-NSSAI, the SMF+PGW-C may modify a session, indicating the cause of the session modification and the changed S-NSSAI to the UE.

Specifically, the UDM+HSS transmits a Nudr_DM_subscribe message to the UDR in step 1601. The Nudr_DM_subscribe message is a message that subscribes to information about a change of subscription data. The Nudr_DM_subscribe message may include information indicating transmission of information about a changed or deleted subscribed S-NSSAI to the UDM+HSS which has transmitted the Nudr_DM_subscribe message, upon occurrence of an event of the change or deletion of the subscribed S-NSSAI for the UE.

When the UDR that has received the Nudr_DM_subscribe message detects that a change has occurred in subscription data for S-NSSAIs in step 1602, the UDR notifies the UDM+HSS of the result of the change of the subscribed S-NSSAIs by transmitting an Nudr_DM_notify message in step 1603. The change result may include at least one of the updated S-NSSAI(s) for the UE, information about APN(s) associated with the updated S-NSSAI(s) (that is, information about APN(s) connected to the updated subscribed S-NSSAI(s)), or cause information (e.g., a Cause value) about the subscription data change.

In step 1604, upon receipt of the Nudr_DM_notify message, the UDM+HSS may identify an associated APN and SMF+PGW-C based on the result of the change. In step 1605, the UDM+HSS transmits a message including subscription data including at least one of the APN information determined in step 1604, the updated S-NSSAI(s), or the cause information to the MME. In step 1606, the MME transmits a response message to the UDM+HSS, confirming that the subscription data has been received/reflected.

Subsequently in step 1607, the MME identifies the subscription data including the Cause information, recognizes that all PDN sessions for the APN should be released temporarily, and thus triggers PDN session release. In step 1608, the MME may transmit, to the SMF+PGW-C, a message including at least one of the APN information or cause information (a Cause value) indicating that the session release is attributed to the change of subscribed S-NSSAIs, not a change in APNs.

Subsequent steps 1609 to 1615 are performed in the same manner as steps 406 to 412 in the embodiment of FIG. 4 and thus their detailed description is avoided herein.

Figure 17A:
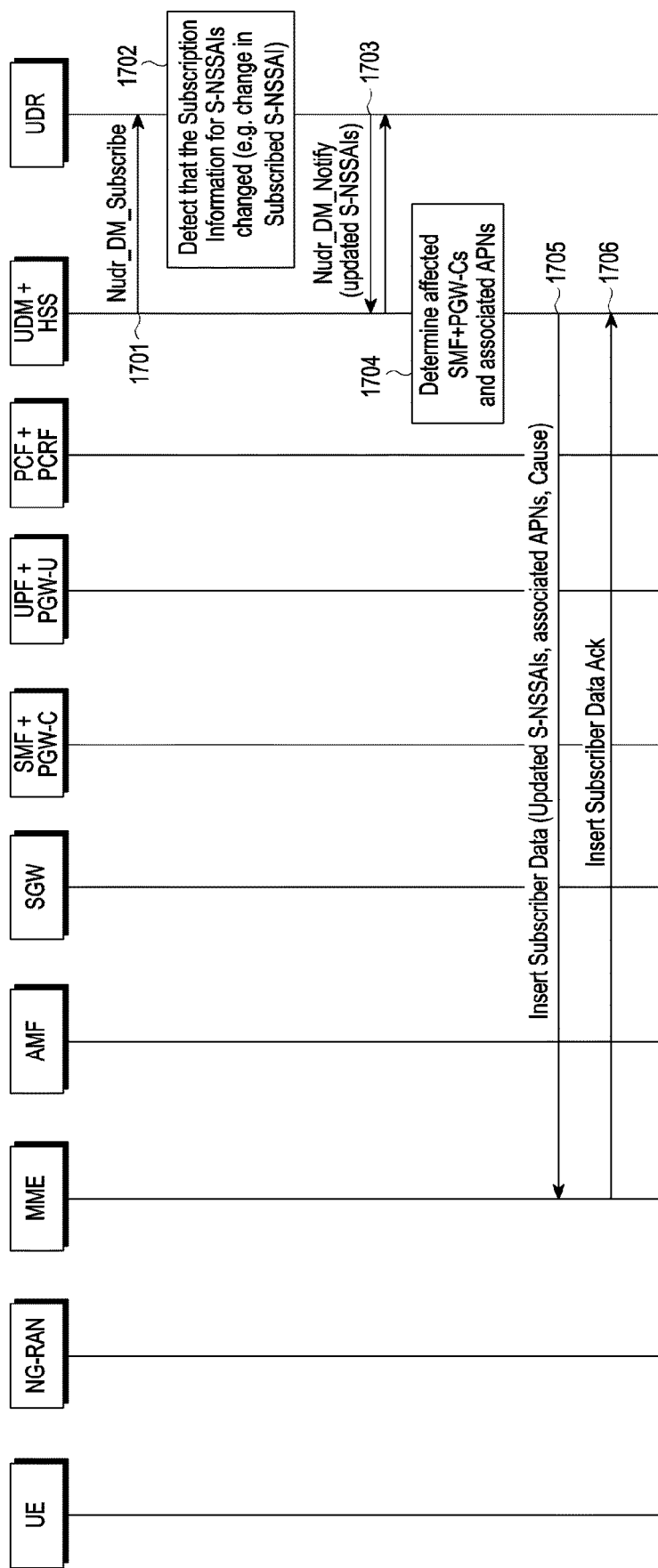
FIGS. 17A and 17B are diagrams illustrating a signal flow for a method of establishing a 5GS PDU session based on APN information and S-NSSAI update information (when an N26 interface exists) according to an embodiment of the disclosure.
Figure 17B:
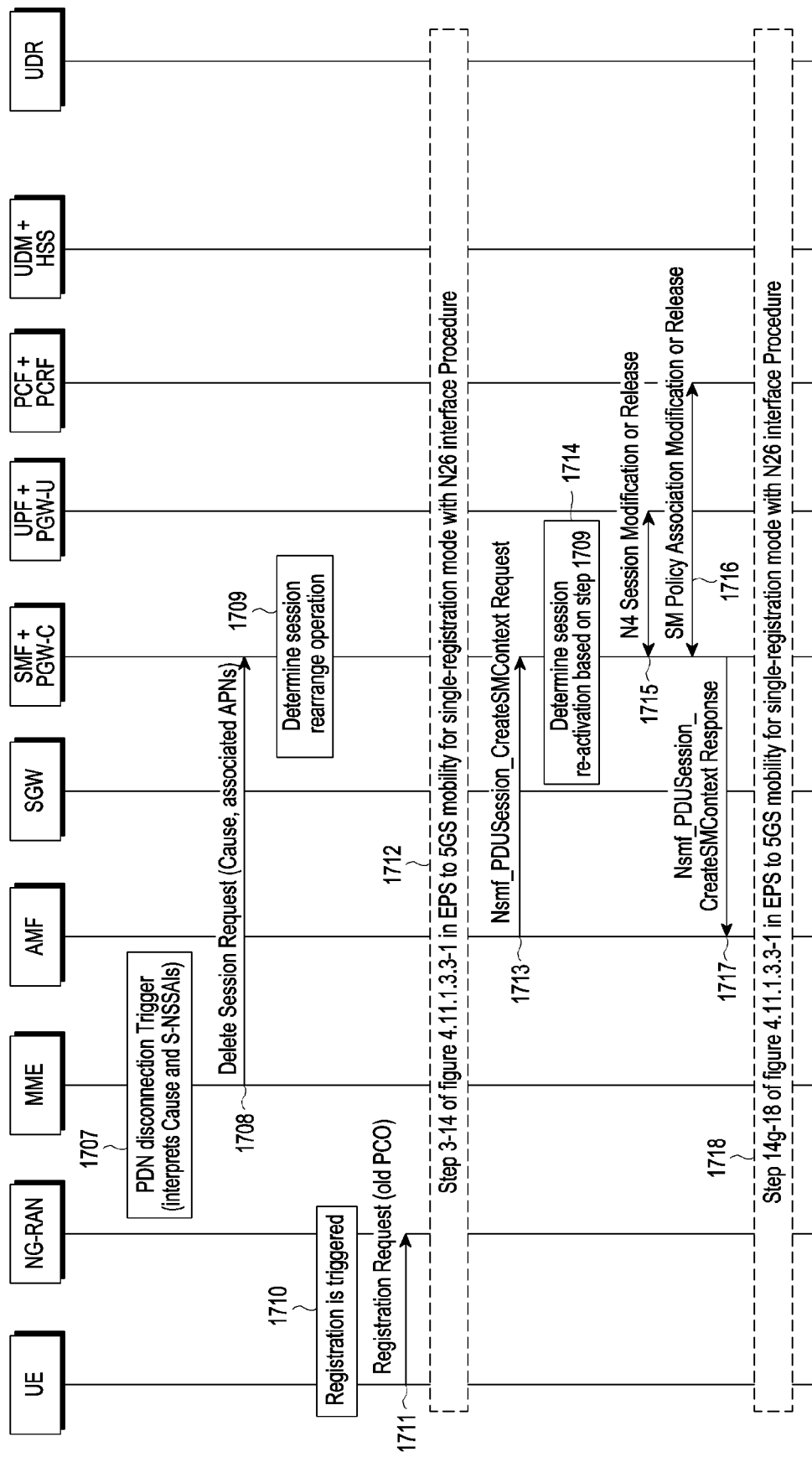

FIGS. 17A and 17B are diagrams illustrating a signal flow for a method of establishing a 5GS PDU session by using APN information and S-NSSAI update information (when an N26 interface exists) according to an embodiment of the disclosure.

In the embodiment of FIGS. 17A and 17B, a list of S-NSSAIs available for accessing a corresponding APN and cause information (a Cause value) indicating that S-NSSAI information has been changed with no change in APN information may be transmitted in the message in which the UDM+HSS notifies the MME of an APN information update in the embodiment of FIGS. 13A and 13B. The MME may determine to release a PDN session based on the Cause value and the S-NSSAI information received from the UDM+HSS. The SMF+PGW-C may determine whether there is any other substitute S-NSSAI that may enable the UE to access the APN and then modify or release an associated session when the UE moves to the 5GS.

Specifically, the UDM+HSS transmits a Nudr_DM_subscribe message to the UDR in step 1701. The Nudr_DM_subscribe message is a message that subscribes to information about a change of subscription data. The Nudr_DM_subscribe message may include information indicating transmission of information about a changed or deleted subscribed S-NSSAI to the UDM+HSS which has transmitted the Nudr_DM_subscribe message, upon occurrence of an event of the change or deletion of the subscribed S-NSSAI for the UE.

When the UDR that has received the Nudr_DM_subscribe message detects that a change has occurred in subscription data for S-NSSAIs in step 1702, the UDR notifies the UDM+HSS of the result of the change of the subscribed S-NSSAIs by transmitting an Nudr_DM_notify message in step 1703. The change result may include at least one of the updated S-NSSAI(s) for the UE, information about APN(s) associated with the updated S-NSSAI(s) (that is, information about APN(s) connected to the updated subscribed S-NSSAI(s)), or cause information (e.g., a Cause value) about the subscription data change.

In step 1704, upon receipt of the Nudr_DM_notify message, the UDM+HSS may identify an associated APN and SMF+PGW-C based on the result of the change. In step 1705, the UDM+HSS transmits a message including subscription data including at least one of the APN information determined in step 1704, the updated S-NSSAI(s), or the cause information to the MME. In step 1706, the MME transmits a response message to the UDM+HSS, confirming that the subscription data has been received/reflected.

Subsequently in step 1707, the MME identifies the subscription data including the Cause information, recognizes that all PDN sessions for the APN should be released temporarily, and thus triggers PDN session release. In step 1708, the MME may transmit, to the SMF+PGW-C, a message including at least one of the APN information or cause information (a Cause value) indicating that the session release is attributed to the change of subscribed S-NSSAIs, not a change in APNs.

In step 1709, upon receipt of the message from the MME in step 1708, the SMF+PGW-C may determine whether to release or modify the PDN sessions according to the method of step 306 in the embodiment of FIG. 3 or the method of step 406 in the embodiment of FIG. 4.

Subsequent steps 1710 to 1718 are performed in the same manner as steps 507 to 515 in the embodiment of FIG. 5 and thus their detailed description is avoided herein.

Figure 18A:
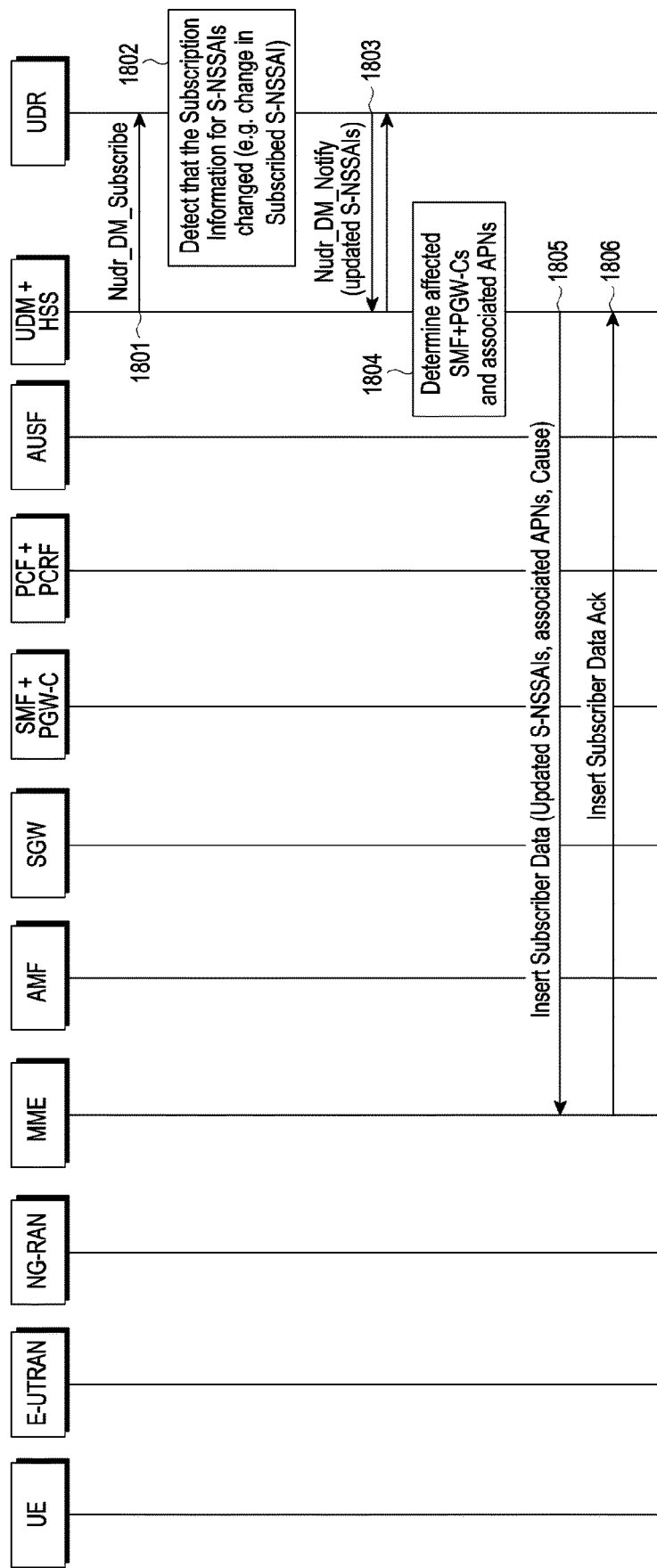
FIGS. 18A and 18B are diagrams illustrating a signal flow for a method of establishing a 5GS PDU session based on APN information and S-NSSAI update information (when an N26 interface does not exist) according to an embodiment of the disclosure.
Figure 18B:
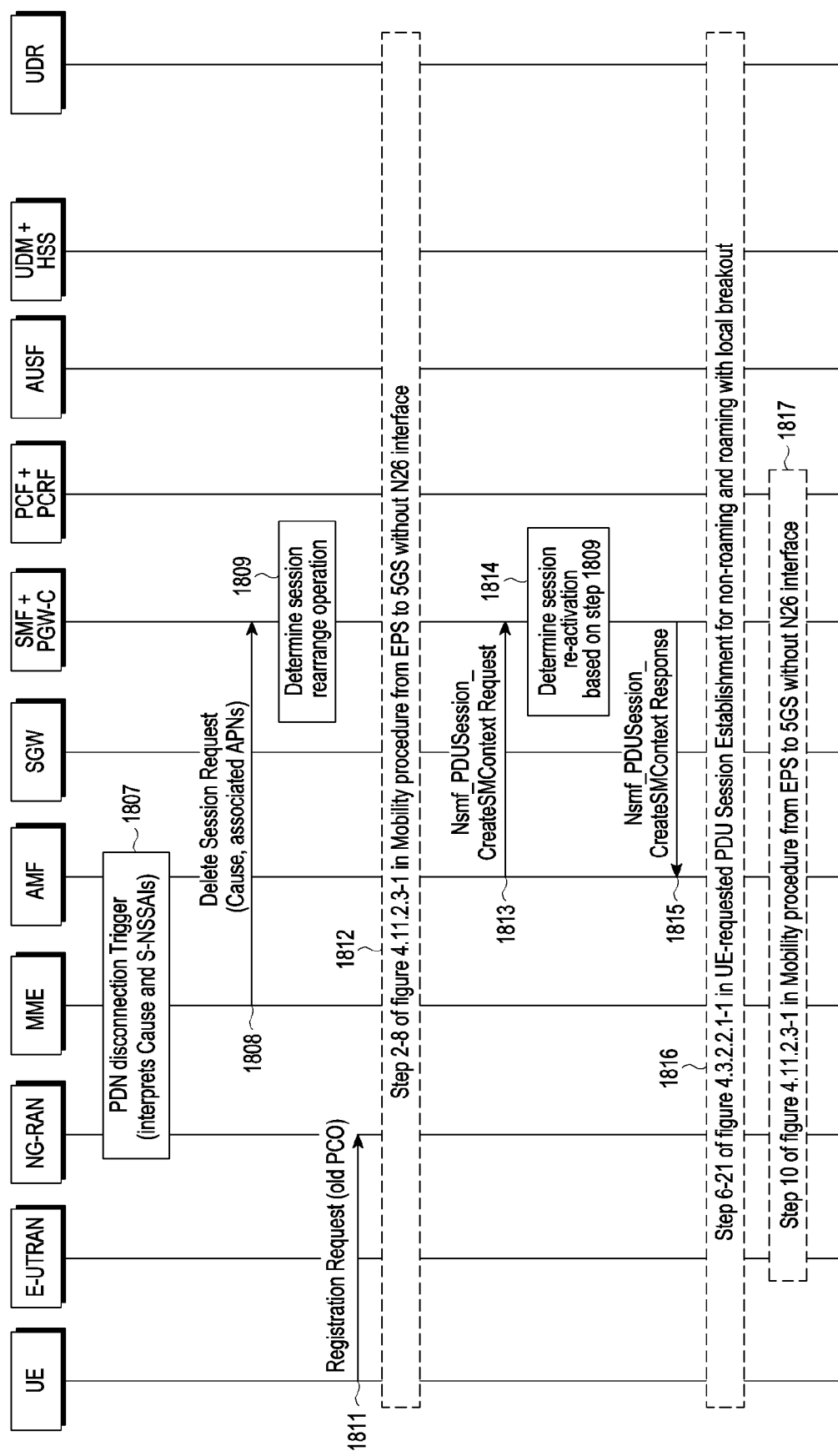

FIGS. 18A and 18B are diagrams illustrating a signal flow for a method of establishing a 5GS PDU session by using APN information and S-NSSAI update information (when an N26 interface does not exist) according to an embodiment of the disclosure.

In the embodiment of FIGS. 18A and 18B, a list of S-NSSAIs available for accessing a corresponding APN and cause information (a Cause value) indicating that S-NSSAI information has been changed with no change in APN information may be transmitted in the message in which the UDM+HSS notifies the MME of an APN information update in the embodiment of FIGS. 14A and 14B. The MME may determine to release a PDN session based on the Cause value and the S-NSSAI information received from the UDM+HSS. The SMF+PGW-C may determine whether there is any other substitute S-NSSAI that may enable the UE to access the APN and then modify or release an associated session when the UE moves to the 5GS.

Specifically, the UDM+HSS transmits a Nudr_DM_subscribe message to the UDR in step 1801. The Nudr_DM_subscribe message is a message that subscribes to information about a change of subscription data. The Nudr_DM_subscribe message may include information indicating transmission of information about a changed or deleted subscribed S-NSSAI to the UDM+HSS which has transmitted the Nudr_DM_subscribe message, upon occurrence of an event of the change or deletion of the subscribed S-NSSAI for the UE.

When the UDR that has received the Nudr_DM_subscribe message detects that a change has occurred in subscription data for S-NSSAIs in step 1802, the UDR notifies the UDM+HSS of the result of the change of the subscribed S-NSSAIs by transmitting an Nudr_DM_notify message in step 1803. The change result may include at least one of the updated S-NSSAI(s) for the UE, information about APN(s) associated with the updated S-NSSAI(s) (that is, information about APN(s) connected to the updated subscribed S-NSSAI(s)), or cause information (e.g., a Cause value) about the subscription data change.

In step 1804, upon receipt of the Nudr_DM_notify message, the UDM+HSS may identify an associated APN and SMF+PGW-C based on the result of the change. In step 1705, the UDM+HSS transmits a message including subscription data including at least one of the APN information determined in step 1804, the updated S-NSSAI(s), or the cause information to the MME. In step 1806, the MME transmits a response message to the UDM+HSS, confirming that the subscription data has been received/reflected.

Subsequently in step 1807, the MME identifies the subscription data including the Cause information, recognizes that all PDN sessions for the APN should be released temporarily, and thus triggers PDN session release. In step 1808, the MME may transmit, to the SMF+PGW-C, a message including at least one of the APN information or cause information (a Cause value) indicating that the session release is attributed to the change of subscribed S-NSSAIs, not a change in APNs.

In step 1809, upon receipt of the message from the MME in step 1808, the SMF+PGW-C may determine whether to release or modify the PDN sessions according to the method of step 306 in the embodiment of FIG. 3 or the method of step 406 in the embodiment of FIG. 4.

Subsequent steps 1811 to 1817 are performed in the same manner as steps 608 to 614 in the embodiment of FIG. 6 and thus their detailed description is avoided herein.

Figure 19:
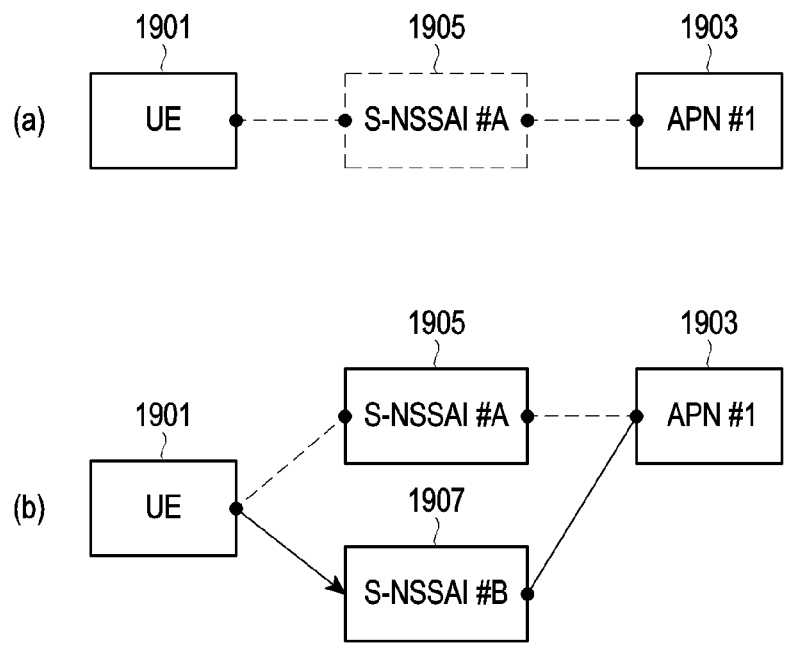
FIG. 19 is a diagram illustrating examples of association between an APN and S-NSSAI(s) according to an embodiment of the disclosure.

FIG. 19 is a diagram illustrating association between an APN and S-NSSAI(s) according to an embodiment of the disclosure.

Referring to FIG. 19, (a) of FIG. 19 illustrates an example in which S-NSSAI #A 1905 available for accessing APN #1 1903 as an S-NSSAI for a UE 1901 has been deleted from a subscribed S-NSSAI list. In this case, the SMF+PGW-C may determine whether another substitute S-NSSAI is available for accessing APN #1 1903. In the absence of any substitute S-NSSAI, the SMF+PGW-C may release a PDN session, indicating the cause of the session release to the UE.

(b) of FIG. 19 illustrates an example in which S-NSSAI #A 1905 between S-NSSAI #A 1905 and S-NSSAI #B 1907 available for accessing APN #1 1903 has been deleted from a subscribed S-NSSAI list. In this case, the SMF+PGW-C may identify S-NSSAI #B 1907 as another substitute S-NSSAI available for accessing APN #1 1903. Then, the SMF+PGW-C may modify a PDN session, indicating the cause of the session modification to the UE.

The above-described embodiments may be performed in combination with each other. For example, the whole or part of a specific embodiment may be implemented in combination with the whole or part of another embodiment, and it is apparent that the combined form also falls within the scope of the disclosure.

Figure 20:
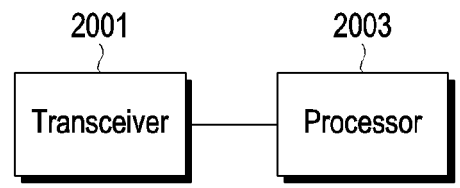
FIG. 20 is a block diagram illustrating the structure of a user equipment (UE) related to an embodiment of the disclosure.

FIG. 20 is a block diagram illustrating the structure of a UE related to an embodiment of the disclosure.

Referring to FIG. 20, the UE may include a transceiver 2001 and a processor 2003. In the disclosure, the processor 2003 may be configured as a circuit or application-specific integrated circuit, or at least one processor.

The transceiver 2001 may transmit and receive signals to and from a BS, another UE, and a network entity. The transceiver 2001 may, for example, receive system information from the BS or transmit/receive data based on a synchronization signal, a reference signal, and/or control information to/from the BS.

The processor 2003 may control the overall operations of the UE according to at least one of the embodiments of FIGS. 1 to 26. For example, the processor 2003 may control a signal flow between blocks to perform an operation according to the above-described drawings and flowcharts. Specifically, the processor 2003 may exchange messages or signals with a BS, another UE, and/or a network entity, while operating according to a control signal received from the BS.

Further, the UE may include a storage that may store at least one of information transmitted and received through the transceiver 2001 or information generated through the processor 2003.

Figure 21:
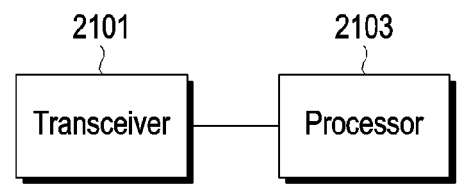
FIG. 21 is a block diagram illustrating the structure of a network function (NF) related to an embodiment of the disclosure.

FIG. 21 is a diagram illustrating the structure of an NF according to an embodiment of the disclosure. The NF of FIG. 21 may include an NF instance.

The NF illustrated in FIG. 21 may refer to an entity supporting the afore-described various network functions. The NF may be, for example, at least one of an MME, an AMF, an SMF, an interworking NF, a UDM, a UDR, a PCF, or a combo node described before with reference to FIG. 2, not limited to any specific NF. Further, an NF may be provided in the form of an instance. When the NF is provided as an instance, the NF exists in the form of software code. Because an NF instance refers to a state in which physical and/or logical resources are allocated from a physical computing system, for example, a specific computing system existing on a core network to execute a function of an NF, and thus the function of the NF is executable, the structure of FIG. 21 may be divided physically or logically.

Referring to FIG. 21, the NF may include a transceiver 2101 and a processor 2103.

The transceiver 2101 may transmit/receive a signal to/from another network entity (NF). The transceiver 2101 may, for example, exchange signalling for transmission and reception of control information and data to and from another network (NF) or a BS.

The processor 2103 may control the overall operations of the NF according to at least one of the embodiments of FIGS. 1 to 26. For example, the processor 2103 may control a signal flow between blocks to perform an operation according to the above-described drawings and flowcharts. Specifically, the processor 2103 may exchange messages or signals with a UE, a BS, and/or another network entity, while operating according to signaling received from the network entity or the BS.

The NF may further include a storage that may store at least one of information transmitted and received through the transceiver 2101 or information generated through the processor 2103.

Figure 22:
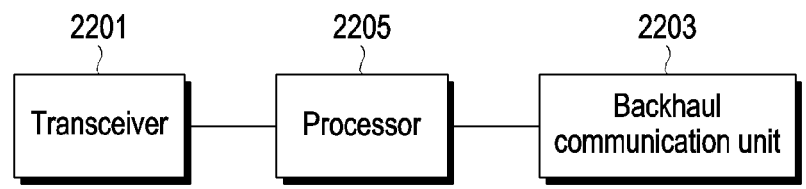
FIG. 22 is a block diagram illustrating the structure of a base station (BS) related to an embodiment of the disclosure.

FIG. 22 is a diagram illustrating the structure of a BS according to an embodiment of the disclosure.

Referring to FIG. 22, the BS may include a transceiver 2201, a processor 2205, and a backhaul communication unit 2203. In the disclosure, the processor 2205 may be configured as a circuit or application-specific integrated circuit or at least one processor.

The transceiver 2201 may transmit/receive a signal to/from a UE. The transceiver 2201 may transmit, for example, system information, a synchronization signal or reference signal, or control information and data to the UE. The backhaul communication unit 2203 provides a wired or wireless interface for communicating with other nodes (NFs) in the network.

The processor 2205 may control the overall operations of the BS according to at least one of the embodiments of FIGS. 1 to 26. For example, the processor 2205 may control a signal flow between blocks to perform an operation according to the above-described drawings and flowcharts. Specifically, a BS controller may exchange messages or signals with a UE and/or a network entity.

The BS may further include a storage that stores at least one of information transmitted and received through the transceiver 2201 and the backhaul communication unit 2203 or information generated through the processor 2205.

As is apparent from the foregoing description, according to an apparatus and method various embodiments of the disclosure, a method of interworking between a 5G network system structure providing network slicing function and an EPS network system, is provided. Therefore, a service may be effectively provided in a mobile communication system.

The embodiments of the disclosure described with reference to the attached drawings are specific examples provided to easily describe the disclosure and help the understanding of the disclosure, not intended to limit the scope of the disclosure. Accordingly, all modifications or variations derived from the disclosure as well as the embodiments disclosed herein should be construed as falling within the scope of the disclosure.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by an SMF+PGW-C that is a combination node of a session management function (SMF) in a 5G system (5GS) and a packet data network gateway-control (PGW-C) in an evolved packet system (EPS) in a wireless communication system supporting interworking between the 5GS and the EPS, the method comprising:
    receiving, from a user data management (UDM) managing subscription information, subscription update information of a user equipment (UE) for which a packet data network (PDN) connection associated with a network slice is established in the EPS, the network slice being subscribed in the 5GS;
    identifying whether to release the PDN connection in case that the subscription update information includes information notifying that network slice information associated with the PDN connection of the UE is changed; and
    transmitting, to the UE, information indicating a cause associated with a release of the PDN connection associated with the network slice in case that the release of the PDN connection is identified,
    wherein the network slice information includes subscribed single-network slice selection assistance information (S-NSSAI), and
    wherein the information indicating the cause includes information representing a subscription removal of the subscribed S-NSSAI of the UE.

2. The method of claim 1, wherein identifying whether to release the PDN connection comprises:
    identifying whether an available substitute S-NSSAI associated with the PDN connection of the UE exists; and
    identifying the release of the PDN connection in case that the available substitute S-NSSAI does not exist.

3. The method of claim 2, wherein the available substitute S-NSSAI is used to access an access point name (APN) for the PDN connection associated with the network slice.

4. An SMF+PGW-C that is a combination node of a session management function (SMF) in a 5G system (5GS) and a packet data network gateway-control (PGW-C) in evolved packet system (EPS) in a wireless communication system supporting interworking between the 5GS and the EPS, the SMF+PGW-C comprising:
    a transceiver (2101); and
    a processor (2103) configured to:
        receive, via the transceiver from user data management, UDM, managing subscription information, subscription update information of a user equipment (UE) for which a PDN connection associated with a network slice is established in the EPS, the network slice being subscribed in the 5GS,
        identify whether to release the PDN connection in case that the subscription update information includes information notifying that network slice information associated with the PDN connection of the UE is changed, and
        transmit, to the UE, information indicating a cause associated with a release of the PDN connection associated with the network slice in case that the release of the PDN connection is identified,
    wherein the network slice information includes subscribed single-network slice selection assistance information (S-NSSAI), and
    wherein the information indicating the cause includes information representing a subscription removal of the subscribed S-NSSAI of the UE.

5. The SMF+PGW-C of claim 4, wherein the processor is further configured to:
    identify whether an available substitute S-NSSAI associated with the PDN connection of the UE exists, and
    identify the release of the PDN connection in case that the available substitute S-NSSAI does not exist.

6. The SMF+PGW-C of claim 5, wherein the available substitute S-NSSAI is used to access an access point name (APN) for the PDN connection associated with the network slice.

7. A user equipment (UE) in a wireless communication system supporting interworking between a 5G system (5GS) and an evolved packet system (EPS), the UE comprising:
    a transceiver; and
    a processor configured to:
        establish a packet data network (PDN) connection associated with a network slice in the EPS, the network slice being subscribed in the 5GS, and identify a release of the PDN connection in case that the UE receives, from an SMF+PGW-C that is a combination node of a session management function (SMF) in the 5GS and a packet data network gateway-control (PGW-C) in the EPS, information indicating a cause associated with the release of the PDN connection, the SMF+PGW-C having received subscription update information including information notifying that network slice information associated with the PDN connection of the UE is changed, wherein the network slice information includes subscribed single-network slice selection assistance information (S-NSSAI), and wherein the information indicating the cause includes information representing a subscription removal of the subscribed S-NSSAI of the UE.

* * * * *